United States Patent [19]
Pechanek et al.

[11] Patent Number: 5,640,586
[45] Date of Patent: Jun. 17, 1997

[54] SCALABLE PARALLEL GROUP PARTITIONED DIAGONAL-FOLD SWITCHING TREE COMPUTING APPARATUS

[75] Inventors: Gerald George Pechanek, Endwell; Stamatis Vassiliadis, Vestal; Jose Guadalupe Delgado-Frias, Endwell, all of N.Y.

[73] Assignee: International Business Machines Corporation, Armonk, N.Y.

[21] Appl. No.: 496,826

[22] Filed: Jun. 29, 1995

Related U.S. Application Data

[63] Continuation of Ser. No. 881,594, May 12, 1992, abandoned.

[51] Int. Cl.$^6$ .................................................. G06F 17/00
[52] U.S. Cl. .......................... 395/800; 395/24; 364/229; 364/276.8; 364/DIG. 1
[58] Field of Search .............................. 395/800, 27, 24; 364/229, 276.8, DIG. 1

[56] References Cited

U.S. PATENT DOCUMENTS

| | | | |
|---|---|---|---|
| 4,639,857 | 1/1987 | McCanny et al. | 364/DIG. 1 |
| 4,727,503 | 2/1988 | McWhirter | 364/715 |
| 4,884,193 | 11/1989 | Lang | 395/800 |
| 4,907,148 | 3/1990 | Morton | 365/DIG. 1 |
| 4,943,909 | 7/1990 | Huang | 364/DIG. 1 |
| 5,018,065 | 5/1991 | McWhirter et al. | 364/DIG. 2 |
| 5,243,688 | 9/1993 | Pechanek et al. | 395/27 |
| 5,325,464 | 6/1994 | Pechanek et al. | 395/27 |

OTHER PUBLICATIONS

"The Application and Development of Wavefront Array Processors for Advanced Front-End Signal Processing Systems" by Ward, et al., 1987, *Systolic Arrays, First International Workshop Papers*, pp. 295–301.

IEEE, 1988, "Mapping Signal Processing Algorithms To Fixed Architectures", V2.10, pp.2037–2040, by Stewart.

Proceedings IEEE International Conferences on Computer Design: VLSI in Computers 6, Oct. 1986, Port Chester, NY, pp. 269–274, D. Koppelman et al, "The Implementation of a Triangular Permutation Network Using Wafer Scale Integration".

WO88/01771, Mar. 1988, Columbia University in the City of New York, PCT/US87/02107, "Binary Tree Parallel Processor", European patent.

(List continued on next page.)

*Primary Examiner*—Alyssa H. Bowler
*Assistant Examiner*—John Harrity
*Attorney, Agent, or Firm*—Eugene I. Shkurko; John E. Hoel; Steven B. Phillips

[57] ABSTRACT

A parallel computer architecture supporting neural networks utilizing a novel method of separating a triangular array containing N processing elements on each edge into multiple smaller triangular arrays, each of dimension X and each representing a common building block processor group chip that can be interconnected for various size parallel processing implementations. The group chips are interconnected by a unique switching tree mechanism that maintains the complete connectivity capability and functionality possessed by the original triangular array of dimension N. For a given size K and X, K divisible by X, a triangular array containing K processor elements located on each edge of an equilateral triangular array is partitioned into K/X triangular arrays of dimension X and $K(K-X)/2X^2$ square processor arrays of dimension X. An algorithm partitions a square array into two triangular arrays, each of dimension X. Assuming K=N and the chosen technology supports the placement of a triangular processor group chip of dimension X on a single chip, the final scalable parallel computing structure for N root tree processors utilizes $N^2/X^2$ triangular processor group chips. The partitioning methodology creates a scalable organization of processor elements. An interconnection mechanism preserves the functionality of the original triangular array of dimension N in the implemented structure constructed of multiple triangular arrays of dimension X.

8 Claims, 79 Drawing Sheets

OTHER PUBLICATIONS

UK Patent Application 2 219 106 A, Nov. 29, 1989, The Secretary of State for Defence, Whitehall, London, SW1A 2HB, United Kingdom, "Processor for Constrained Least Squares Comutations", the whole document.

WO-A-90 09643, PCT/GB90/00142, Aug. 23, 1990, The Secretary of State for Defense, Whitehall, London, "Heuristic Processor", p. 3, line 27, p. 4, line 19, p. 8, line 2, p. 9, line 1.

IBM Technical Disclosure Bulletin, vol. 34, No. 10A, Mar. 1992, New York US, pp. 100–106, "Many SNAP".

1985 IEEE Computer Society Workshop on Computer Architecture for Pattern Analysis and Image Database Management, Nov. 18, 1985, Miami, FL, USA, pp. 25–32, H–H. Liu and T. Young, "VLSI Algorithms and Structures for Consistent Labeling", p. 26, right column, line 53–line 58, p. 28, left column, line 30 –line 48.

Proceedings of the 1986 International Conference on Parallel Processing, Aug. 19, 1986, Penn State University, USA, pp. 324–326, A. Oruc, "Synthesis of a Family of Cellular Permutation Arrays", p. 325, left column, line 1, right column, line 11, figures 1–4.

European Patent 0 459 222 A2, IBM Corp., Dec. 4, 1991, S. Vassiliadis, "Neural Network".

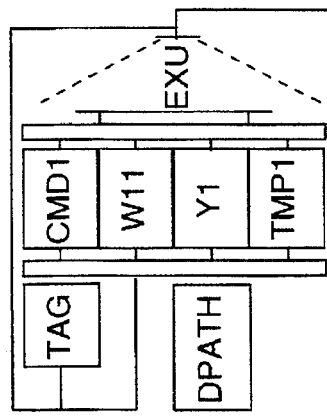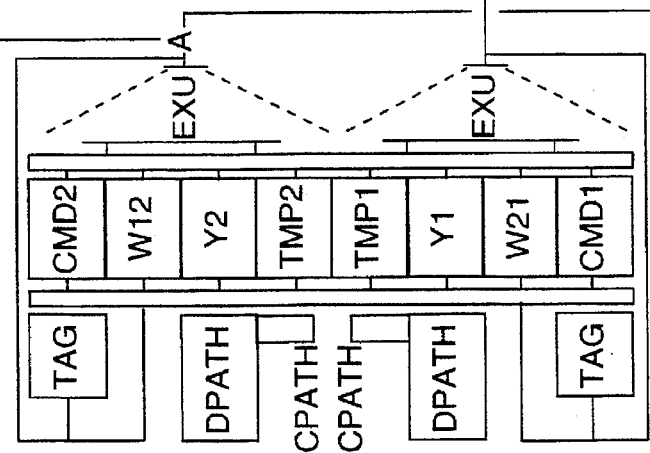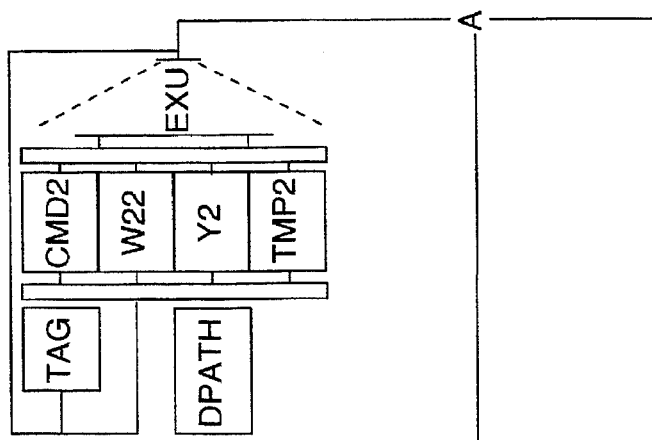
FIG. 2A

FIG. 3

K ELEMENTS ON THE DIAGONAL

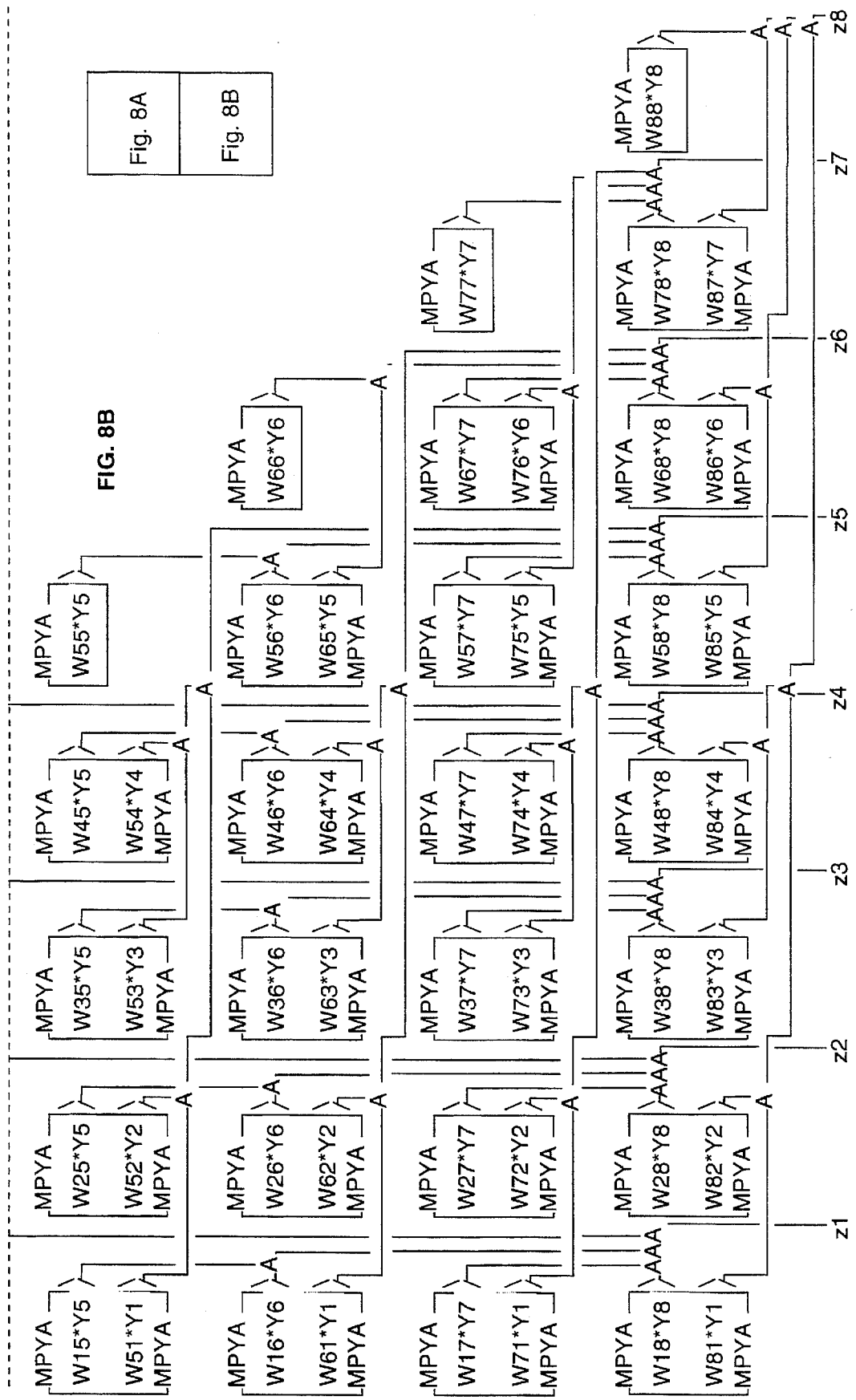

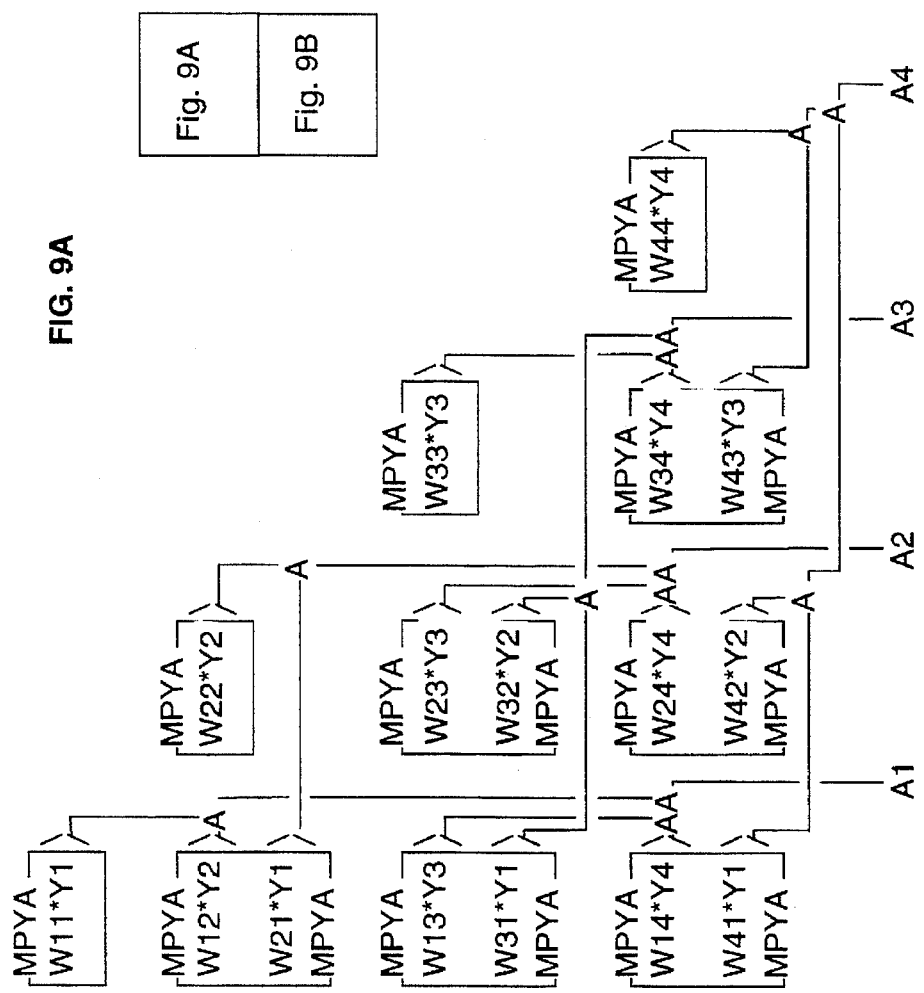

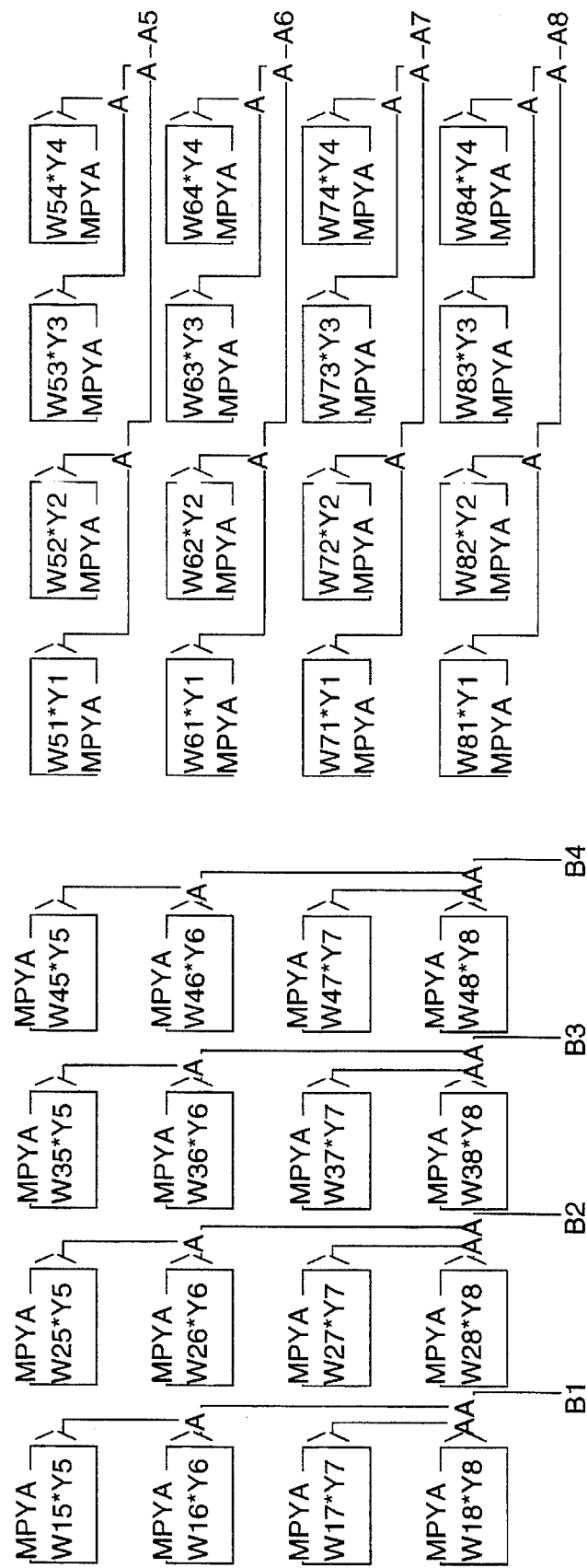

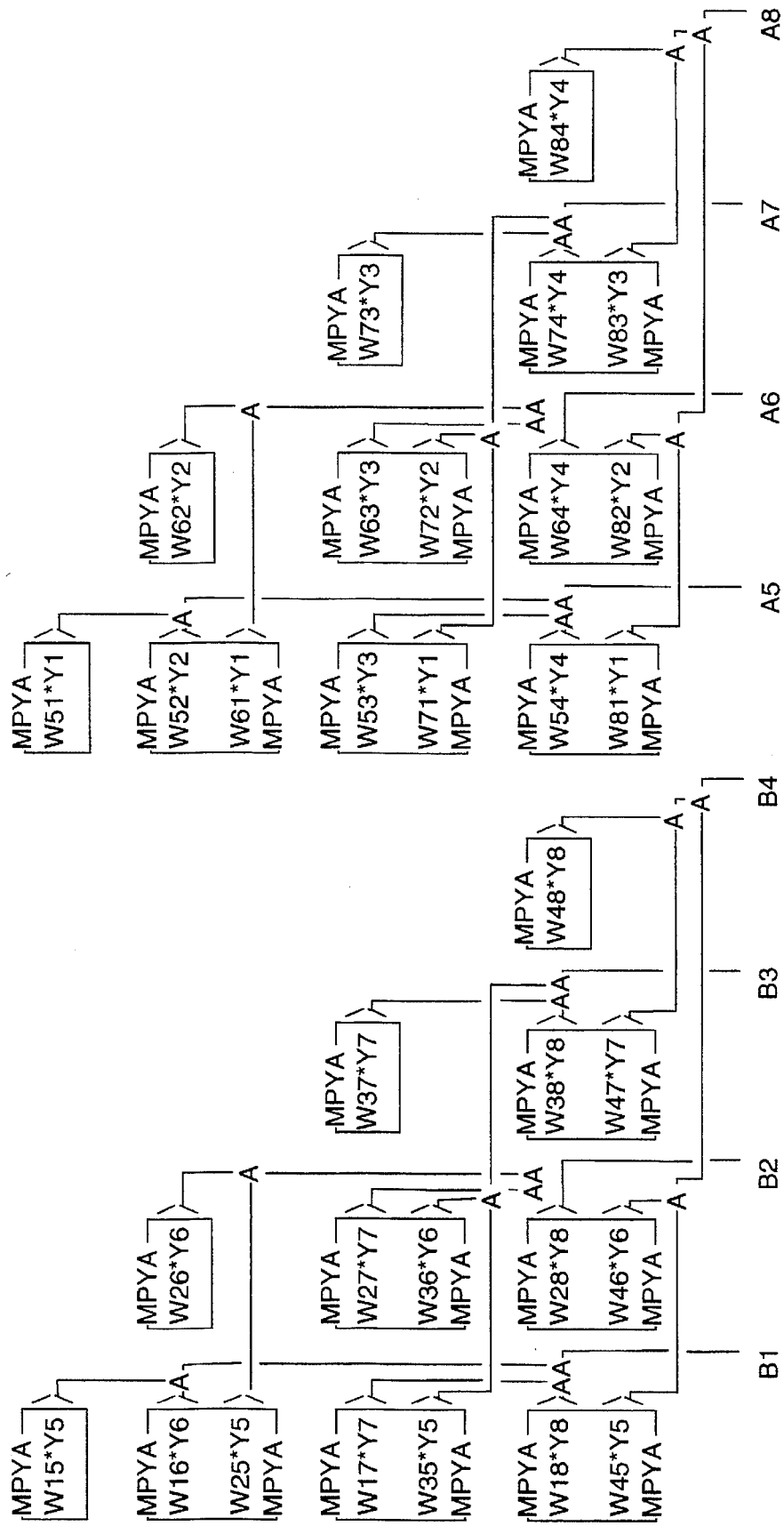

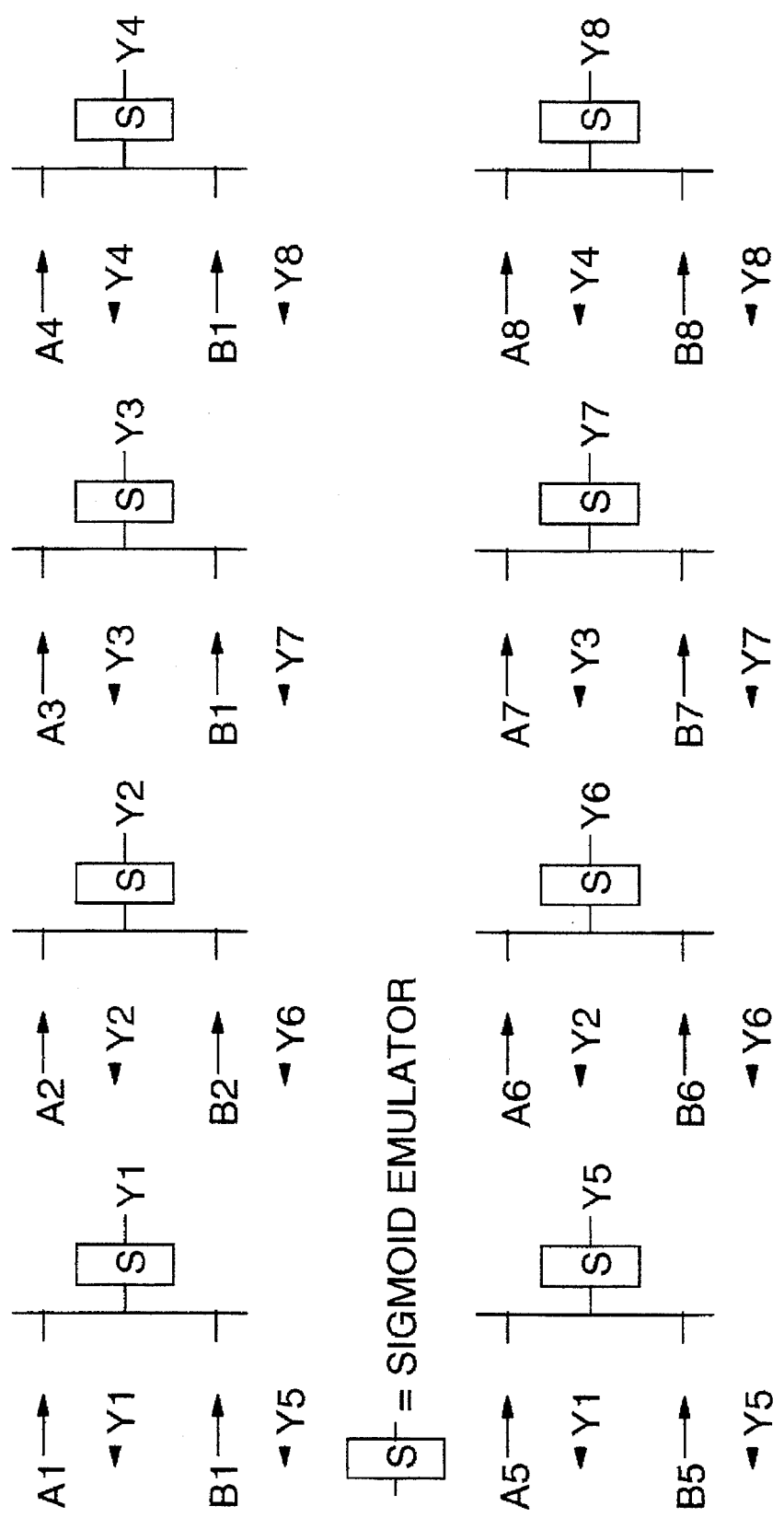

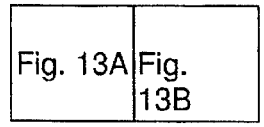

| Fig. 13A | Fig. 13B |

| | |
|---|---|
| W9,D*YD  WA,D*YD  WB,D*YD  WC,D*YD<br>WD,9*Y9  WD,A*YA  WD,B*YB  WD,C*YC | WD,D*YD |
| W9,E*YE  WA,E*YE  WB,E*YE  WC,E*YE<br>WE,9*Y9  WE,A*YA  WE,B*YB  WE,C*YC | WD,E*YE<br>WE,D*YD  WE,E*YE |
| W9,F*YF  WA,F*YF  WB,F*YF  WC,F*YF<br>WF,9*Y9  WF,A*YA  WF,B*YB  WF,C*YC | WD,F*YF  WE,F*YF<br>WF,D*YD  WF,E*YE  WF,F*YF |
| W9,G*YG  WA,G*YG  WB,G*YG  WC,G*YG<br>WG,9*Y9  WG,A*YA  WG,B*YB  WG,C*YC | WD,G*YG  WE,G*YG  WF,G*YG<br>WG,D*YD  WG,E*YE  WG,F*YF  WG,G*YG |

(regions labeled 10 and 4)

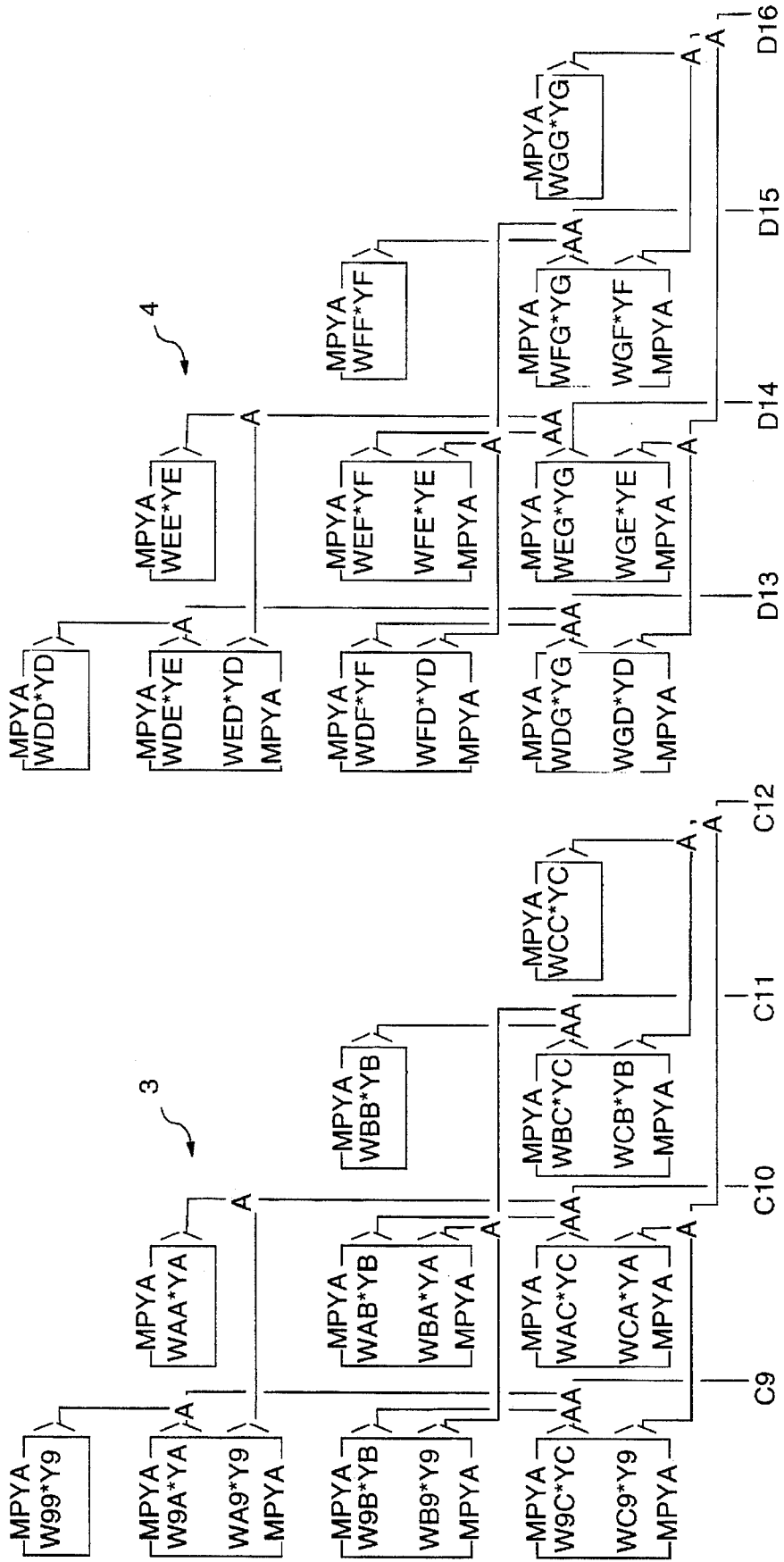

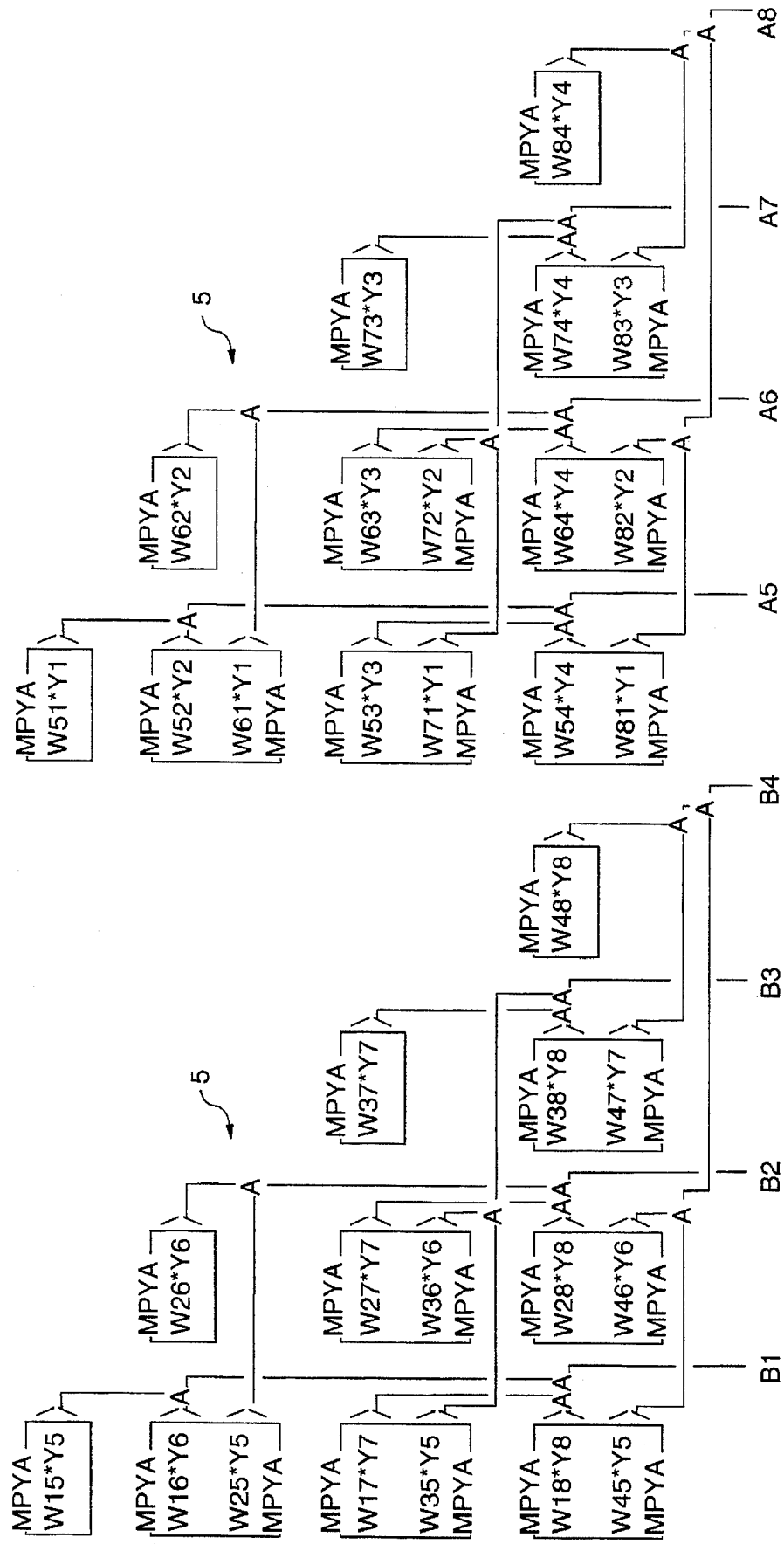

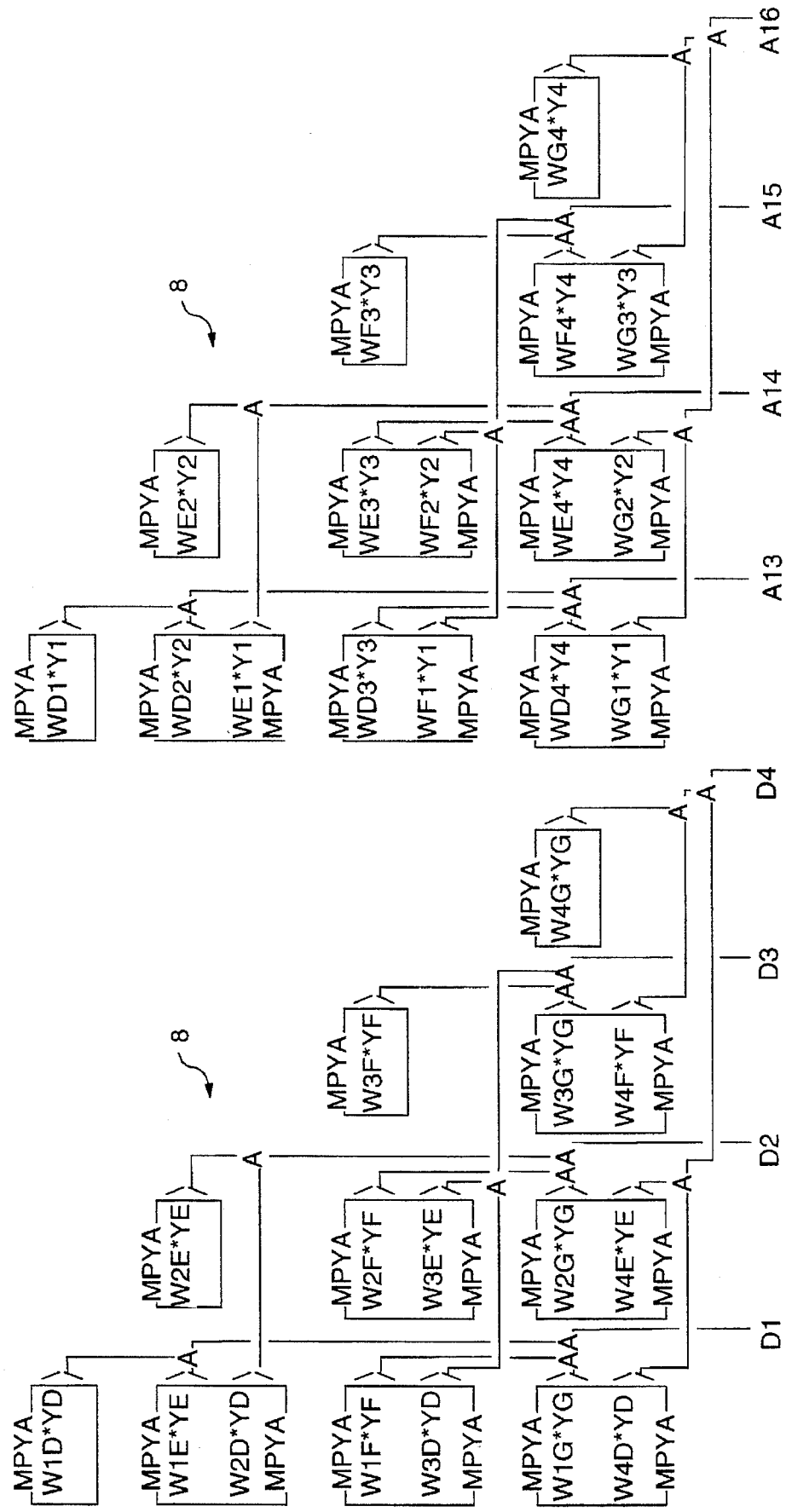

SWITCH POSITION FOR
ALU SUMMATION

SWITCH POSITION FOR
COMMUNICATIONS

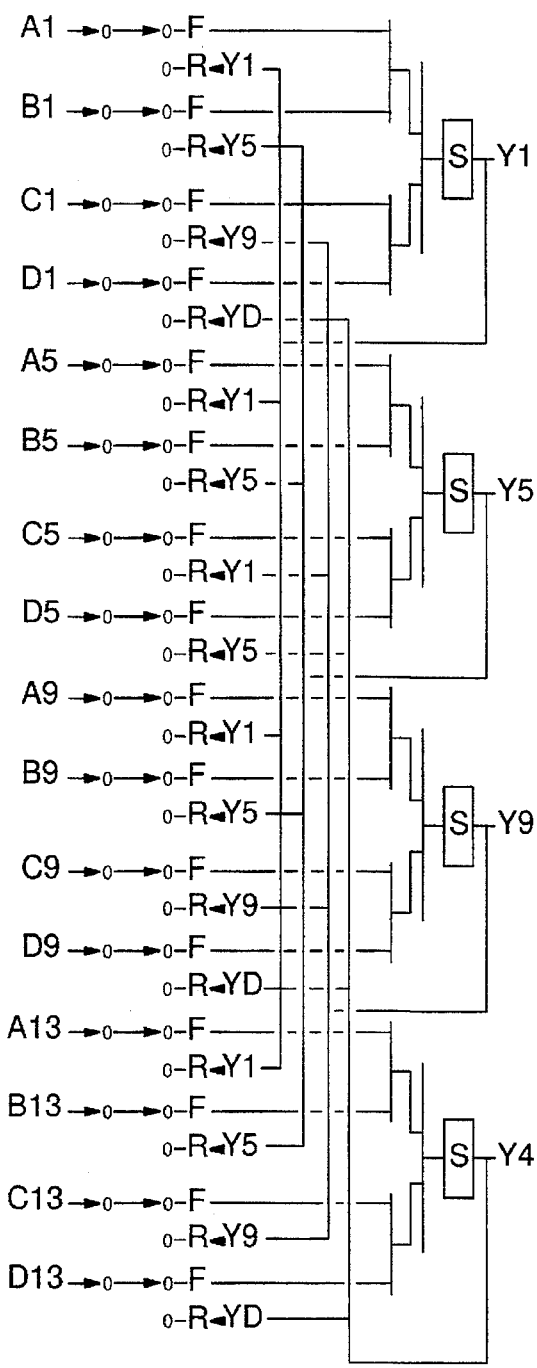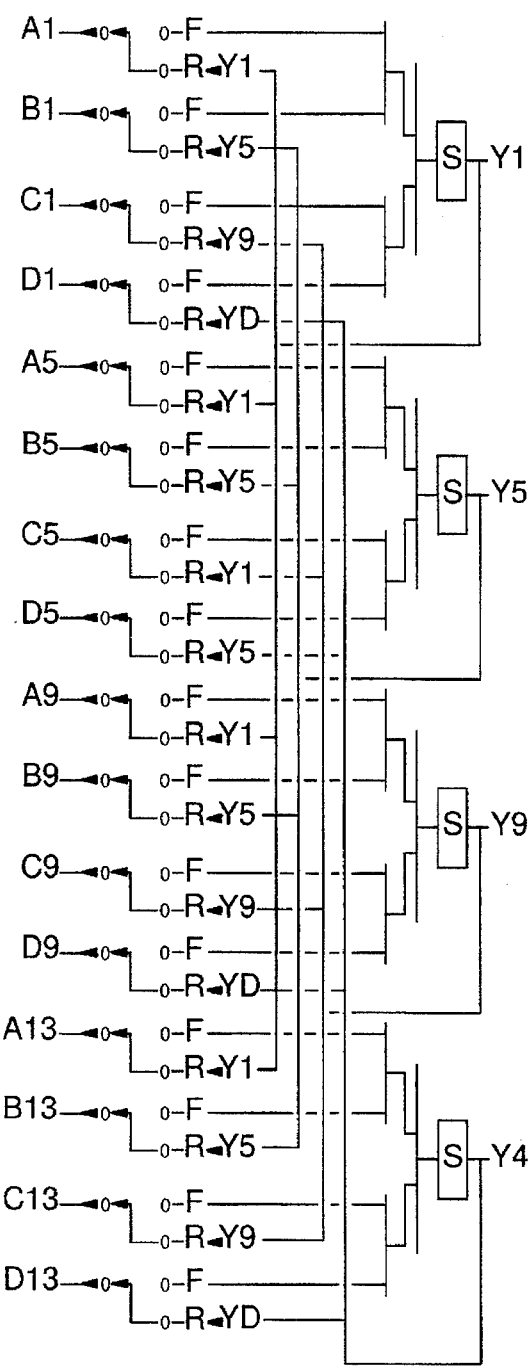
SWITCH POSITION FOR ALU SUMMATION
SWITCH POSITION FOR COMMUNICATIONS
FIG. 23B-1
FIG. 23B-2

PATH POSITION FOR NEURON
INPUT FORWARD ALU SUMMATION

PATH POSITION FOR Y VALUE
REVERSE COMMUNICATIONS

PATH POSITION FOR E VALUE
REVERSE COMMUNICATIONS

PATH POSITION FOR WEIGHTED
ERROR ALU SUMMATIONS

FIG. 25A

| Fig. 25A | Fig. 25B | Fig. 25C | Fig. 25D |

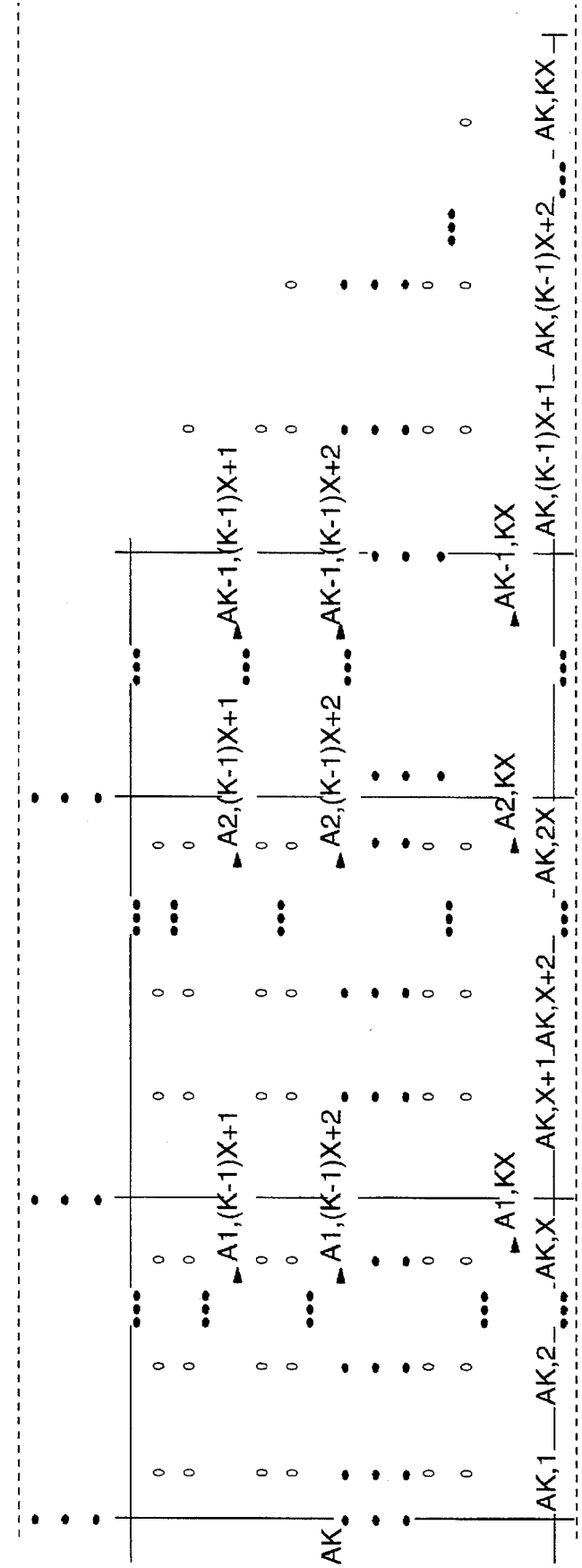

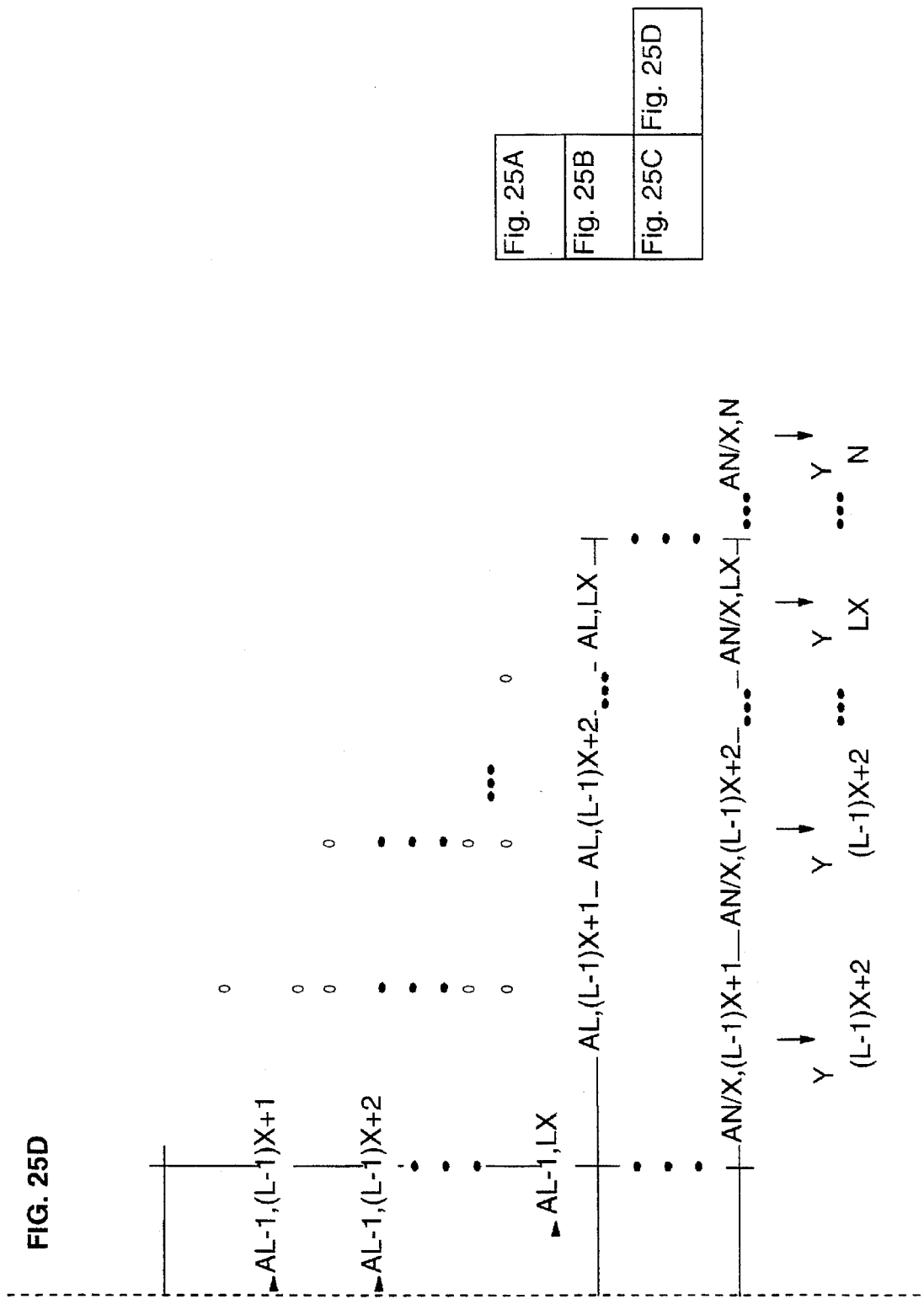

FIG. 31

| | | | | | | |
|---|---|---|---|---|---|---|
| A1,1 | A2,1 | ... | AK,1 | ... | AL,1 | ... | AN/X,1 |
| A1,X+1 | A2,X+1 | ... | AK,X+1 | ... | AL,X+1 | ... | AN/X,X+1 |
| A1,(K-1)X+1 | A2,(K-1)X+1 | ... | AK,(K-1)X+1 | ... | AL,(K-1)X+1 | ... | AN/X,(K-1)X+1 |
| A1,(L-1)X+1 | A2,(L-1)X+1 | ... | AK,(L-1)X+1 | ... | AL,(L-1)X+1 | ... | AN/X,(L-1)X+1 |
| A1,N-X+1 | A2,N-X+1 | ... | AK,N-X+1 | ... | AL,N-X+1 | ... | AN/X,M-X+1 |

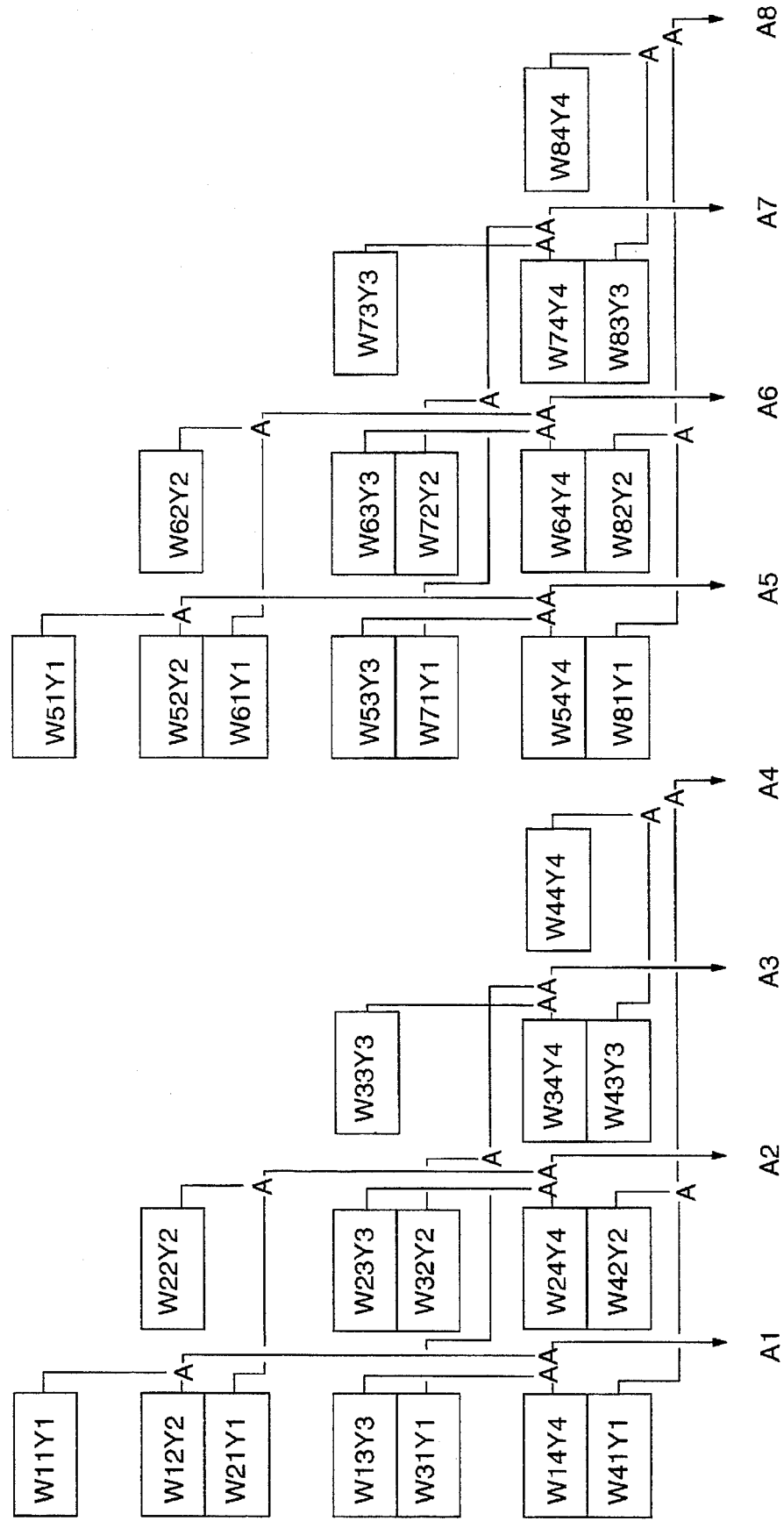

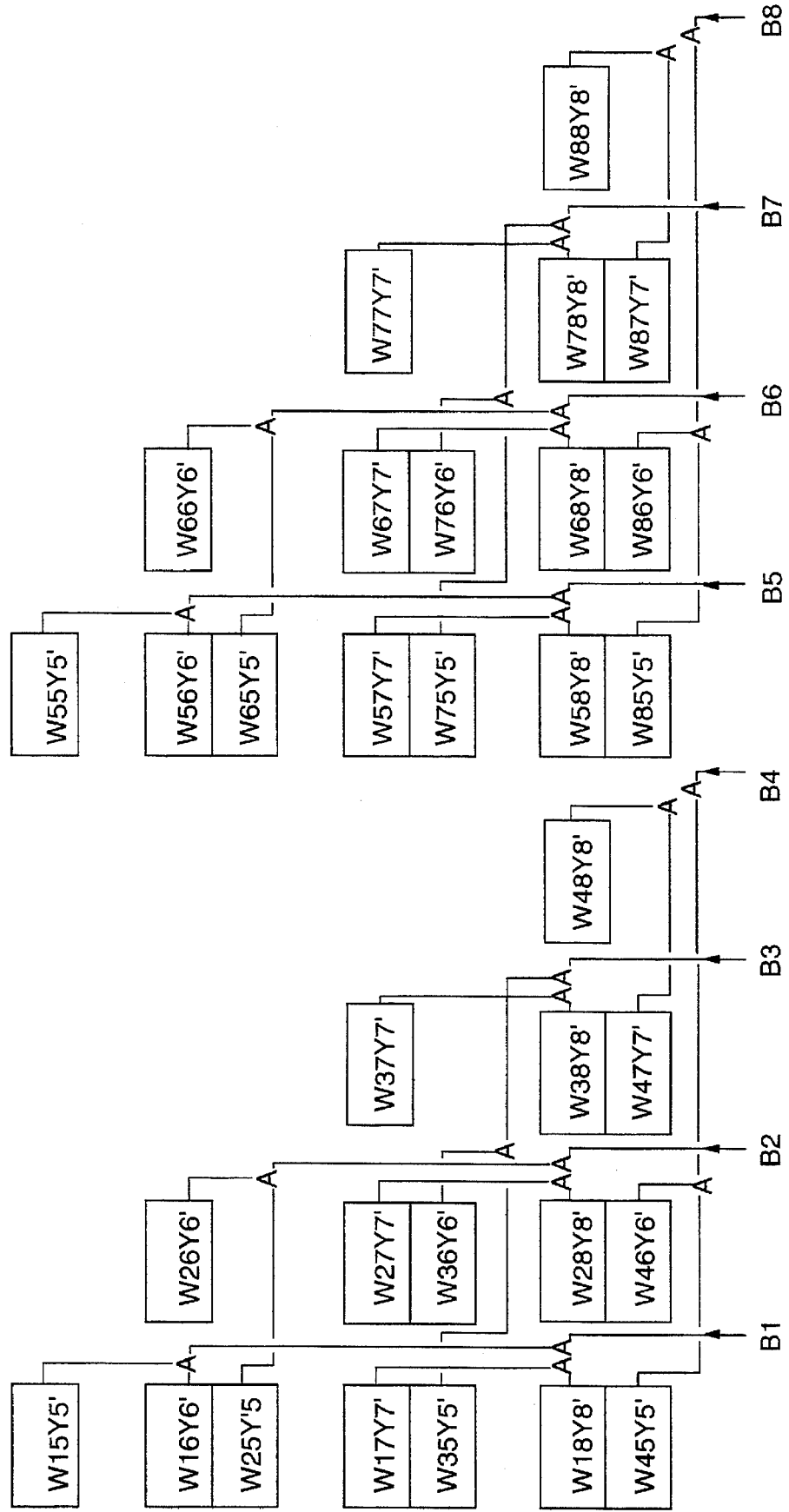

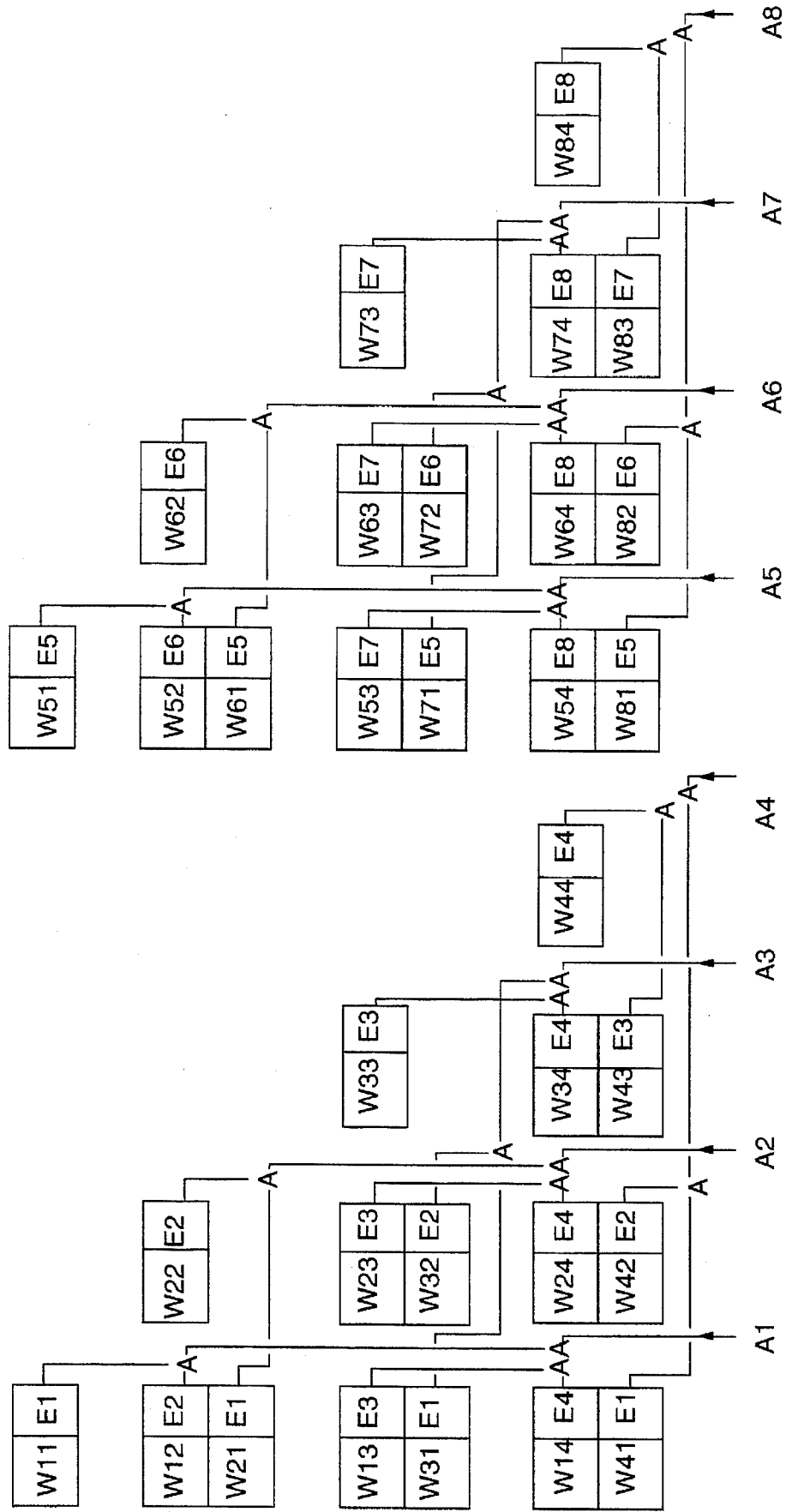

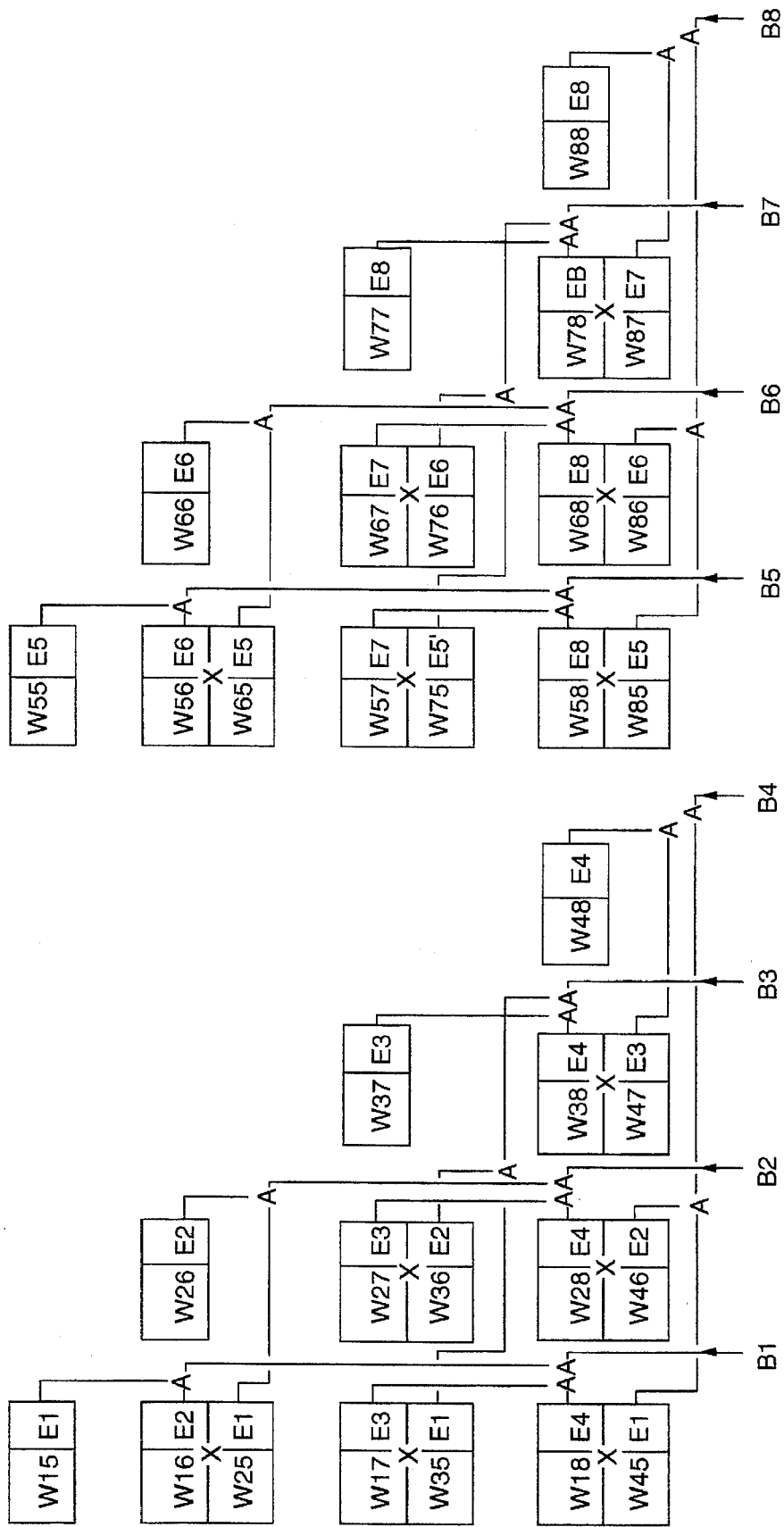

(NOTE THAT FOR A FEED-FORWARD NETWORK ALL FEEDBACK CONNECTIONS ARE ZERO.)

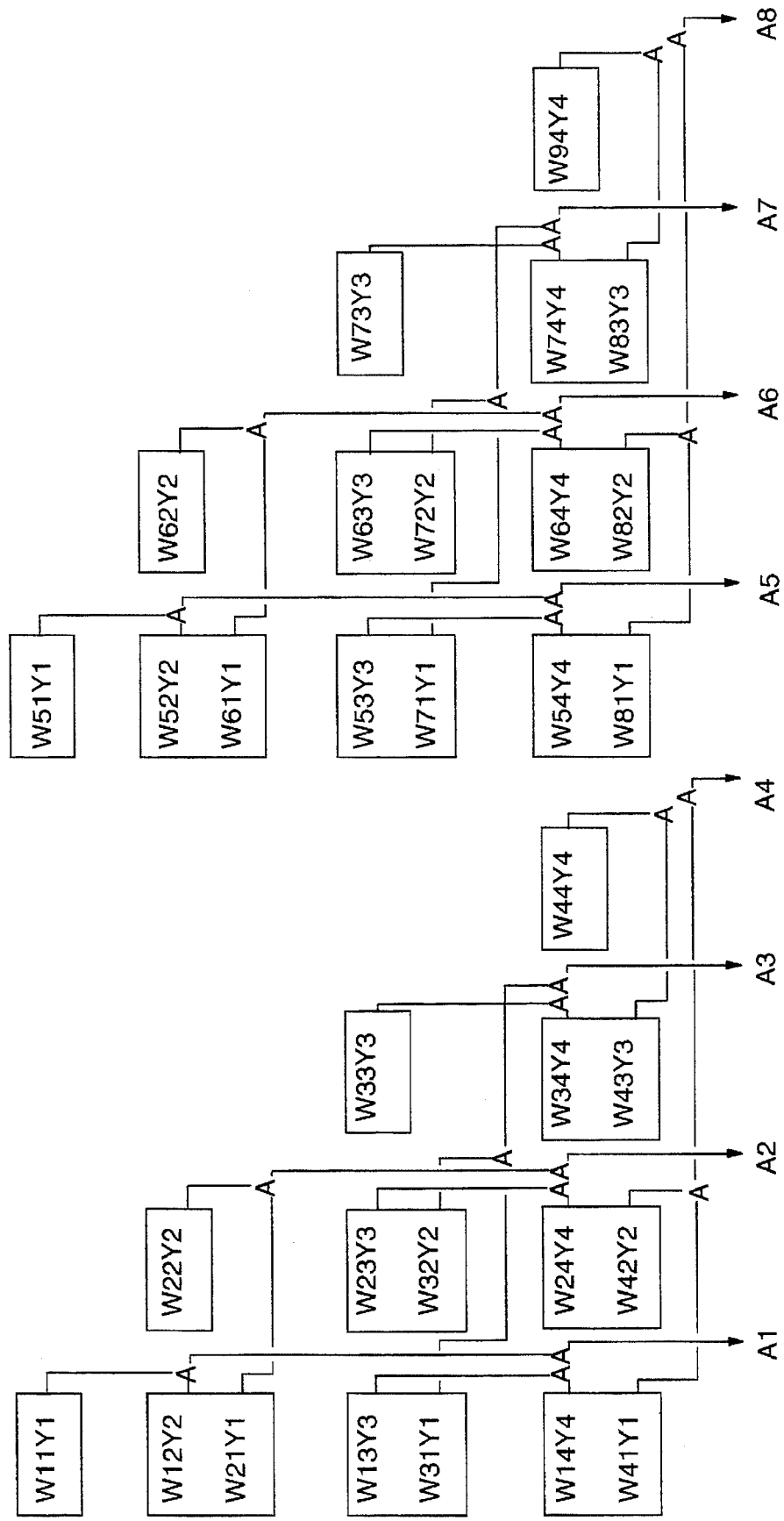

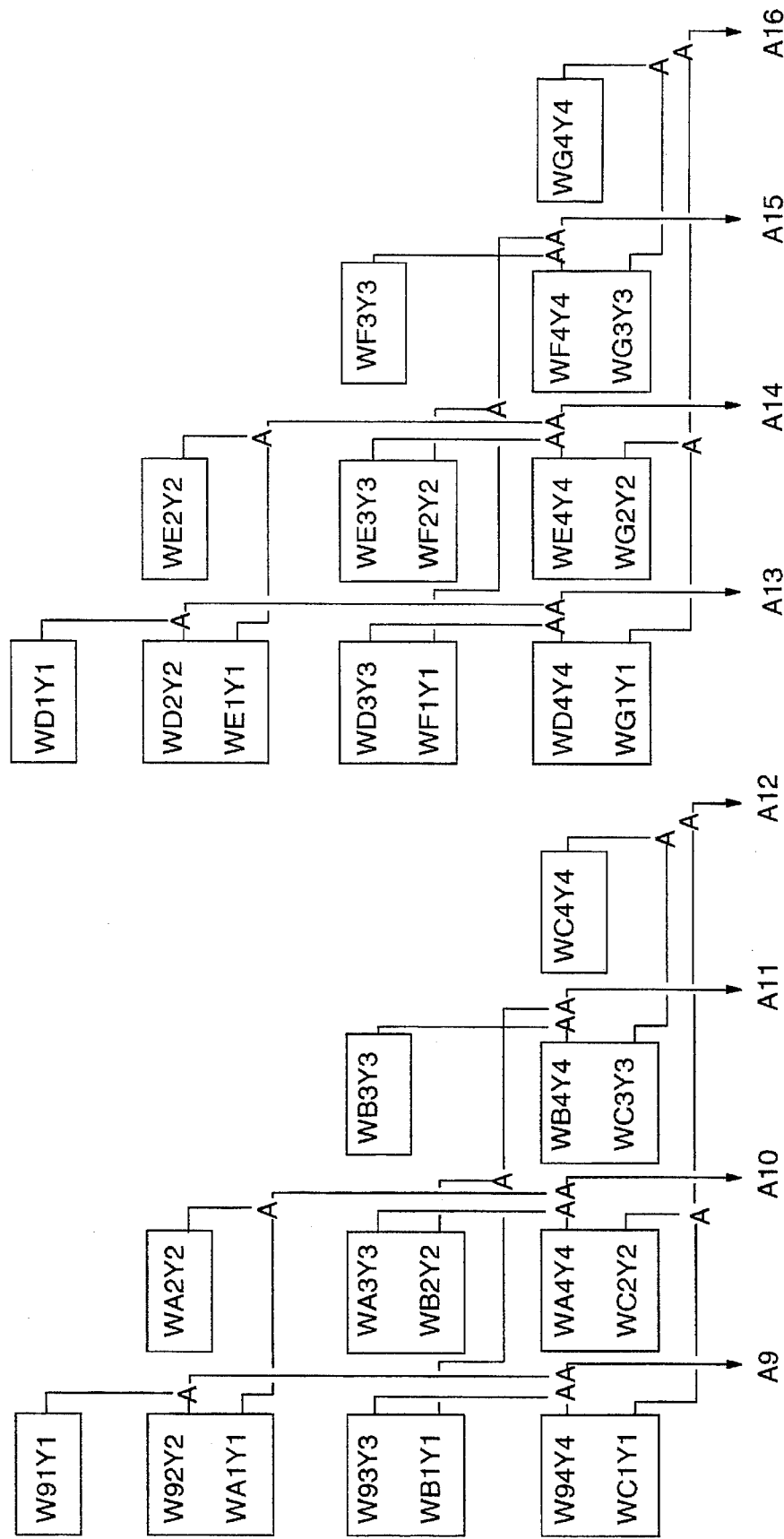

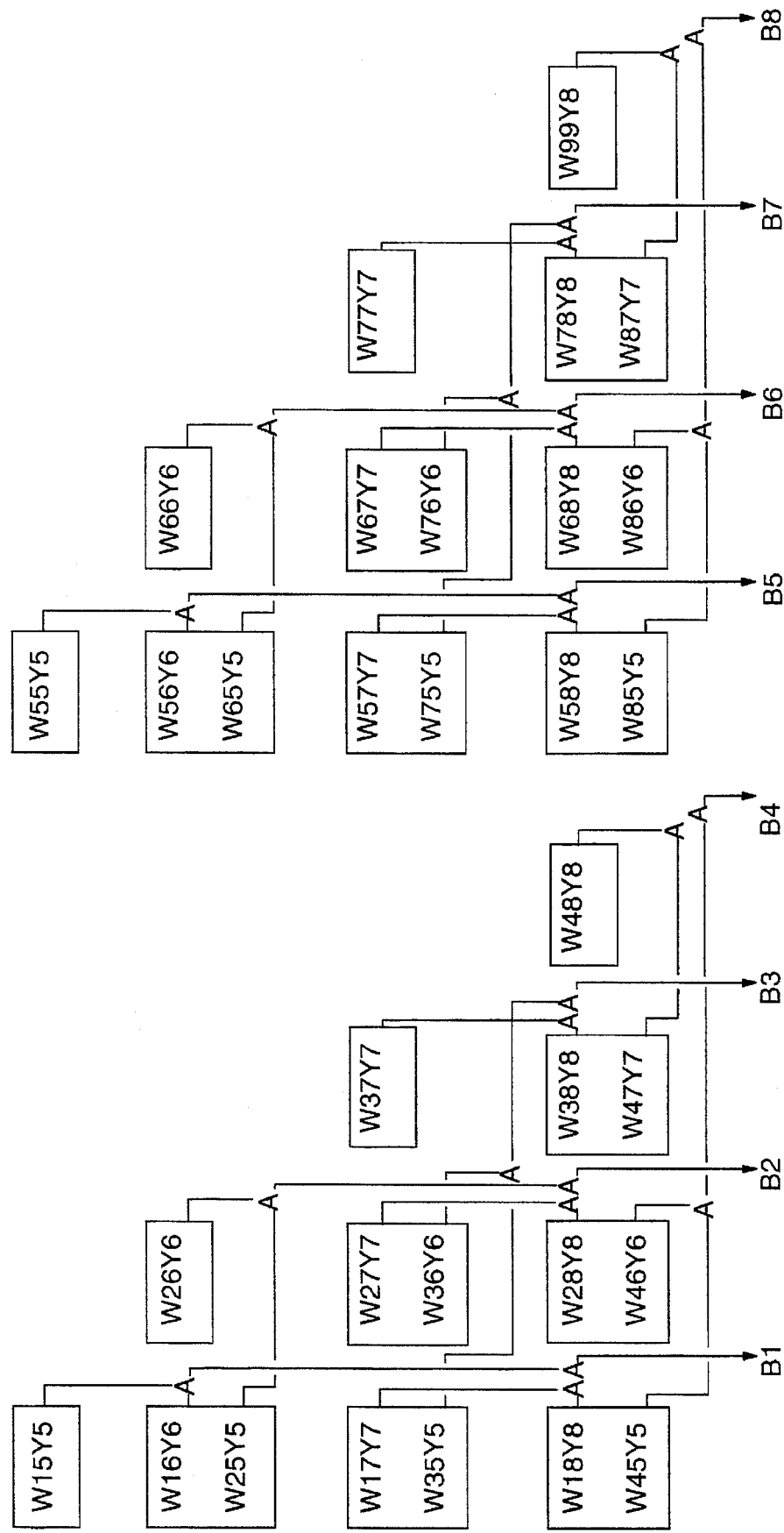

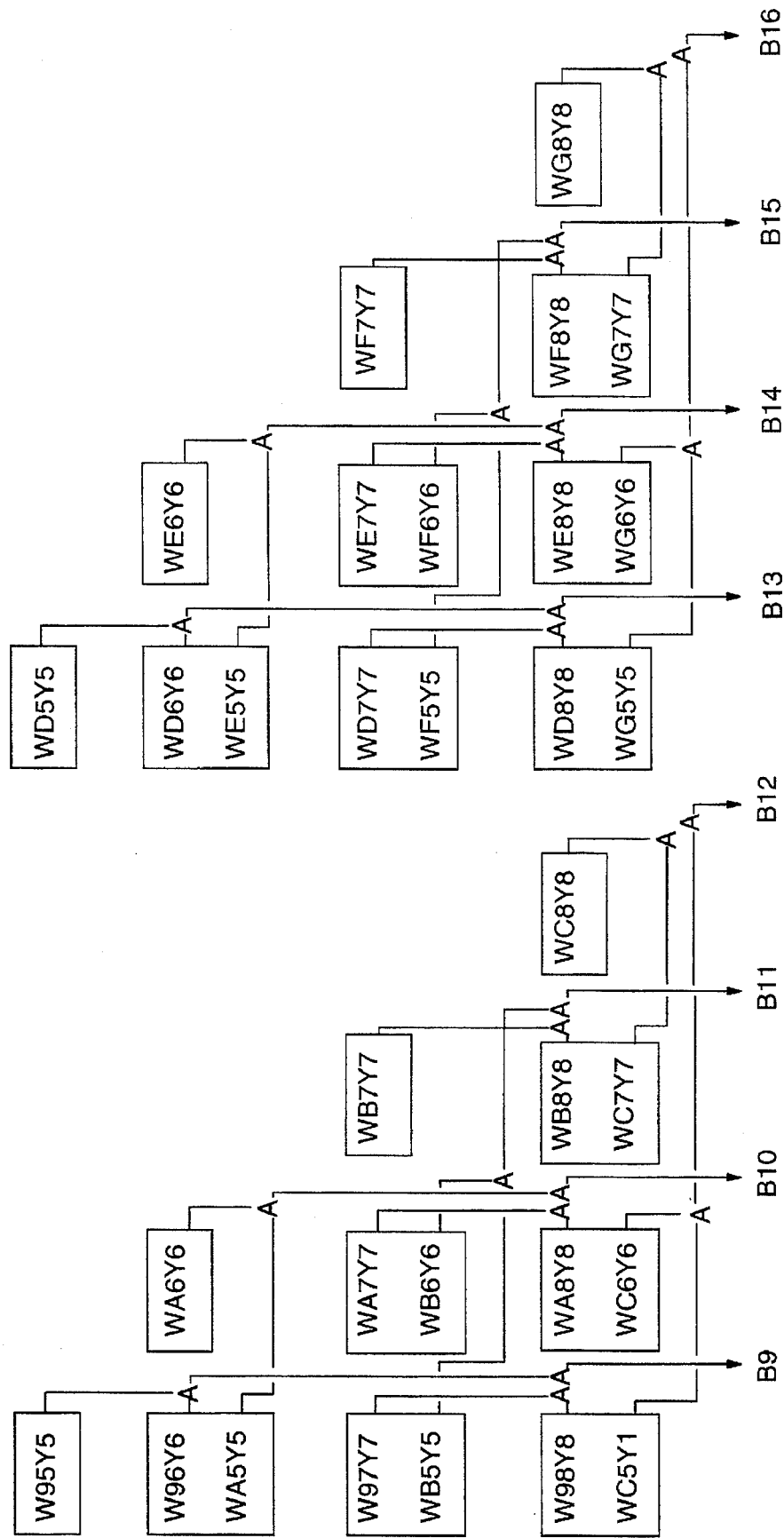

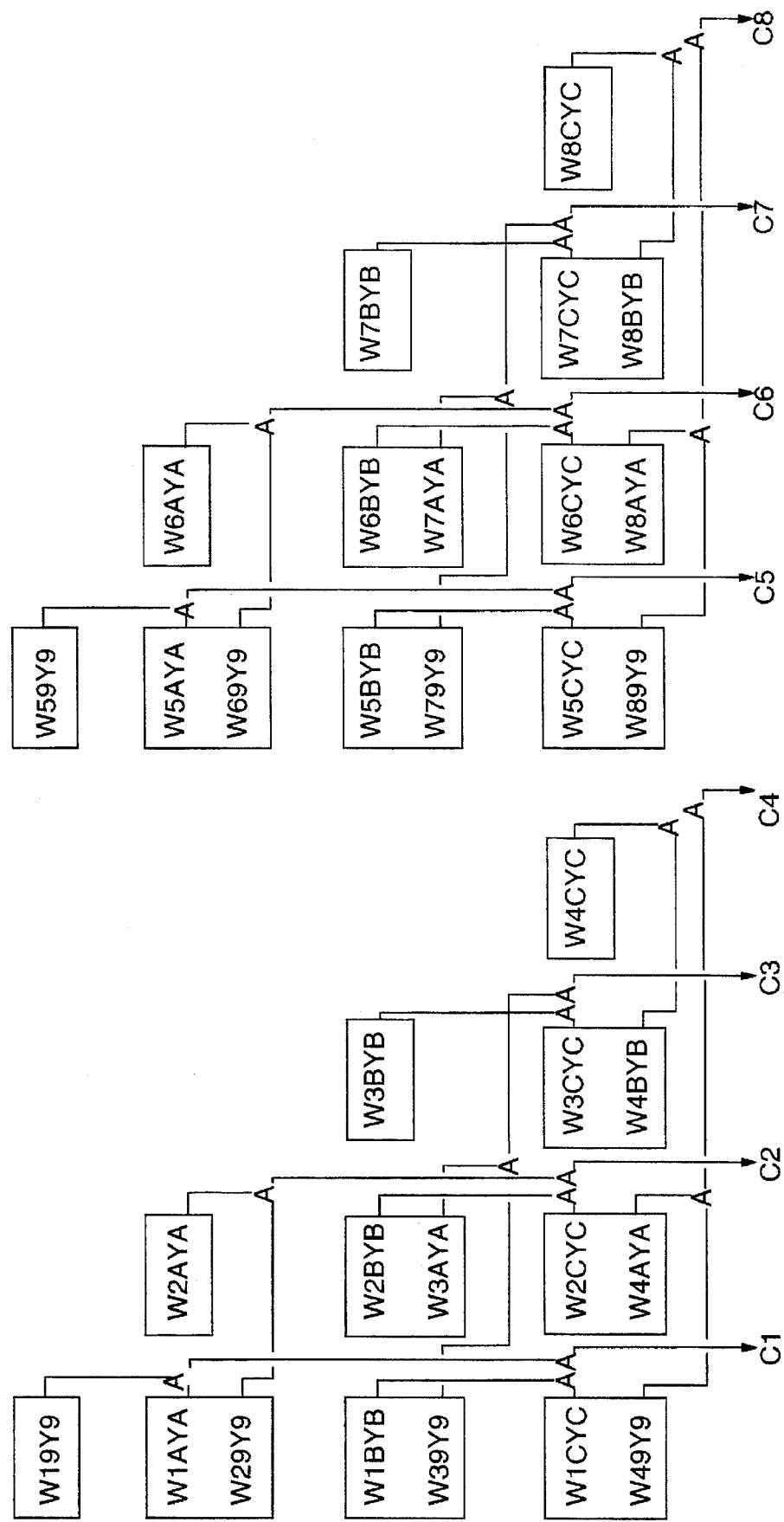

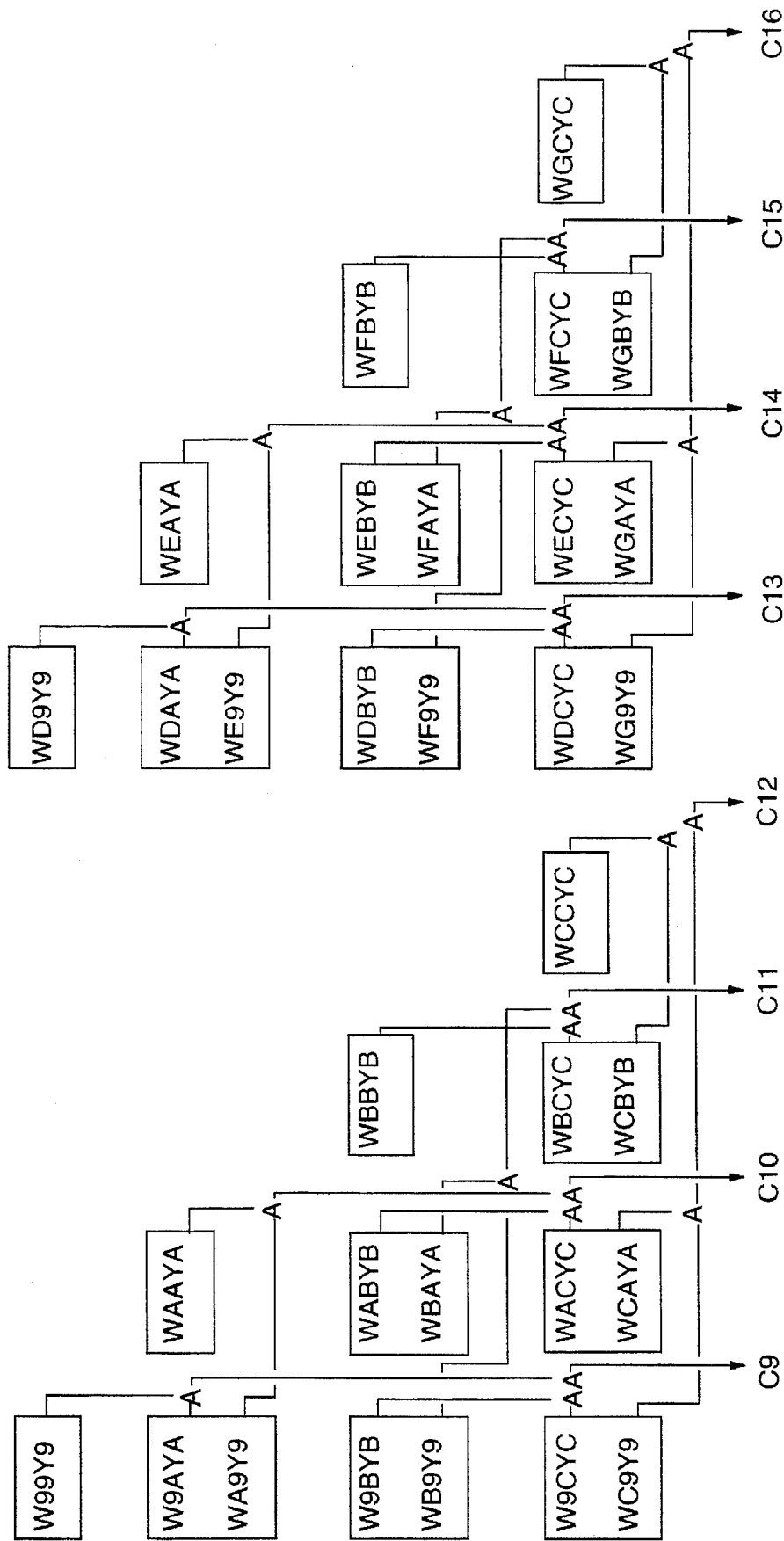

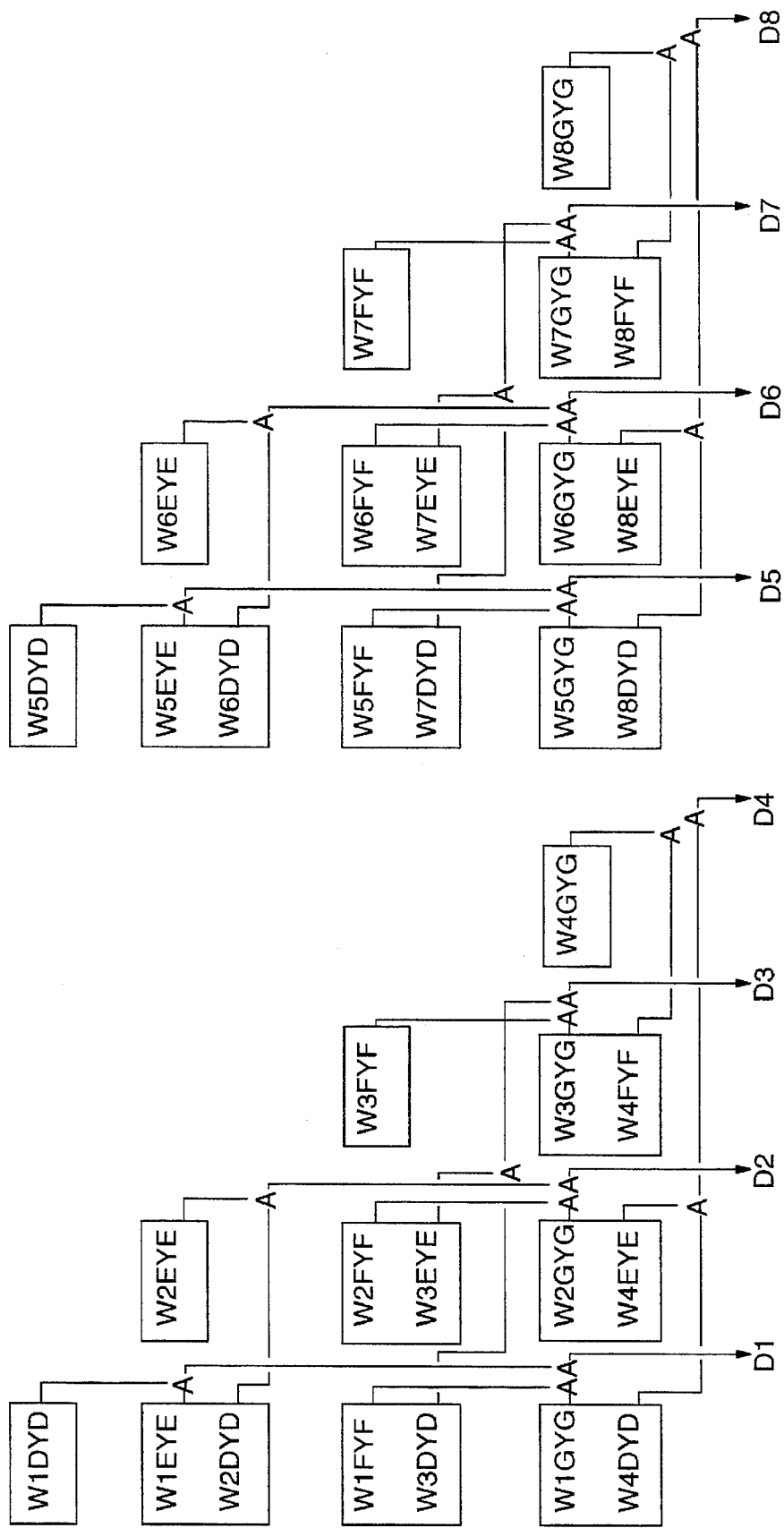

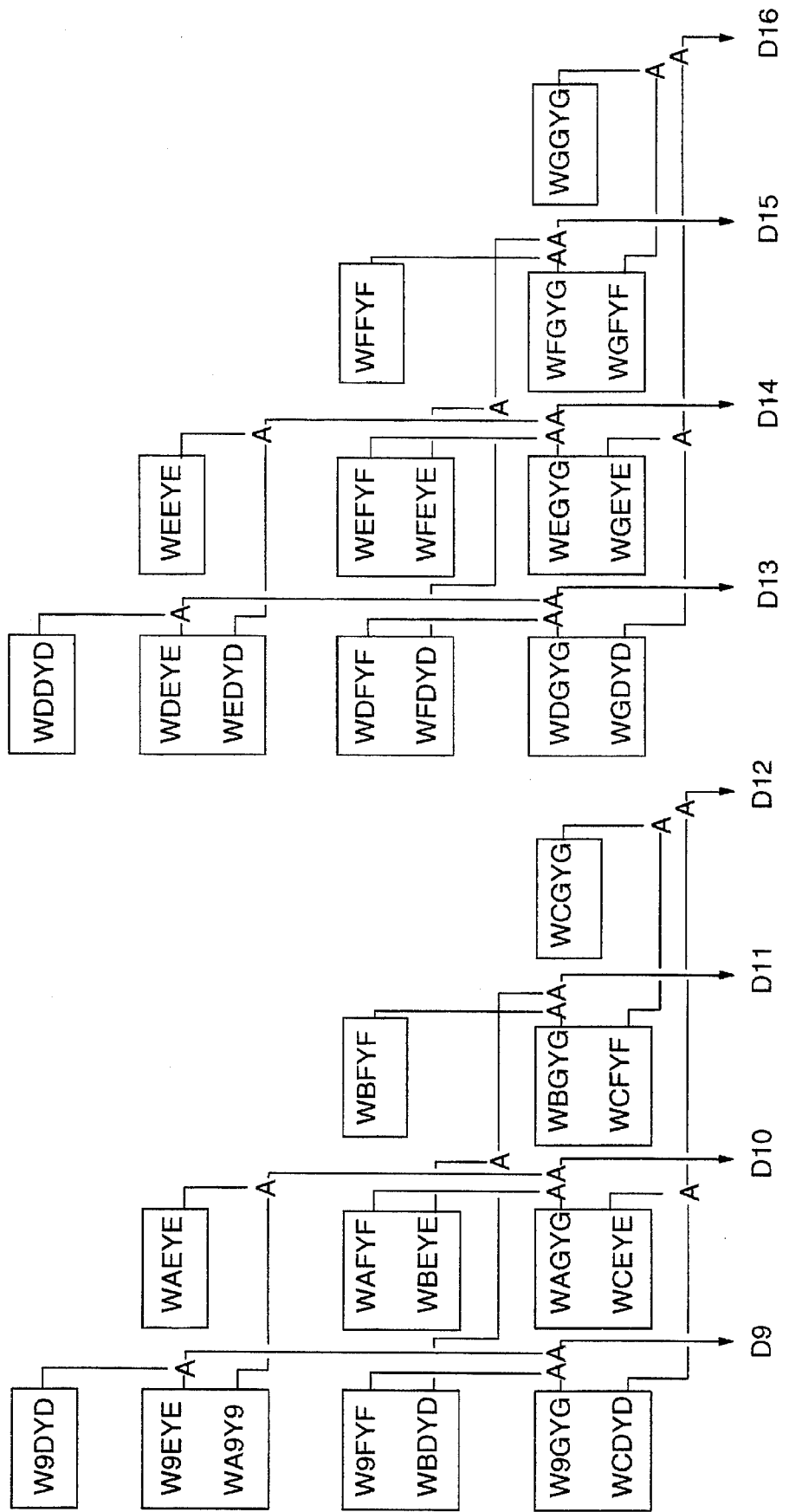

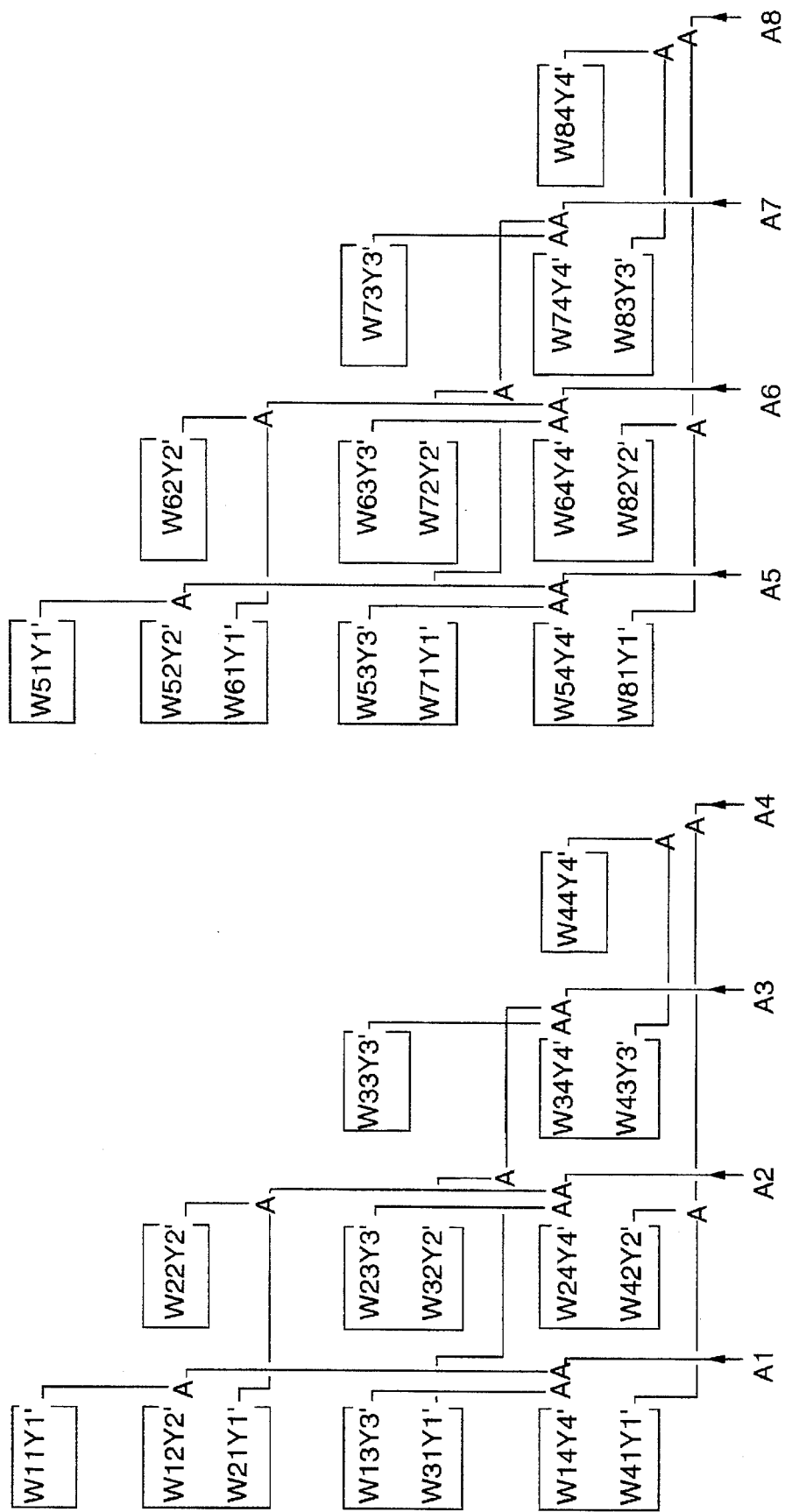

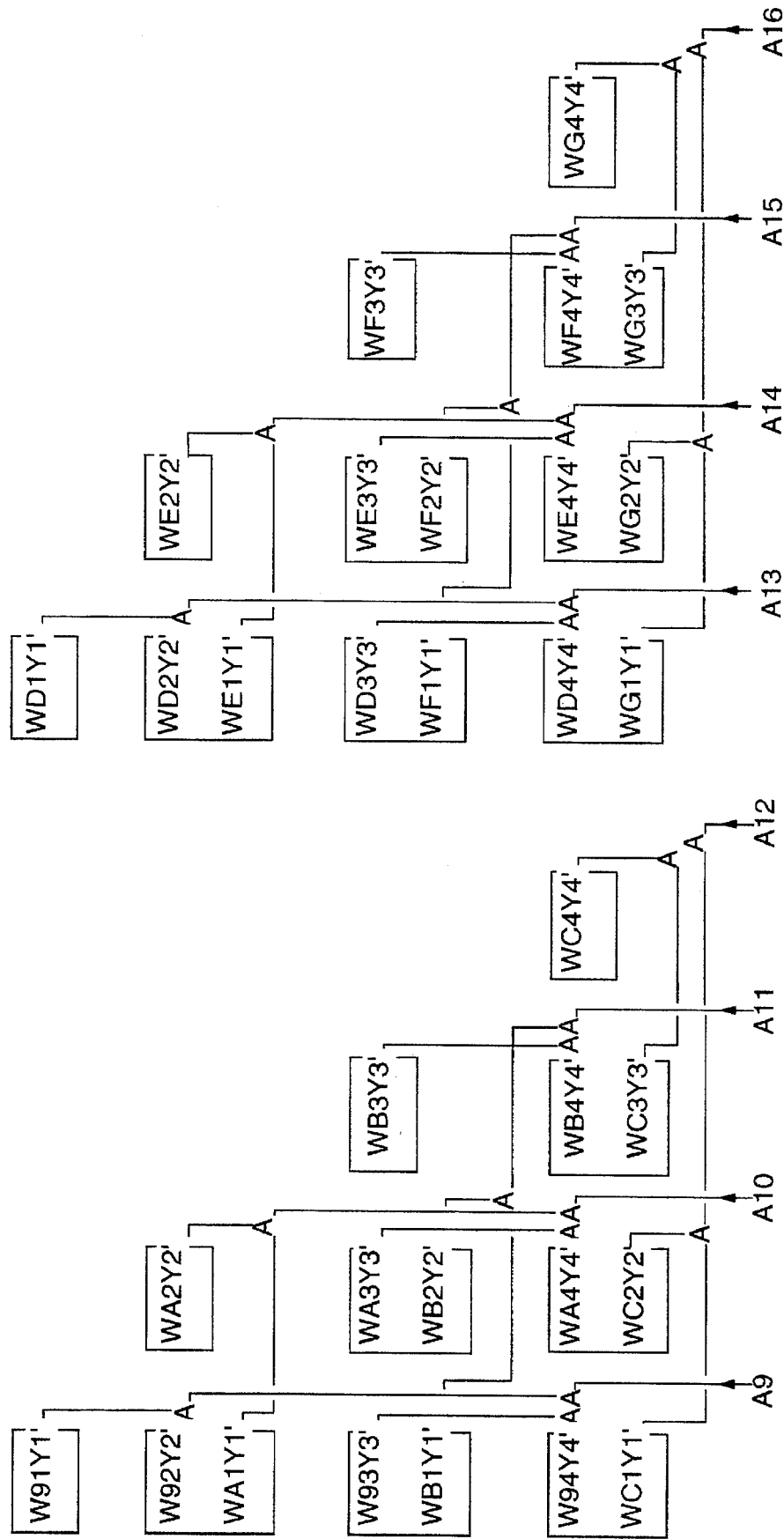

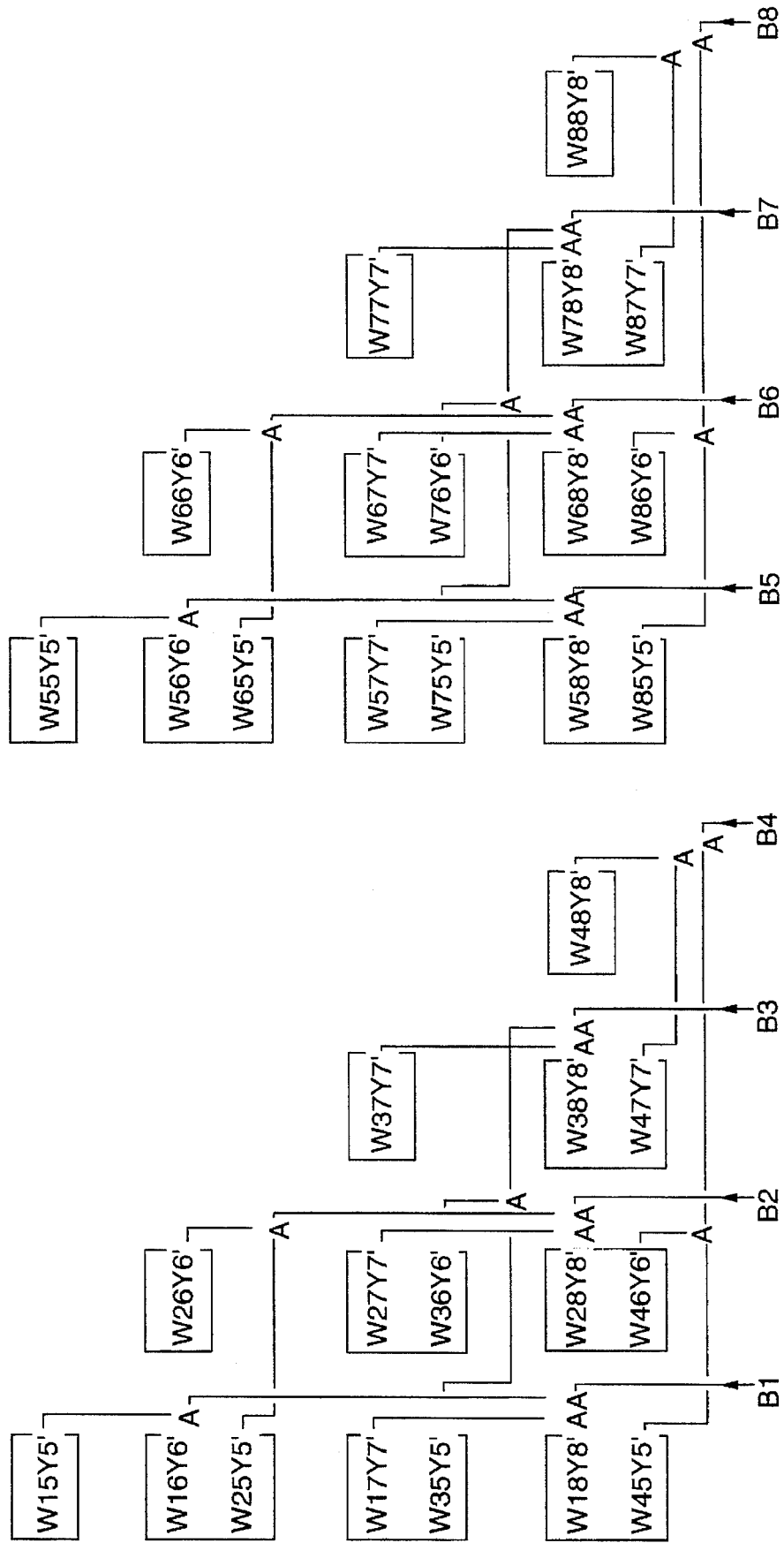

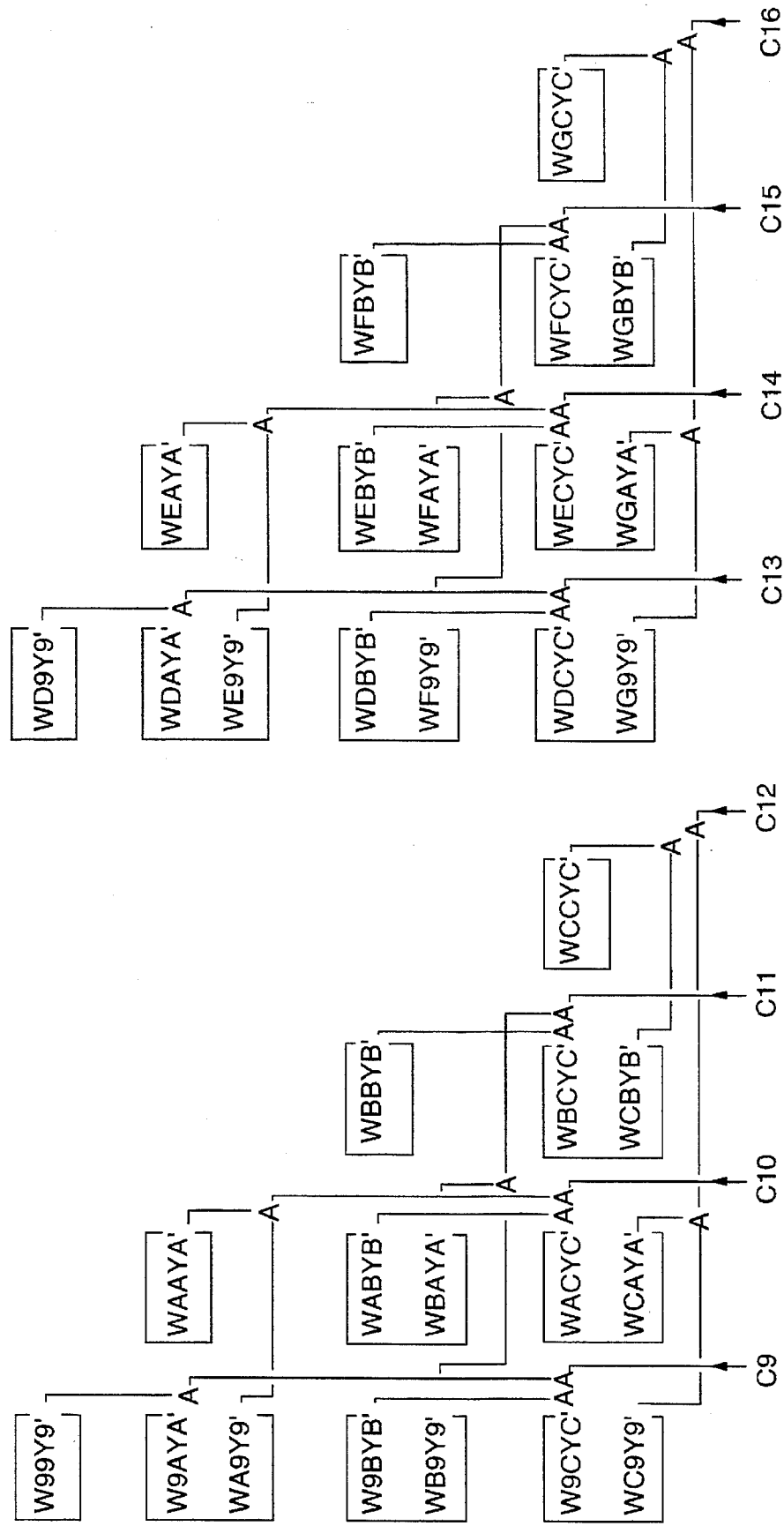

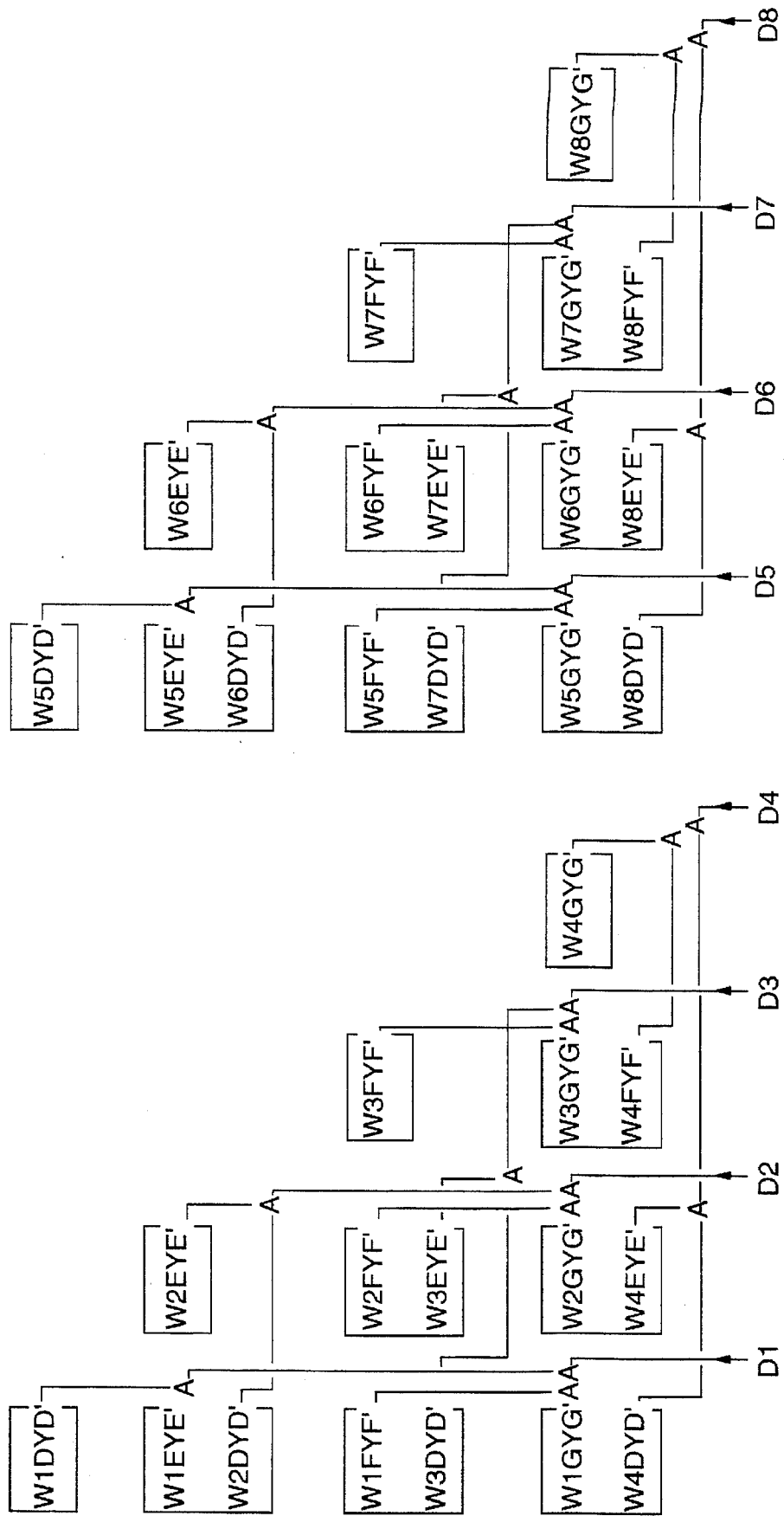

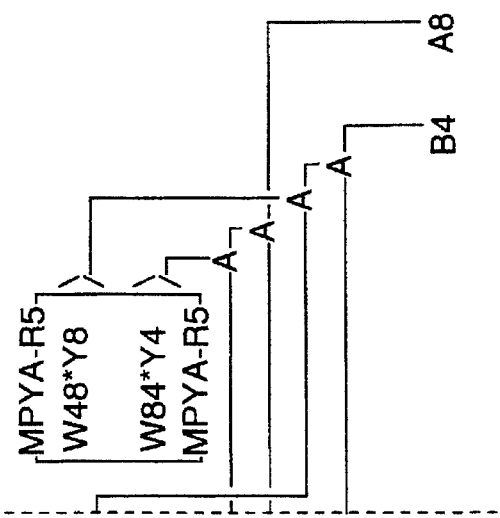

SCALABLE PARALLEL GROUP PARTITIONED DIAGONAL-FOLD SWITCHING TREE COMPUTING APPARATUS

The application is a continuation of application Ser. No. 07/881,594, filed May 12, 1992, now abandoned.

FIELD OF THE INVENTION

This invention relates to computers and particularly to massively parallel array processors.

CROSS REFERENCE TO RELATED APPLICATIONS

The present U.S. patent application claims priority as a continuation-in-part application and is related to the following applications.

U.S. Ser. No. 07/526,866, filed May 22, 1990, of S. Vassiliadis et al, entitled: Orthogonal Row-Column Neural Processor (now U.S. Pat. No. 5,065,339, issued Nov. 12, 1991); and U.S. Ser. No. 07/740,355, filed Aug. 5, 1991, of S. Vassiliadis et al, entitled: Scalable Neural Array Processor issued U.S. Pat. No. 5,146,420 and, U.S. Ser. No. 07/740,556, filed Aug. 5, 1991, of S. Vassiliadis et al, entitled: Adder Tree for a Neural Array Processor abandoned in favor of application Ser. No. 08/000,915, now issued U.S. Pat. No. 5,251,289; and, U.S. Ser. No. 07/740,568, filed Aug. 5, 1991, of S. Vassiliadis et al, entitled: Apparatus and Method for Neural Processor issued U.S. Pat. No. 5,148,515; and, U.S. Ser. No. 07/740,266, filed Aug. 5, 1991, of S. Vassiliadis et al, entitled: Scalable Neural Array Processor and Method issued U.S. Pat. No. 5,148,515; and U.S. Ser. No. 07/682,786, filed Apr. 8, 1991, of G. G. Pechanek et al, entitled: Triangular Scalable Neural Array Processor continued as U.S. Ser. No. 08/231,853, now U.S. Pat. No. 5,509,106; and U.S. Ser. No. 07/681,842, filed Apr. 8, 1991, of G. G. Pechanek et al, entitled: SPIN: A Sequential Pipelined Neurocomputer issued U.S. Pat. No. 5,337,395; and U.S. Ser. No. 07/702,261, filed May 17, 1991, of G. G. Pechanek et al, entitled: A Learning Machine Synapse Processor System Apparatus, now U.S. Pat. No. 5,196,865; and U.S. Ser. No. 07/702,260, filed May 17, 1991, of G. G. Pechanek et al, entitled: Virtual Neurocomputer Architectures for Neural Networks issued U.S. Pat. No. 5,243,688; and U.S. Ser. No. 07/702,262, filed May 17, 1991, of G. G. Pechanek et al, entitled: Scalable Flow Virtual Learning Neurocomputer abandoned in favor of application Ser. No. 08/069,695, now issued U.S. Pat. No. 5,325,464; and U.S. Ser. No. 07/702,263, filed May 17, 1991, of G. G. Pechanek et al, entitled: PLAN: Pyramid Learning Architecture Neurocomputer, issued as U.S. Pat. No. 5,325,464; and U.S. Ser. No. 07/864,112, filed Apr. 6, 1992, of G. G. Pechanek et al, entitled: Massively Parallel Array Processor (now abandoned).

In addition, filed concurrently is a related application:

U.S. Ser. No. 07/881,594 filed May 12, 1992, of G. G. Pechanek et al, entitled: Massively Parallel Diagonal-Fold Tree Array Processor now abandoned in favor of co-pending continuation Ser. application No. 08/496,826.

These applications and the present continuation-in-part application are owned by one and the same assignee, International Business Machines Corporation of Armonk, N.Y.

The descriptions set forth in these above applications are hereby incorporated into the present application.

REFERENCES USED IN THE DISCUSSION OF THE INVENTION

During the detailed description which follows the following works will be referenced as an aid for the reader. These additional references are:

1. U.S. Ser. No. 07/799,602, filed Nov. 27, 1991, by H. Olnowich, entitled: "Multi-Media Serial Line Switching Adapter for Parallel Networks and Hererogenous and Homologous Computer Systems", continued as U.S. Ser. No. 08/390,893, now U.S. Pat. No. 5,535,373.

2. U.S. Ser. No. 07/798,788, filed Nov. 27, 1991, by P.M. Kogge, entitled: "Dynamic Multi-mode Parallel Processor Array Architecture". (Systems which allow dynamic switching between MIMD, SIMD, and SISD), continued as U.S. Ser. No. 08/324,295, now U.S. Pat. No. 5,475,856.

3. D. E. Rumelhart, J. L. McClelland, and the PDP Research Group, *Parallel Distributed Processing Vol. 1: Foundations* Cambridge, Mass. MIT Press 1986. (Herein referred to as "Rumelhart 86".)

4. ORTHOGONAL ROW-COLUMN NEURAL PROCESSOR, S. Vassiliadis, and G. G. Pechanek, U.S. Ser. No. 07/526,866, filed May 22, 1990, now issued as U.S. Pat. No. 5,065,339. (Herein sometimes referred to as "SNAP" or "Vassiliadis SNAP 90".)

5. TRIANGULAR SCALABLE NEURAL ARRAY PROCESSOR, G. G. Pechanek, and S. Vassiliadis, U.S. Ser. No. 07/682,786, filed Apr. 8, 1991 (Herein sometimes referred to as "T-SNAP" or "T-SNAP".), continued as U.S. Ser. No. 08/231,853, now U.S. Pat. No. 5,309,106.

6. SPIN: A SEQUENTIAL PIPELINED NEURO COMPUTER, S. Vassiliadis, G. G. Pechanek, and J. G. Delgado-Frias, U.S. Ser. No. 07/681,842, filed Apr. 8, 1991, now issued as U.S. Pat. No. 5,337,395. (Herein sometimes referred to as "SPIN" or "Vassilliadis 91".)

7. J. J. Hopfield, "Neurons With Graded Response Have Collective Computational Properties Like Those of Two-State Neurons," *Proceedings of the National Academy of Sciences* 81, pp. 3088–3092, May, 1984. (Herein referred to as "Hopfield 84".)

8. U.S. Ser. No. 07/702,262, filed May 17, 1991, of G. G. Pechanek et al, entitled: Scalable Flow Virtual Learning Neurocomputer, now issued as U.S. Pat. No. 5,329,611).

9. U.S. Ser. No. 07/702,261, filed May 17, 1991, of G. G. Pechanek et al, entitled: A Learning Machine Synapse Processor System Apparatus, now U.S. Pat. No. 5,196,865.

10. U.S. Ser. No. 07/702,260, filed May 17, 1991, of G. G. Pechanek et al, entitled: Virtual Neurocomputer Architectures for Neural Networks, now issued as U.S. Pat. No. 5,243,688.

11. H. Hellerman, *Digital Computer System Principles* New York, N.Y.: McGraw-Hill Book Company, pp. 346–348, 1967. (Herein referred to as "Hellerman 67".)

12. U.S. Ser. No. 07/881,597 filed May 12, 1992, of G. G. Pechanek et al, entitled: Massively Parallel Diagonal-Fold Tree Array Processor, filed concurrently herewith. (Herein sometimes referred to as DIAGONAL-FOLD TREE 92), continuation as U.S. Ser. No. 08/415,775.

These additional references are incorporated by reference.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. Multiple computers operating in parallel have existed for decades. Early parallel machines included the ILLIAC which was started in the 1960s. Other multiple processors include (see a partial summary in U.S. Pat. No. 4,975,834 issued Dec. 4, 1990 to Xu etal) the Cedar, Sigma-1, the Butterfly and the Monarch, the Intel ipsc, The Connection Machines, the Caltech COSMIC, the N Cube, IBM's RP3, IBM's GF11, the NYU Ultra Computer, the Intel Delta and Touchstone.

Large multiple processors beginning with ILLIAC have been considered supercomputers. Supercomputers with greatest commercial success have been based upon multiple vector processors, represented by the Cray Research Y-MP systems, the IBM 3090, and other manufacturer's machines including those of Amdahl, Hitachi, Fujitsu, and NEC.

Massively Parallel (MP) processors are now thought of as capable of becoming supercomputers. These computer systems aggregate a large number of microprocessors with an interconnection network and program them to operate in parallel. There have been two modes of operation of these computers. Some of these machines have been MIMD mode machines. Some of these machines have been SIMD mode machines. Perhaps the most commercially acclaimed of these machines has been the Connection Machines series 1 and 2 of Thinking Machines, Inc. These have been essentially SIMD machines. Many of the massively parallel machines have used microprocessors interconnected in parallel to obtain their concurrency or parallel operations capability. Intel microprocessors like i860 have been used by Intel and others. N Cube has made such machines with Intel '386 microprocessors. Other machines have been built with what is called the "transputer" chip. Inmos Transputer IMS T800 is an example. The Inmos Transpurer T800 is a 32 bit device with an integral high speed floating point processor.

As an example of the kind of systems that are built, several Inmos Transpurer T800 chips each would have 32 communication link inputs and 32 link outputs. Each chip would have a single processor, a small amount of memory, and communication links to the local memory and to an external interface. In addition, in order to build up the system communication link adaptors like IMS C011 and C012 would be connected. In addition switches, like a IMS C004 would be profired to provide, say, a crossbar switch between the 32 link inputs and 32 link outputs to provide point to point connection between additional transputer chips. In addition, there will be special circuitry and interface chips for transputers adapting them to be used for a special purpose tailored to the requirements of a specific device, a graphics or disk controller. The Inmos IMS M212 is a 16 bit processor, with on chip memory and communication links. It contains hardware and logic to control disk drives and can be used as a programmable disk controller or as a general purpose interface. In order to use the concurrency (parallel operations) Inmos developed a special language, Occam, for the transputer. Programmers have to describe the network of transputers directly in an Occam program.

Some of these MP machines use parallel processor arrays of processor chips which are interconnected with different topologies. The transputer provides a crossbar network with the addition of IMS C004 chips. Some other systems use a hypercube connection. Others use a bus or mesh to connect the microprocessors and their associated circuitry. Some have been interconnected by circuit switch processors that use switches as processor addressable networks. Generally, as with the 14 RISC/6000s which were interconnected last fall at Lawarence Livermore by wiring the machines together, the processor addressable networks have been considered as coarse-grained multiprocessors.

Some very large machines are being built by Intel and nCube and others to attack what are called "grand challenges" in data processing. However, these computers are very expensive. Recent projected costs are in the order of $30,000,000.00 to $75,000,000.00 (Tera Computer) for computers whose development has been funded by the U.S. Government to attack the "grand challenges". These "grand challenges" would include such problems as climate modeling, fluid turbulence, pollution dispersion, mapping of the human genome and ocean circulation, quantum chromodynamics, semiconductor and supercomputer modeling, combustion systems, vision and cognition.

Problems addressed by our Scalable MP Group Partitioned Diagonal-Fold Switching Tree Apparatus One problem area involved in the implementation of a massively parallel processing system is the processor interconnection mechanism and scalability. This problem for massively parallel array processors to attack adequately the interconnection and scalability problems which exist in massively parallel computing systems has been addressed as we will describe. By way of a completely connected neural network model our preferred computing apparatus is described demonstrating a scalable and completely connected computing apparatus suitable for other general purpose applications.

During the detailed discussion of our invention, we will reference other work including our own unpublished works, as mentioned above. These background literature references are incorporated herein by reference.

SUMMARY OF OUR INVENTION

We have provided a Scalable Massively Parallel Group Partitioned Diagonal-Fold Switching Tree Computing Apparatus which is also referred to as the Switching-Tree provides a scalable interconnection switching apparatus that maintains complete connectivity of the Root Tree Processors attached to the Diagonal-Fold Trees. The apparatus contains N Root Tree Processors, N Diagonal-Fold Trees, and $N^2$ Processing Elements (PEs). A completely connected neural network model will be used to demonstrate the scalability and complete connectivity of the Switching-Tree Computer and suitability of the structure as a massively parallel processor with general purpose capabilities. In accordance with our invention, we have provided an organization of PEs that can be partitioned into groups of PEs based upon technology or application constraints. Each group has multiple PEs that contain instruction and data storage units, receive instructions and data, and execute instructions, and may interface with external storage for instructions and data. The switching tree computing apparatus does not preclude special purpose data processor PEs, such as multiplier elements used in TSNAP. The groups of PEs also execute a special type of "group" instructions and each PE interfaces with a communicating ALU trees. For neural applications, the N Root Tree Processors emulate the neuron operations, supporting, either in program code or hardware, the neuron activation functions, e.g. a sigmoid generator, and the Switching-Tree provides for interconnecting the groups and PEs into an N neuron structure for communicating both instructions, data, and the outputs of the neuron activation function units back to the input Processing Elements by way of the communicating ALU trees. The processor groups are used to create a high performance general purpose computing apparatus which maintains complete connectivity of the Root Tree Processors by way of their interconnected PEs.

These and other improvements are set forth in the following detailed description. For a better understanding of the invention, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS.

FIGS. (1A–1D) show the Processor Element Architecture.

FIG. 2 is divided into FIGS. 2A, 2B and 2C for convenience.

FIG. 3 shows a Triangular Array of Dimension K.

FIG. 5 is divided into FIGS. 5A and 5B.

FIG. 6 is divided into FIGS. 6A and 6B.

FIG. 7 is divided into FIGS. 7A and 7B.

FIG. 8 is divided into FIGS. 8A and 8B for convenience.

FIG. 9 is divided into FIGS. 9A and 9B for convenience.

FIGS. 10A–10C show the inner square of the 8 neuron array model. FIG. 10 is divided into FIGS. 10A, 10B and 10C.

FIGS. 11A and 11B show the folded inner square separated into two triangular arrays. FIG. 11 is divided into FIGS. 11A and 11B.

FIG. 12 shows a preferred external ALU function, sigmoid emulation, and tree communications path.

FIG. 13 shows a 16 neuron array model weight matrix with neuron Y values. FIG. 13, is divided into FIGS. 13A and 13B for convenience.

FIG. 15A and 15B show triangular arrays 3 and 4.

FIG. 16A and 16B show a folded inner square 5 separated into two triangular arrays.

FIG. 19A and 19B show a folded inner square 8 separated into two triangular arrays.

FIGS. 23A and 23B illustrate a switching tree mechanism: 8 and 16 neuron examples. FIG. 23 is divided into FIGS. 23A and 23B.

FIG. 24 is divided into FIGS. 24A, 24B, 24C and 24D for convenience.

FIG. 25 is divided into FIGS. 25A, 25B, 25C and 25D for convenience.

FIG. 29 is divided into FIGS. 29A and 29B for convenience.

FIG. 31 illustrates the Square Array of First Outputs From the Triangular Arrays.

FIG. 35 is divided into FIGS. 35A, 35B and 35C for convenience.

FIG. 36 is divided into FIGS. 36A, 36B and 36C for convenience.

FIG. 37 is divided into FIGS. 37A, 37B and 37C for convenience.

FIG. 39 shows a Sixteen Neuron Structure (N=16, G=16, H=16) Mode 1: Forward ALU Tree Summation. FIG. 39 is divided into FIGS. 39A through 39I for convenience.

FIG. 40 shows a Sixteen Neuron Structure (N=16, G=16, H=16) Mode 2: Y Reverse Communication. FIG. 40 is divided into FIGS. 40A through 40I for convenience.

FIG. 41 is divided into FIGS. 40A and 40B for convenience.

(Note: For convenience of illustration, FIGURES may be separated in parts and as a convention we place the top of the FIGURE as the first sheet, with subsequent sheets proceeding down when viewing the FIGURE, in the event that multiple sheets are used.)

Our detailed description follows as parts explaining our preferred embodiments of our invention provided by way of example.

DETAILED DESCRIPTION OF THE INVENTION

Before considering our preferred embodiments, it may be worthwhile to introduce some common features which are used in illustrating our preferred embodiments.

1. Introduction

The scalable massively parallel group partitioned diagonal-fold switching tree computing apparatus is described by way of a neural emulation example. For neural emulation the neuron model to be employed must be described. Consequently, the following neuron definition is provided. The neuron function is modified from the previously assumed form—SEE SNAP 90, TSNAP 90, and SPIN 90—to the form described in, equation 1. The change has been the addition of a term $Ex_i$ which represents the external input to a neuron processing element.

$$Y_i = F\left(\sum_{j=1}^{N} W_{ij}Y_j + Ex_i\right) \quad (1)$$

In many feed-forward neural networks only the input layer of neurons use an external input. Rumelhart 86, characterizes three types of units; input, output and hidden. Input units receive inputs from sources external to the system. The output units send signals out of the system. Hidden units are those whose only inputs and outputs are within the system. In some models the output level is exactly equal to the activation level of a unit. The input neurons of a feedforward network take on an identity activation/output function, where $Y_1 = Ex_1$, rather than the sigmoid function as do the other neurons in the neural network. A sigmoid function can be used instead for the input neurons, allowing all neurons to posses the same activation function, by extending the range of $Ex_i$ to $-A \leq Ex_i \leq +A$, where—A will equate to $Y_i=0$ and +A will equate to $Y_i=1$ assuming the case where $Ex_i$ is the only input to a neuron. Within some acceptable range of error, the input neurons can be forced to a "0" or a "1" state via use of the external input $Ex_i$. The $Ex_i$ for the other neurons in the network can be equated to zero if not required.

The neuron activation function $F(z_i)$ is set equal to a sigmoid function whose form, for example, is:

$$Y_i = F(z_i) = \frac{1}{\left(1 + e^{-\frac{2z_i}{T}}\right)} \quad (2)$$

Where:
e=Natural Log (2.71-828. . . )
For the function $F(z_i)$:

$$z_i = \sum_{j=1}^{N} W + Y_j + Ex_i \quad (3)$$

$0 \leq F(z_i) \leq 1$

T is a global control parameter used to modify the slope of the sigmoid function for a given set of $z_i$ values.

Figures 1, 23A:
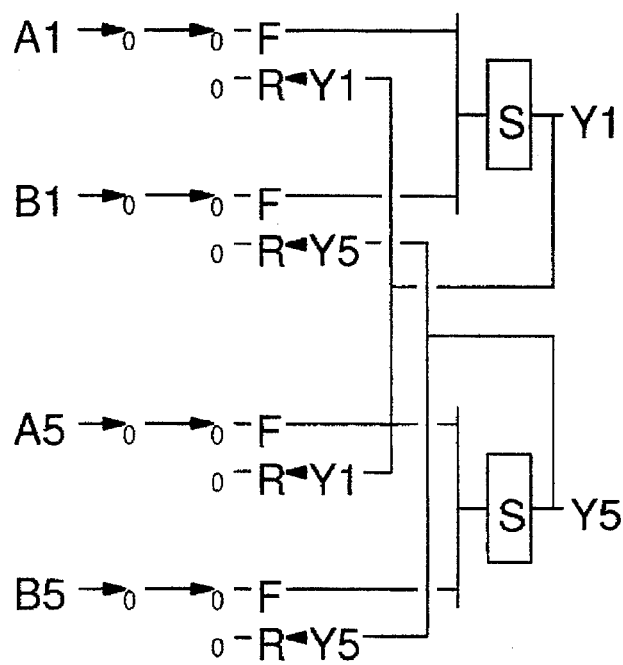
Figures 2, 23A:
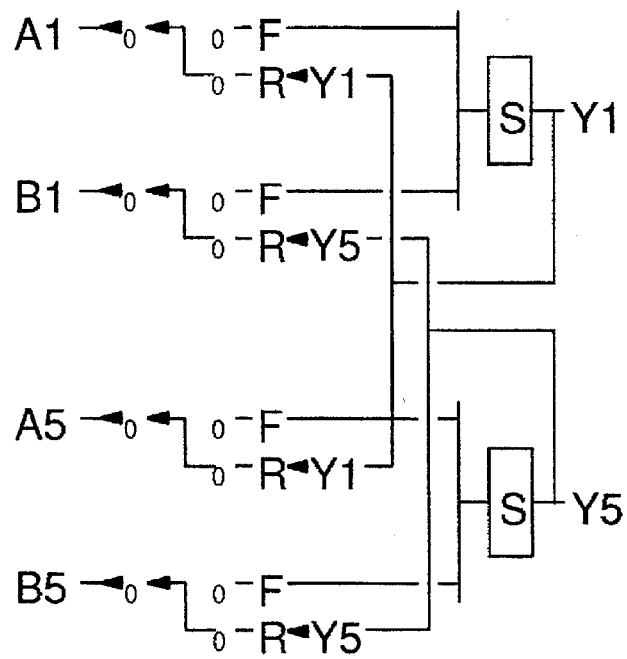
Figure 24A:
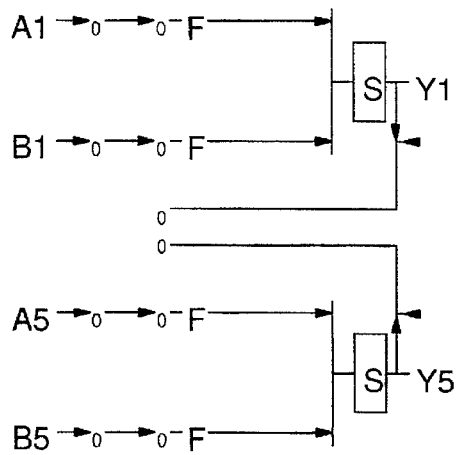
FIG. 24 illustrates alternatively a modified 8 neuron switching mechanism to support learning.
Figure 24B:
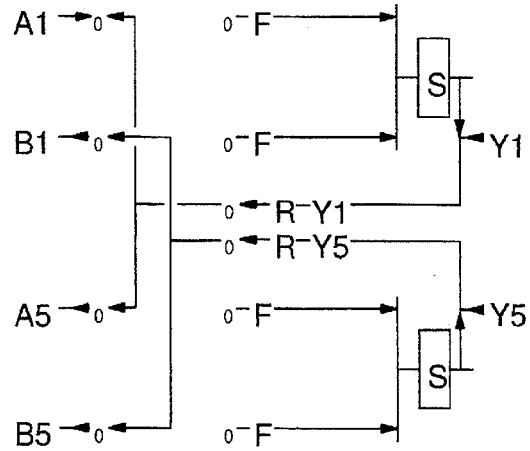
Figure 24C:
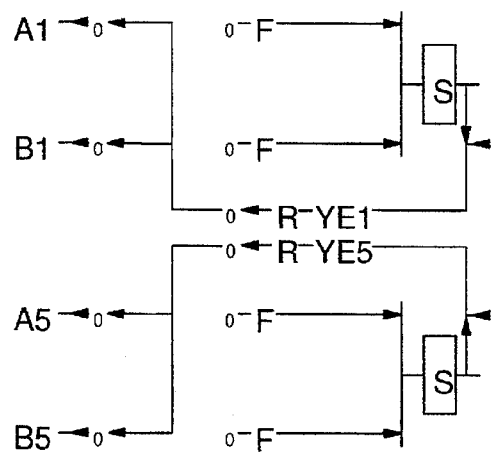
Figure 24D:
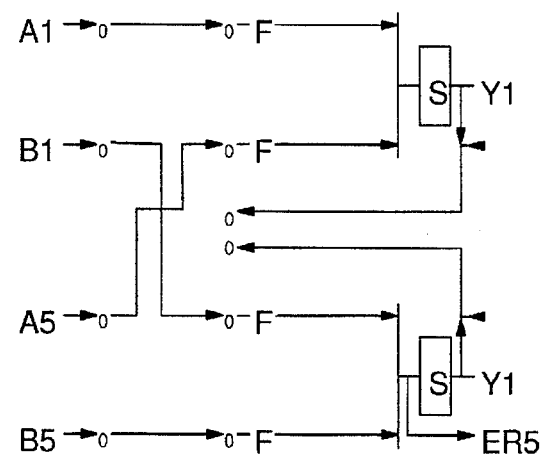

The TSNAP structure—see TSNAP 90, as exemplified by FIG. 2 from LEARN 90, due to its use of $N^2$ processing elements and N Communicating ALU Trees (CATs), can not be easily built, for non trivial values of N. A TSNAP structure, representative of a massively parallel processing system, for non trivial N, suggests the necessity for a scalable design based on a processing array that can be used as a common "building block" that is implementable on a single chip. To demonstrate the scalability of the TSNAP structure, it is required that a TSNAP be partitioned into equal size processor array "building blocks", that can be used to construct larger arrays having the same triangular structure, and to preserve the TSNAP functionality in the constructed structure. Assume that the requirements of the previous statement can be demonstrated, the partitioning method can be utilized to build a TSNAP for an arbitrary size of N, governed by the designers chosen partitioning restrictions, thereby demonstrating a machine organization that is scalable.

Figure 1A:
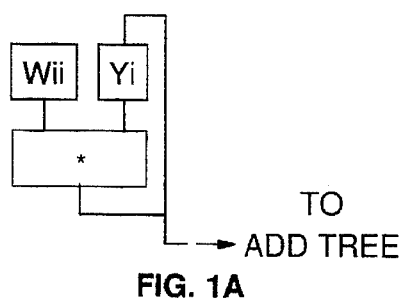
FIG. 1 is divided into FIGS. 1A, 1B, 1C and 1D.
Figure 1B:
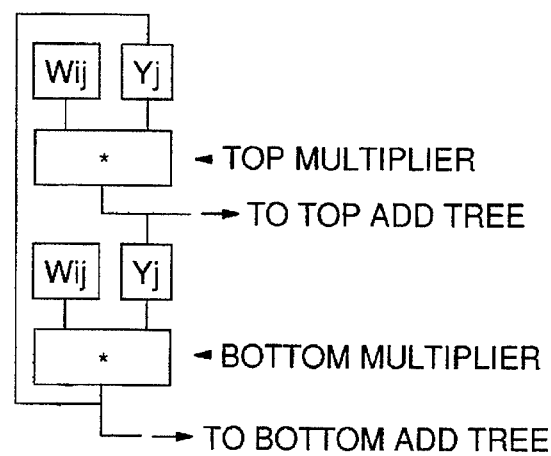
Figure 1C:
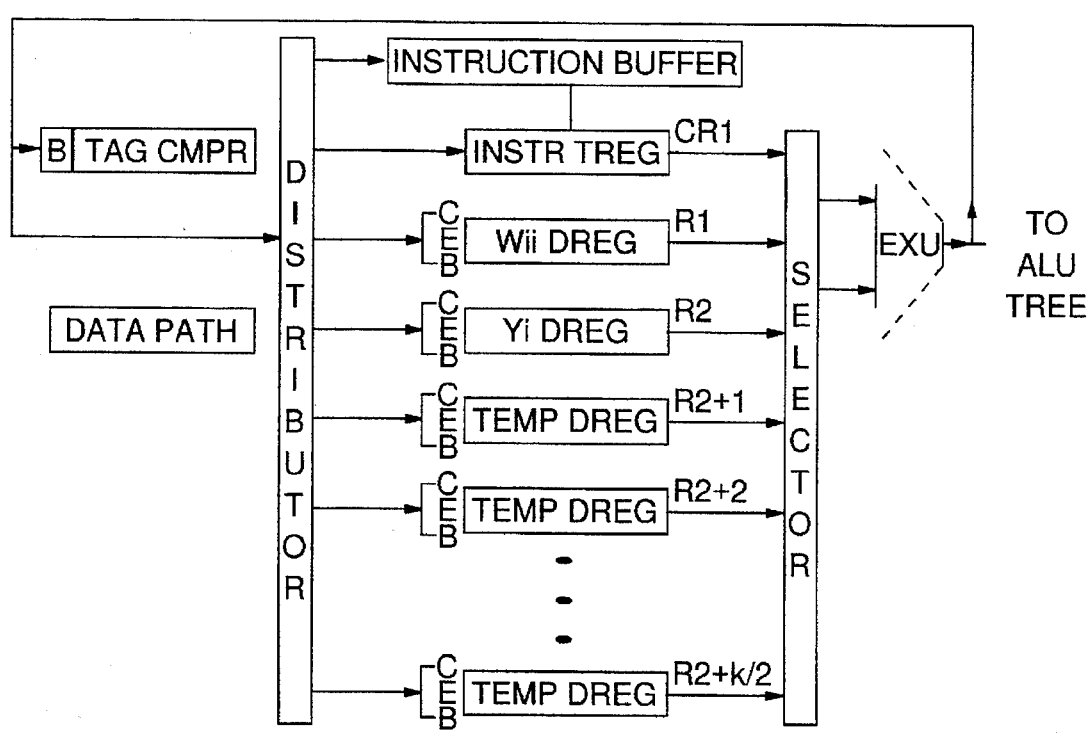
Figure 1D:
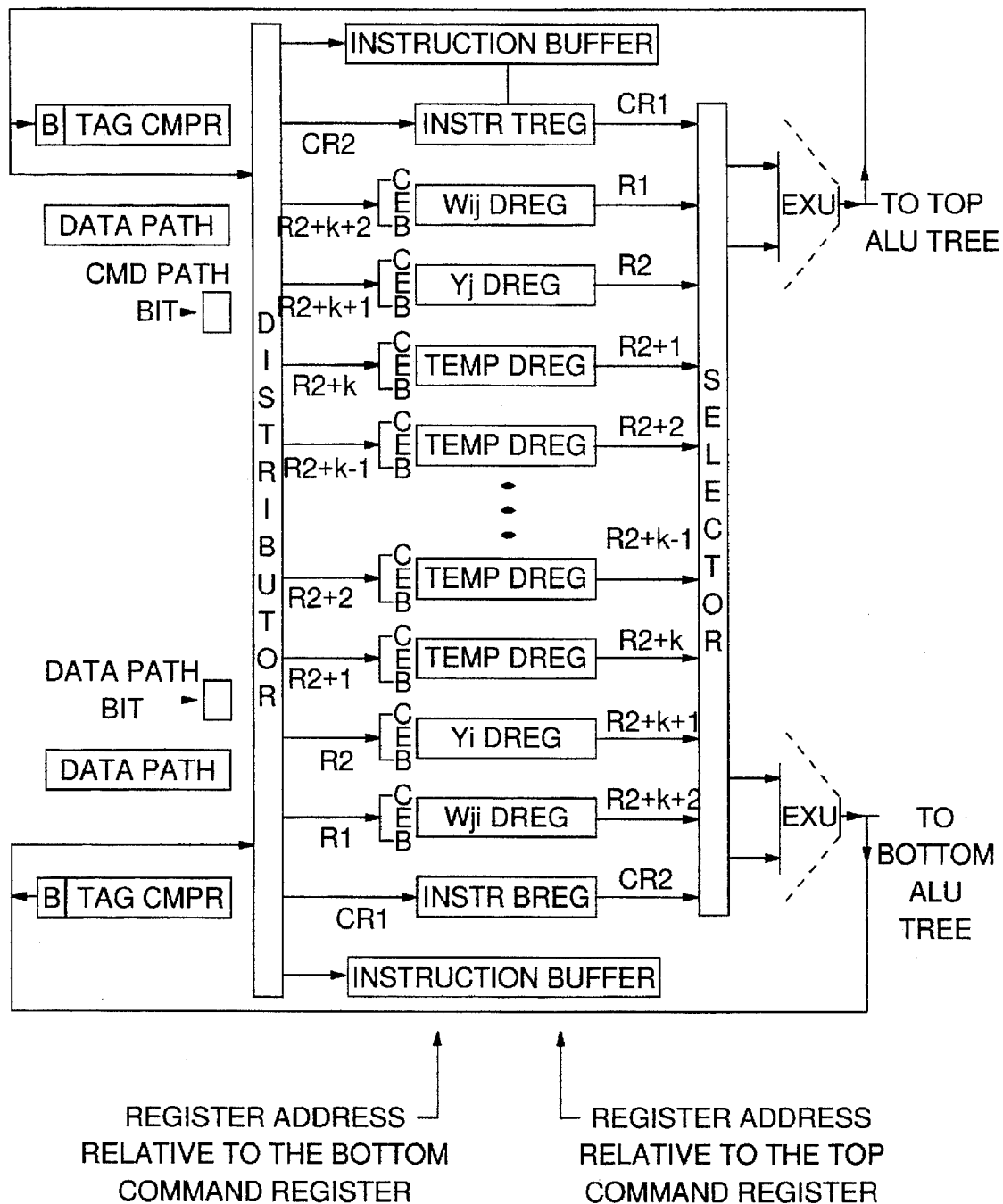
Figure 2B:
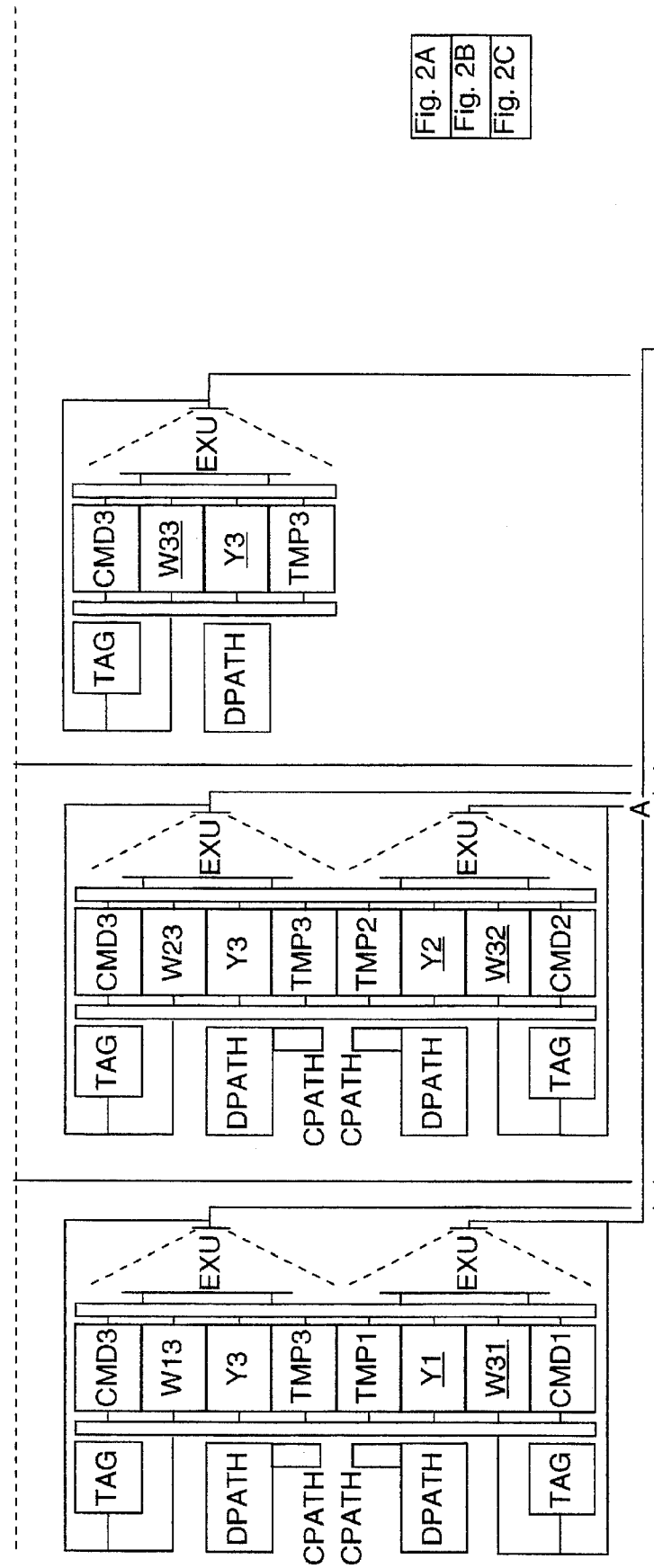
FIG. 2 illustrates a Diagonal-Fold Four Root Tree Processor Array.
Figure 2C:
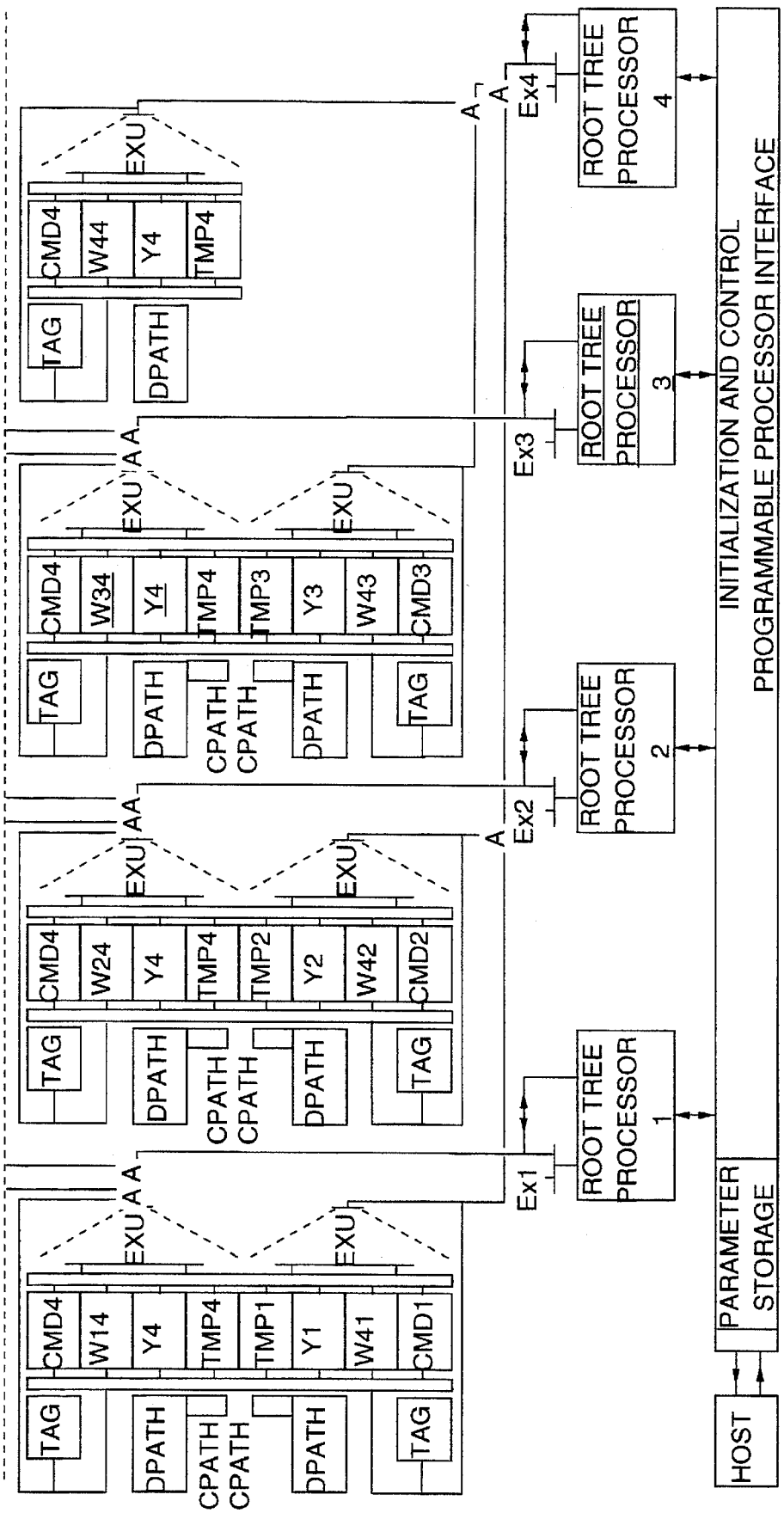

Briefly then, for neural emulation, the programmability of the processor elements (PEs) modeling the connection weight function, termed synapse function, is obtained through the instructions which are received at a PE INSTR register from the attached communicating ALU tree that is in a communications mode. Each PE upon receipt of an instruction will execute the operation specified by that instruction sending the result to the specified destination which may be the attached ALU tree. The instruction types include a data and command path determining instruction, arithmetic, and logical instructions. The TSNAP multiplication elements are depicted in FIG. 1 A and B while an example of the corresponding processor elements are shown in FIG. 1C and D. For a complete description, with the instruction set architecture, see reference LEARN 90. Each PE contains an instruction register for each processing element specifying the source and destination paths and EXU functions; a Diagonal-PE contains one instruction register and the General-PE contains two instruction registers.

To clarify the concepts presented, a 4 neuron example is shown in FIG. 2. An example of the neural emulation equation for neuron 3, generated by Root Tree Processor #3, is written here and the corresponding storage elements are highlighted in FIG. 2.

$$Y_3 = F(W_{3,1} + W_{3,2}Y_2 + W_{3,3}Y_3 + W_{3,4}Y_4)$$

This invention addresses how a TSNAP type of processor structure, for a given size of N, can be built utilizing a single common replicatable design that is also used for physically expanding the system, thereby providing a scalable design. In the first section, a partitioning approach demonstrates that a triangular array of PEs is partitionable into multiple triangular and square arrays of PEs. The second section presents a partitioning algorithm that creates two triangular arrays from each square array produced by application of the partitioning approach, under a set of element mapping rules. It is shown that the triangular arrays that result from the partitioning algorithm are equivalent to the triangular arrays produced by application of the partitioning approach. Two examples are presented in the following section demonstrating application of the partitioning methodology to the TSNAP structure. The next sections are concerned with presenting a "regular" interconnection mechanism that connects multiple "building block" arrays into a system that preserves the functionality of a constructed TSNAP. In the first of these next sections the functionality requirements of the partitioned design are discussed. Second, an algorithm that creates a "regular" interconnection mechanism is presented. Third, the interconnection mechanism is shown to preserve the TSNAP functionality requirements. Fourth, two examples are presented demonstrating application of the interconnection mechanism. A final section, briefly discusses an alternative scaling approach.

2. Triangular Array Partitioning

Figure 3:
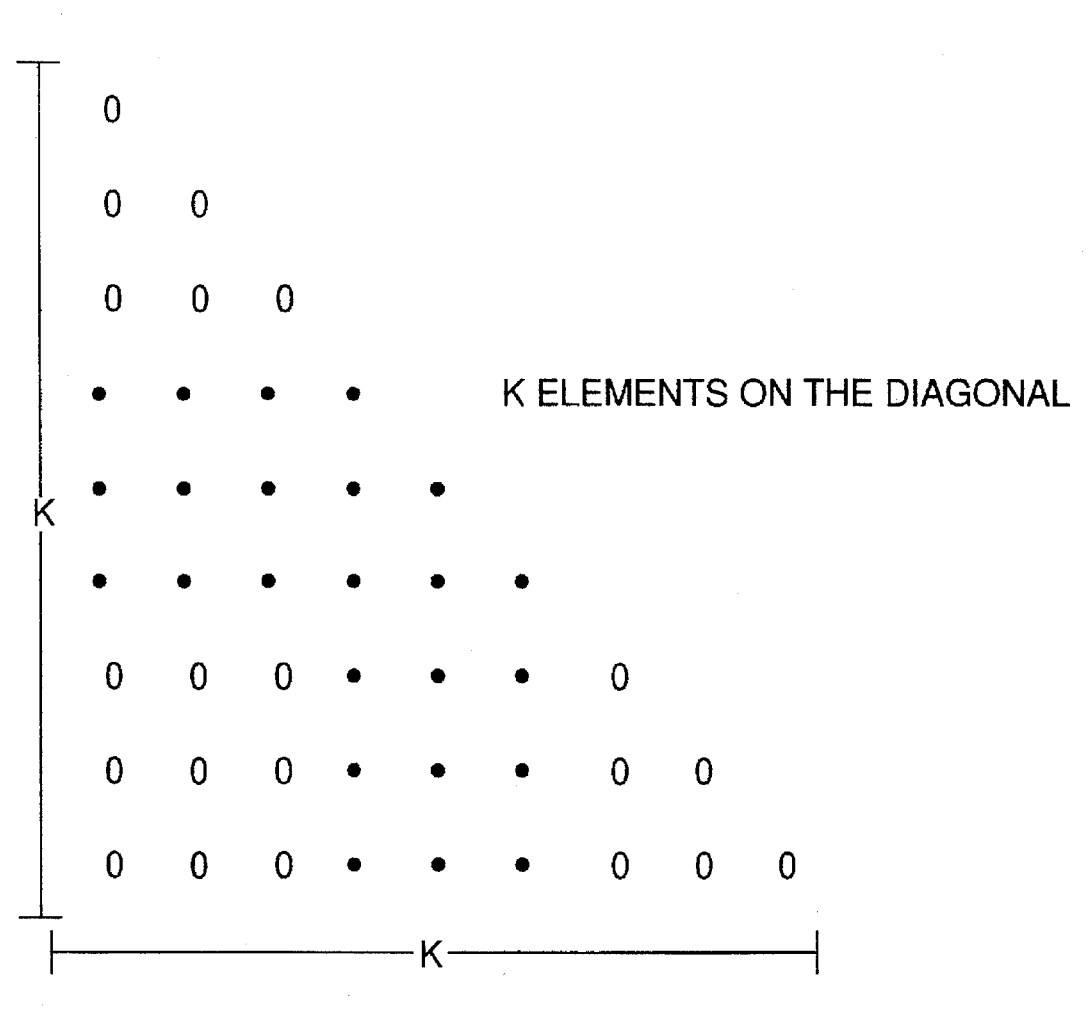

By construction, consider a triangular array of elements with the property that each edge of the array possesses K elements, FIG. 3. THE PARTITIONING APPROACH: Let K and X be integers such that K is divisible by X, then a triangular array of dimension K can be partitioned into:

$$K \frac{(K-X)}{2X^2} \; X \text{ by } X \text{ SQUARES}$$

AND $$\frac{K}{X} \text{ EQUILATERAL TRIANGLES OF DIMENSION } X$$

Figure 4:
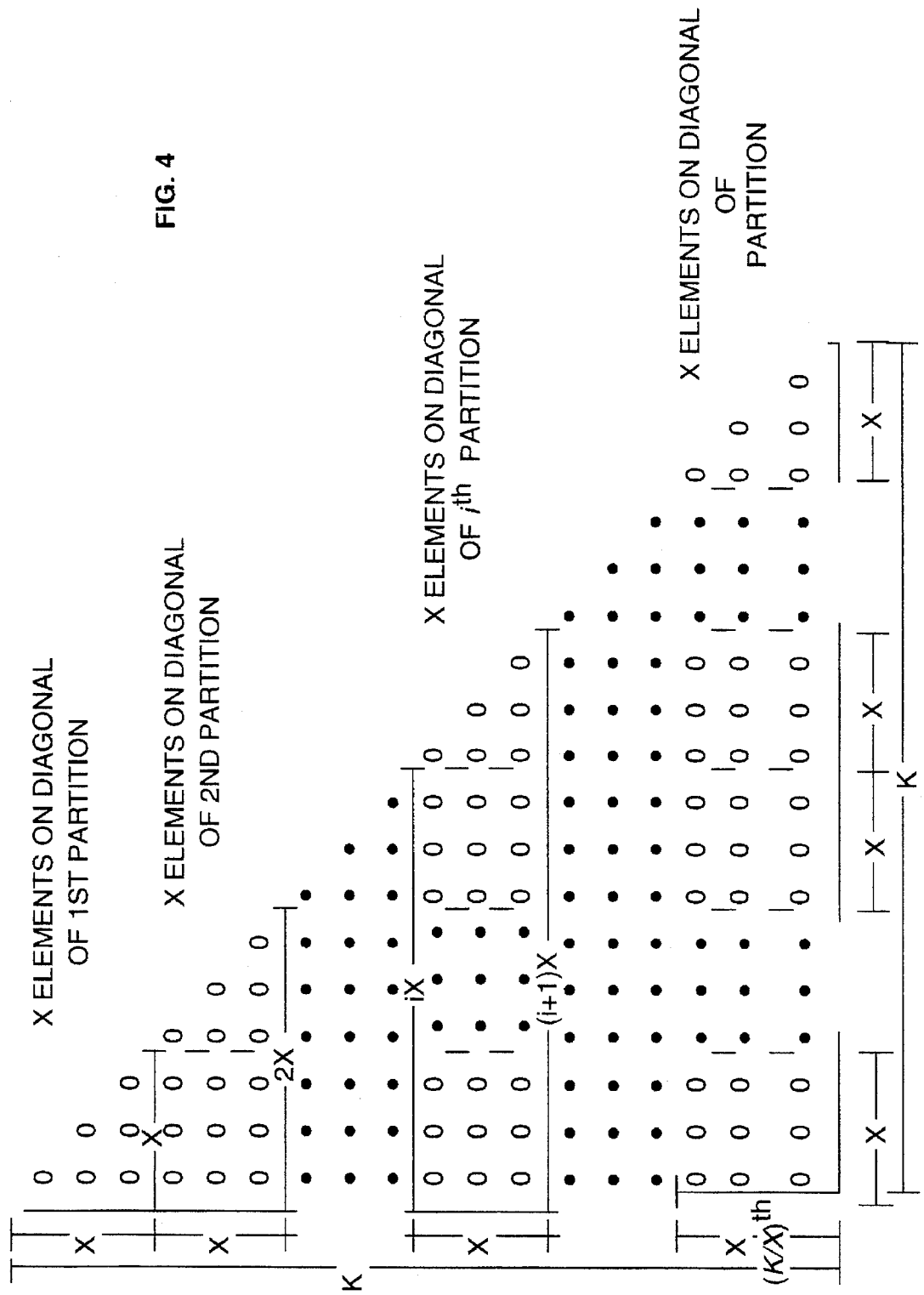
FIG. 4 shows a Triangular Array Partitioned into Multiple Triangle and Square Arrays.

A triangular array can be partitioned into $$\frac{K}{X}$$

partitions, $$\left( \frac{K}{X} - 1 \right)$$

being trapezoids and one partition being an equilateral triangle of dimension X. (see FIG. 4)

A trapezoid contained by the $i^{th}$ and $(i+1)^{th}$ horizontal "lines" possesses dimensions X (side), iX (top), X (side on diagonal edge of the triangle), and (i+1)X (bottom). There being iX and iX+X elements in the top and bottom edges of the $i^{th}$ trapezoid suggests that the trapezoid can be partitioned by X into "i" X by X square arrays and one equilateral triangular array of dimension X, FIG. 4.

Thus, given that there are $$\frac{K}{X}$$

partitions, there are $$\frac{K}{X}$$

equilateral triangles of dimension X.

Additionally, because there are "0" squares due to the first partition (the first partition is an equilateral triangle), one X by X square due to the second partition, and $$\left( \frac{K}{X} - 1 \right) X \text{ by } X$$

X by X squares in the last $$\frac{K}{X}$$

partition, there are:

$$0 + 1 + 2 + \ldots + \left( \frac{K}{X} - 1 \right) = \frac{1}{2} \left( \frac{K}{X} - 1 \right) \left( \frac{K}{X} \right) =$$

$$K \frac{(K-X)}{2X^2} \text{ SQUARES}$$

3. Partitioning Algorithm

The partitioning approach suggests the subdivision of a triangular array into triangles and squares. The ultimate goal of the partitioning, however, is not to provide the capability of having two common designs to produce one arbitrary TSNAP structure, as the approach suggests, but rather to provide a single "building block". To that extent, it is demonstrated that it is possible to partition an arbitrary TSNAP triangular structure into multiple triangular arrays of equal size. Clearly, the square arrays that are a result of the partitioning approach can not be subdivided into two equal size triangular arrays. To achieve the partitioning of the square arrays, further considerations must be associated with the structures resulting from the partitioning approach. By observing the TSNAP structure, the following holds true:

1. The diagonal edge elements contain single processing elements, the Diagonal-PEs.
2. The rest of the elements contain dual processing elements, the General-PEs.

Figure 5B:
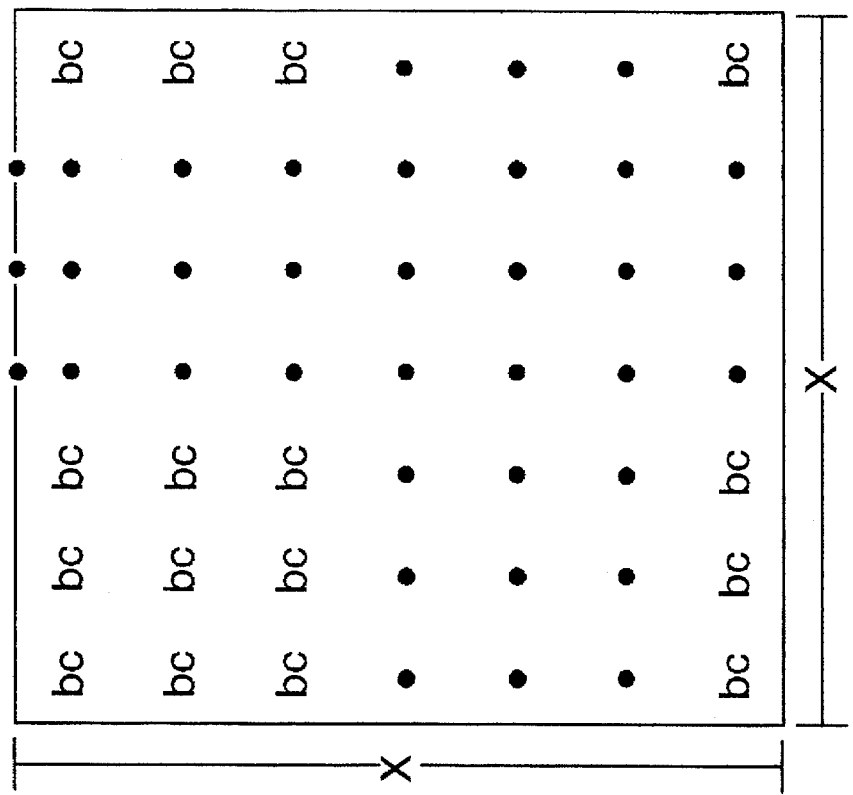
FIGS. 5A and 5B show Example Partitioned Triangle and Square Arrays with Diagonal-PEs and General-PEs.
Figure 5A:
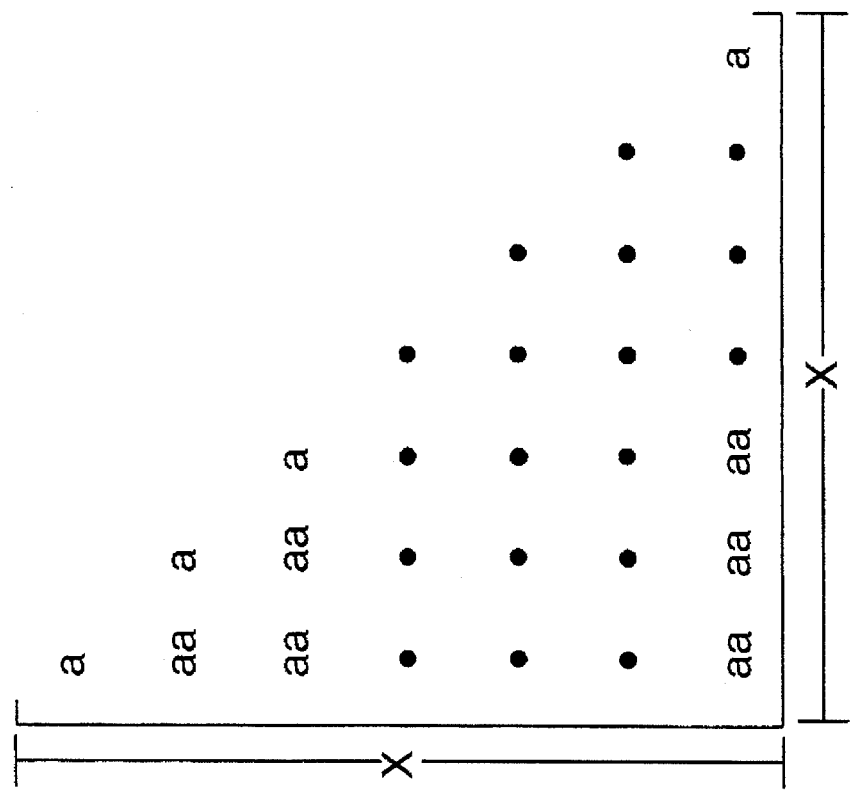

By utilizing this consideration on the type of elements contained in the triangular structure and applying the partitioning approach, there is produced:

$$1. \frac{K}{X}$$

triangular arrays of dimension X, wherein the X diagonal elements are single processor Diagonal-PEs and the rest of the processors are dual processor General-PEs, FIG. 5A, where a processor element is indicated by "a".

$$2. K \frac{(K-X)}{2X^2}$$

square arrays of dimension X, wherein all processor elements are General-PEs, FIG. 5B, where a dual processor element is indicated by a "bc".

Figure 6B:
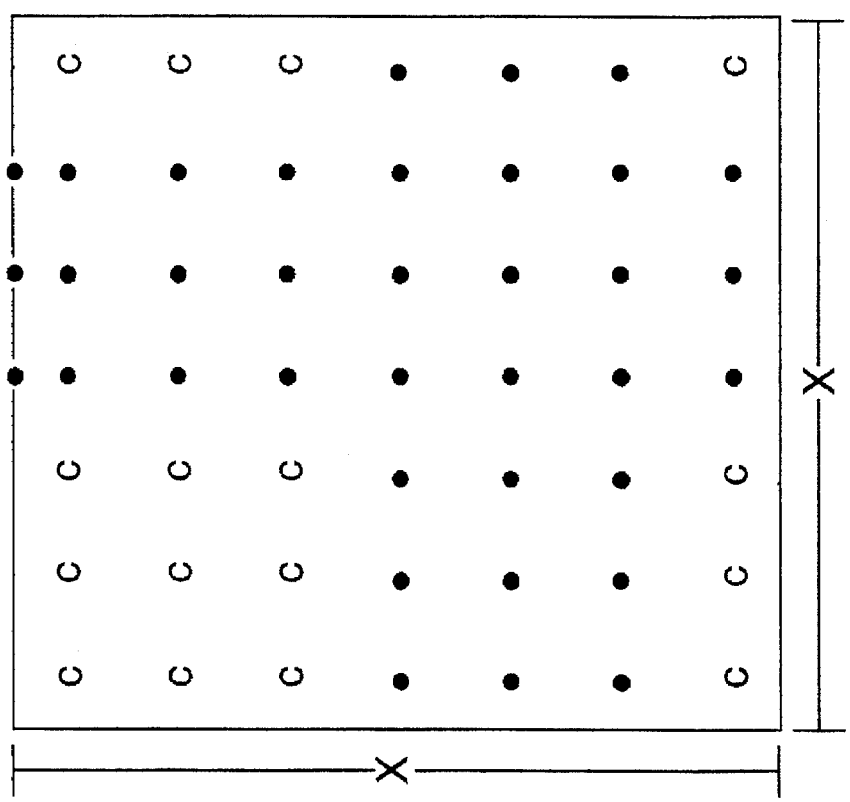
FIG. 6 shows Two Square Arrays of Elements Separated From Dual Element X by X Array.
Figure 6A:
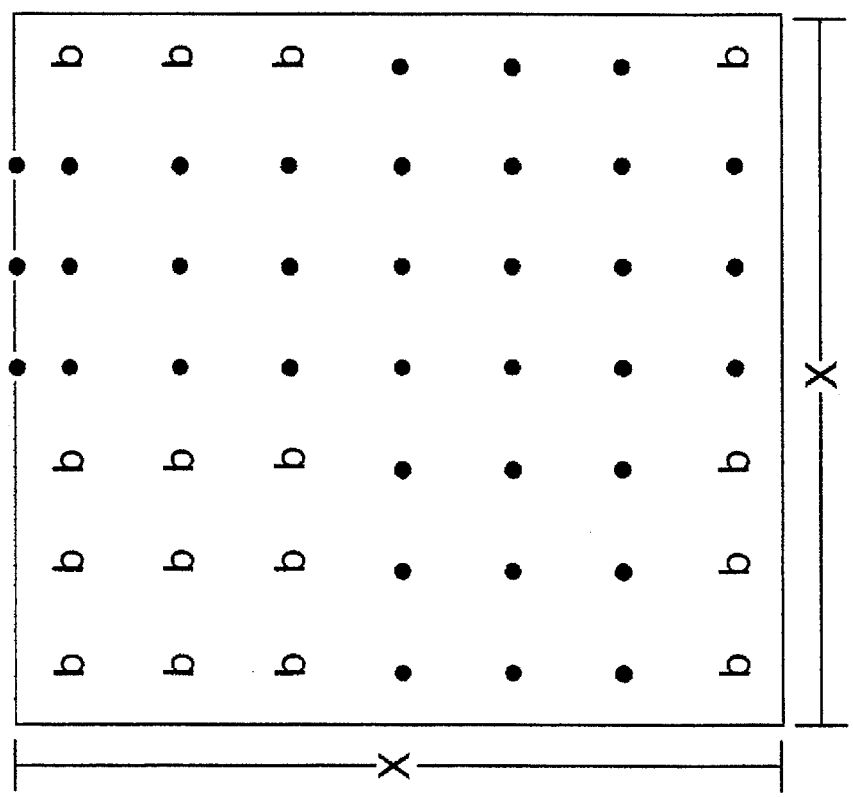

A partitioning algorithm, for the square structure described in FIG. 5B, which takes a square array of dual processor elements, as produced from the partitioning approach, and creates two triangular arrays equivalent to the partitioning approach's triangular array made up of single Diagonal-PEs on the diagonal and dual General-PEs otherwise, is possible and described by the following:

1. Begin with a partitioning approach square array, as exemplified by FIG. 5B.
2. Create two X by X arrays, labeled (6C) and (6D) in FIG. 6, where the first X by X array (C) is made up of the elements "b" from FIG. 5B, and the second X by X array (D) is made up of the elements "c" from FIG. 5B.
3. Fold both arrays (7C) and (7D), FIG. 7.

Figure 7B:
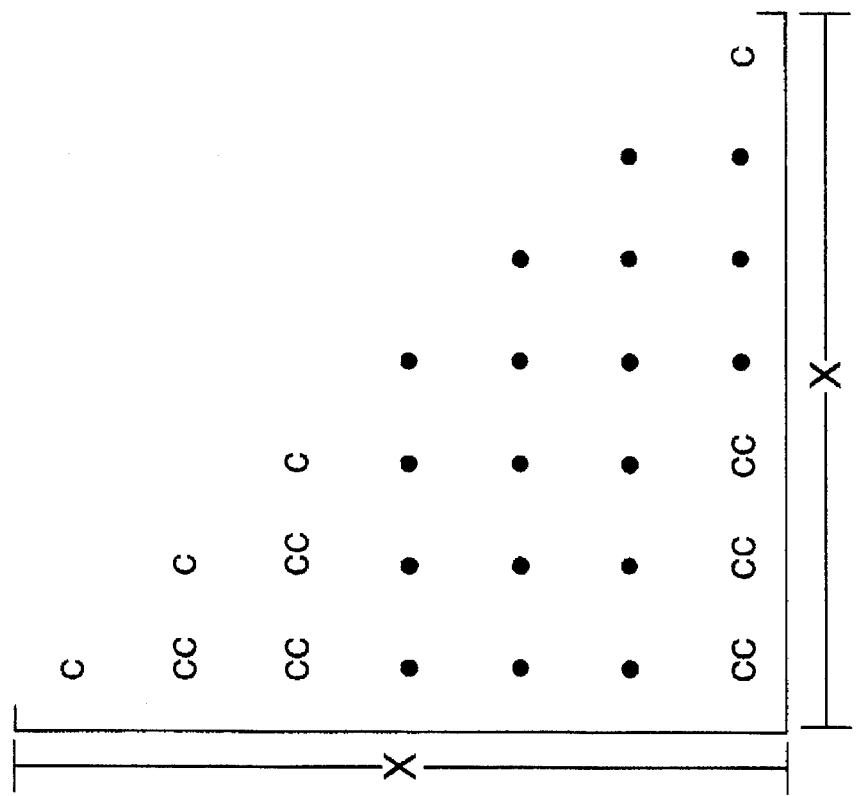
FIG. 7 shows Two Square Arrays of Elements Folded.
Figure 7A:
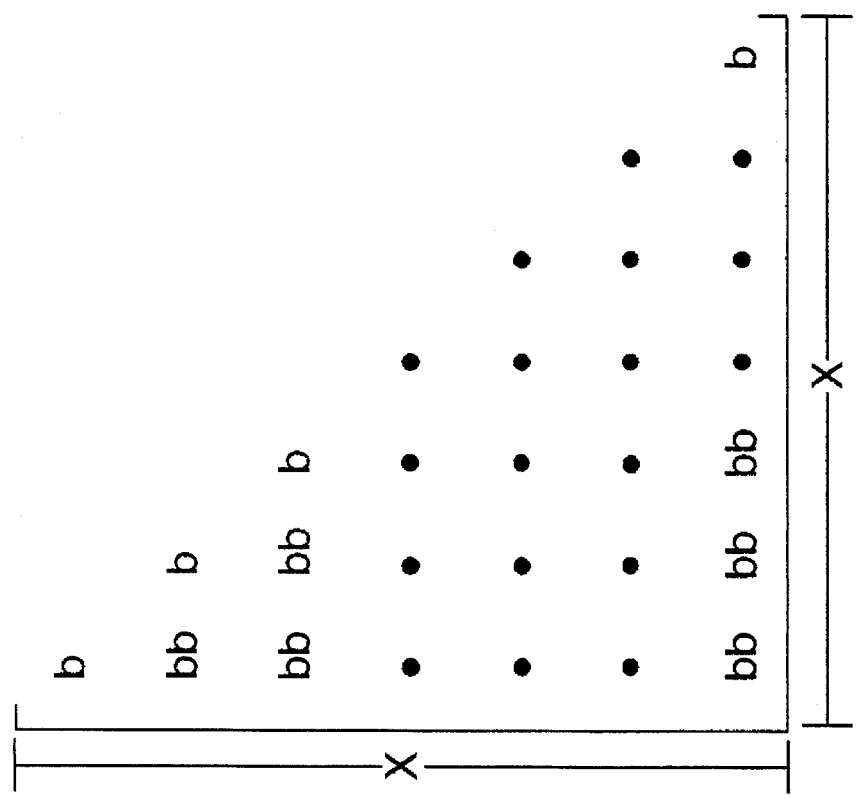

It should be noted, in FIG. 7, that the triangular arrays contain single processing elements equivalent to Diagonal-PEs on the diagonal and dual processing elements equivalent to General-PEs otherwise. Therefore, if N is divisible by X, it can be concluded that a TSNAP triangular array of size N can be partitioned into smaller triangular arrays each of size X, having single Diagonal-PEs in the diagonal and dual General-PEs in the rest.

4. Partitioning Examples

Figure 8A:
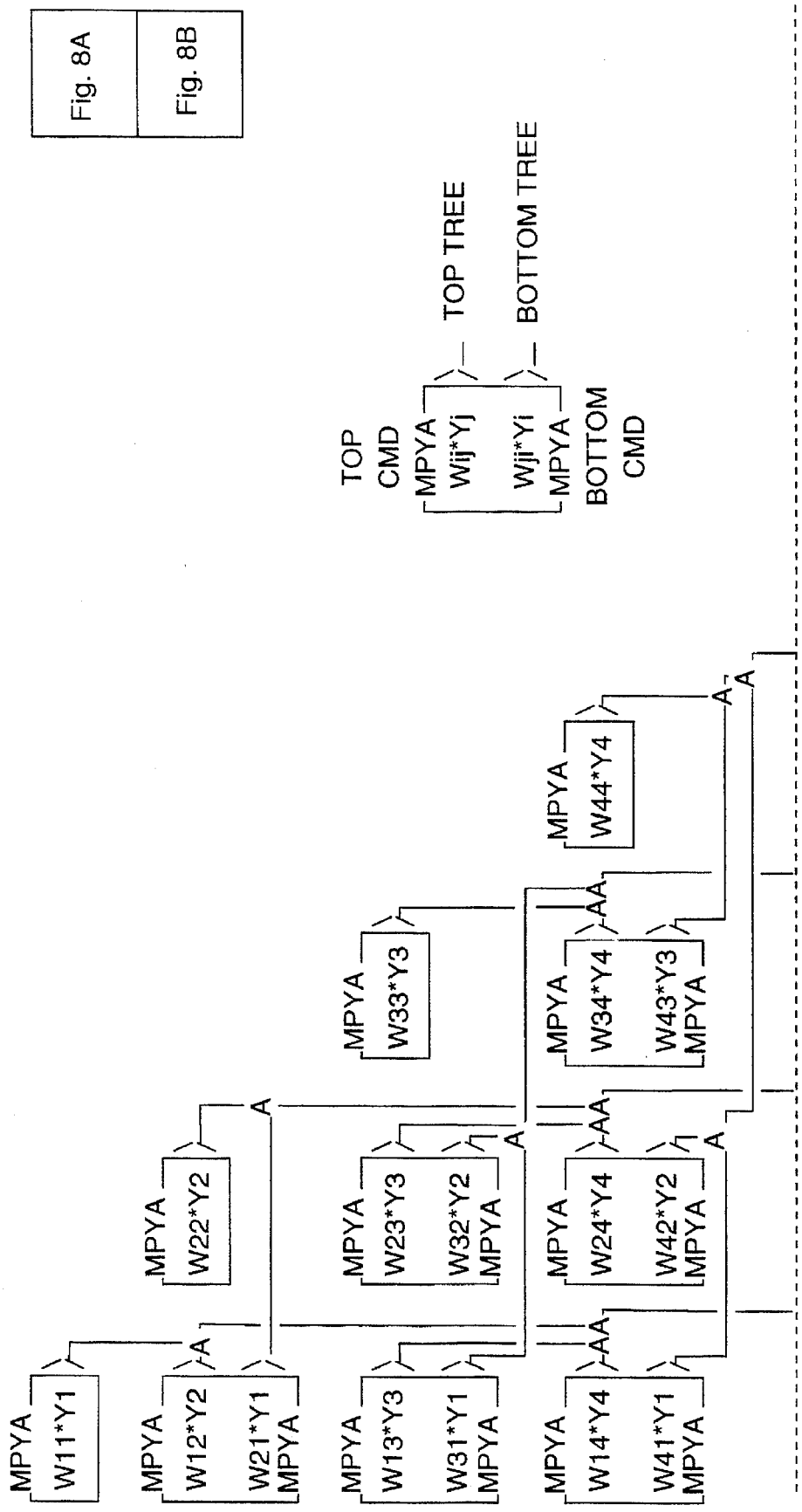
FIG. 8 shows a Diagonal-Fold Tree 64 PE Array For an 8 Neuron Network Emulation.

To clarify the partitioning of a triangular array, consider a TSNAP structure suitable for the emulation of an eight neuron network, shown in FIG. 8 where:

$$z_i = \sum_{j=1}^{8} Y_j W_{ij}$$

and where the multiplication operation is specified by a MPYA-R1*R2→T instruction indicating that R1, containing $W_{ij}$, is multiplied by R2, containing $Y_j$, with the product result sent to the attached ALU tree. For the purposes of demonstrating the partitioning steps the external input term $Ex_i$ can be ignored.

The partitioning methodology suggests that the TSNAP structure can be partitioned into multiple triangular and square arrays which, for the eight neuron example with K=8 and X=4 partitions, consists of 2 triangular arrays and 1 square array. Separating the sub-divided arrays from the main structure and allowing the final stage of the ALU trees to be external to the arrangement of PEs results in the structure shown in FIG. 9, which contains the three structures i.e. the two triangular arrays and one square array. It should be noted that the triangular arrays contain the single Diagonal-PEs in the diagonal elements and the dual General-PEs in the rest of the elements and the square array is composed of General-PEs only. Since the goal is to produce a single chip array design that can be replicated to build an arbitrary size N TSNAP structure, the square structures must be partitioned into triangular structures, as indicated by the partitioning algorithm.

Figure 9B:
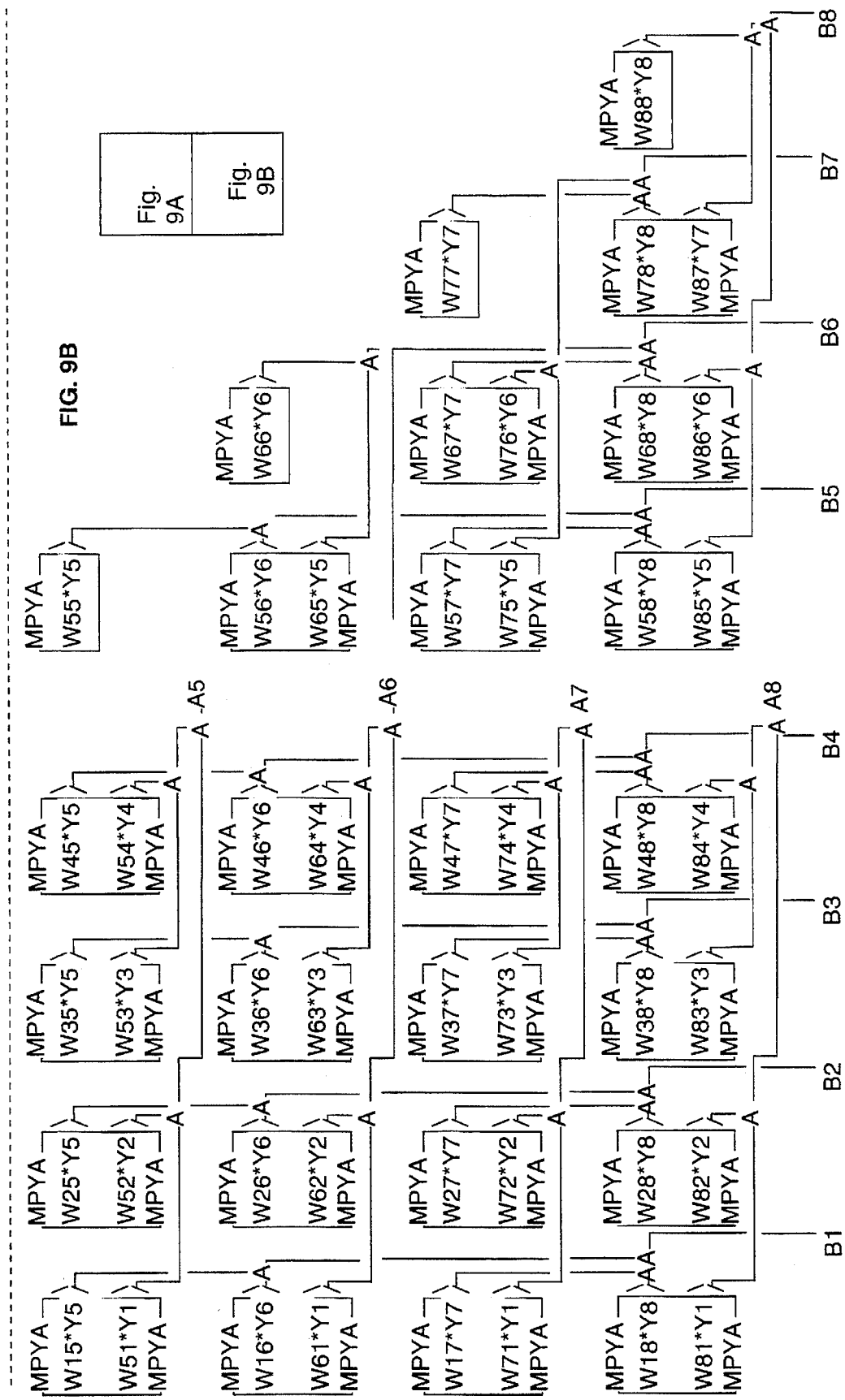
FIG. 9 shows an 8 neuron array model split into 1 square and 2 smaller triangular processor arrays.
Figure 10A:
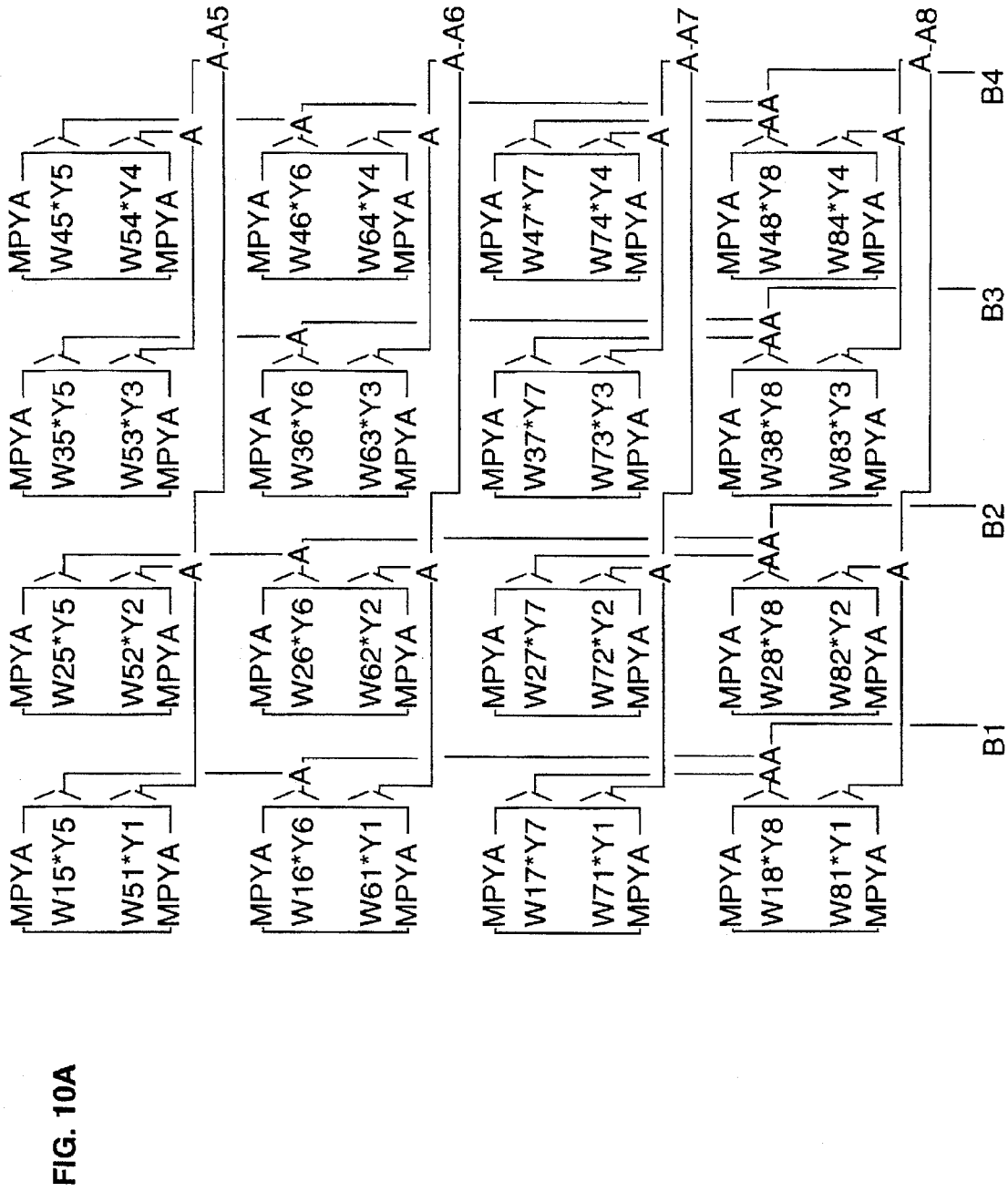
Figures 14A, 14B:
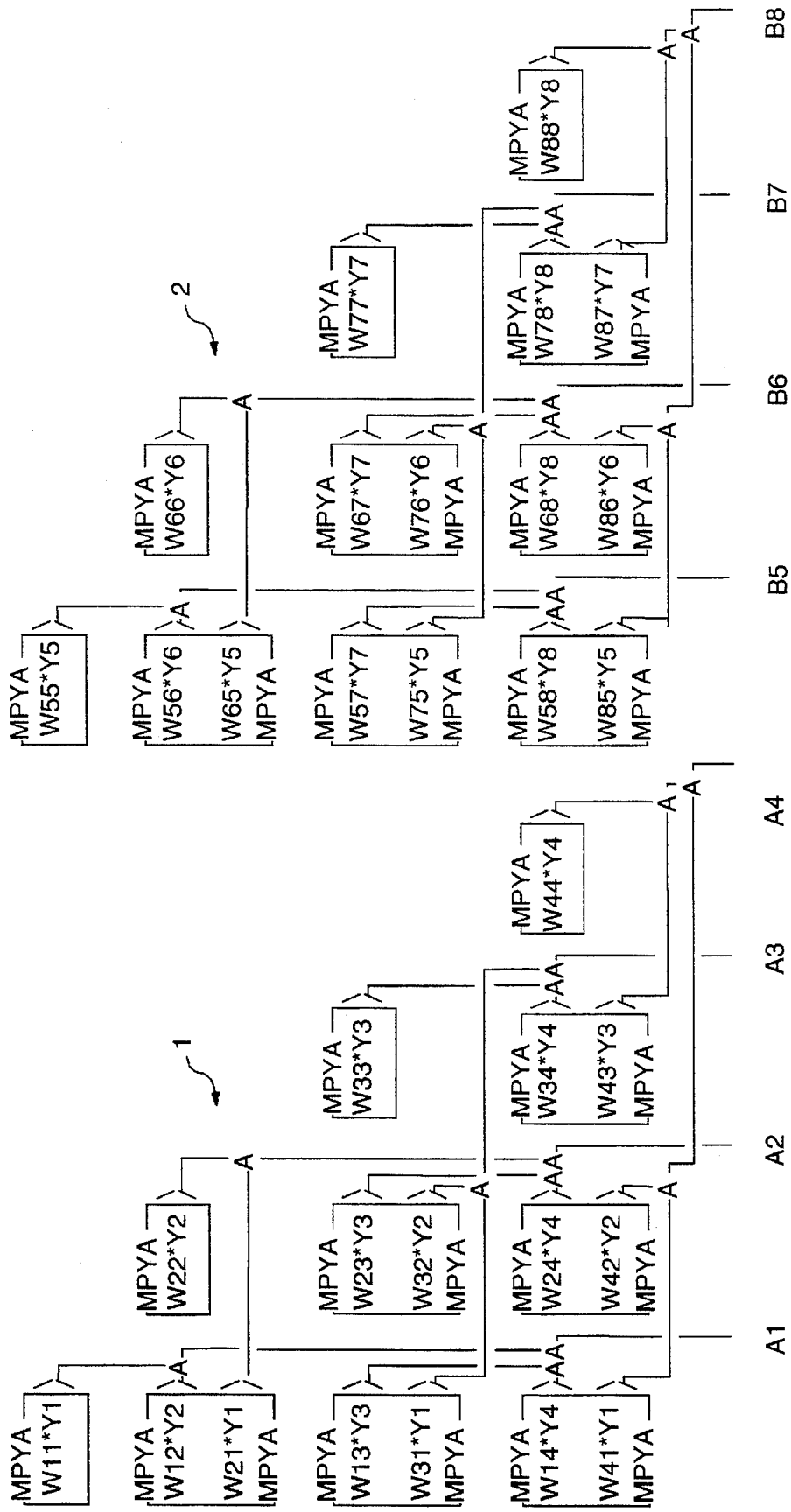
FIG. 14A and 14B show triangular arrays 1 and 2.
Figure 17A:
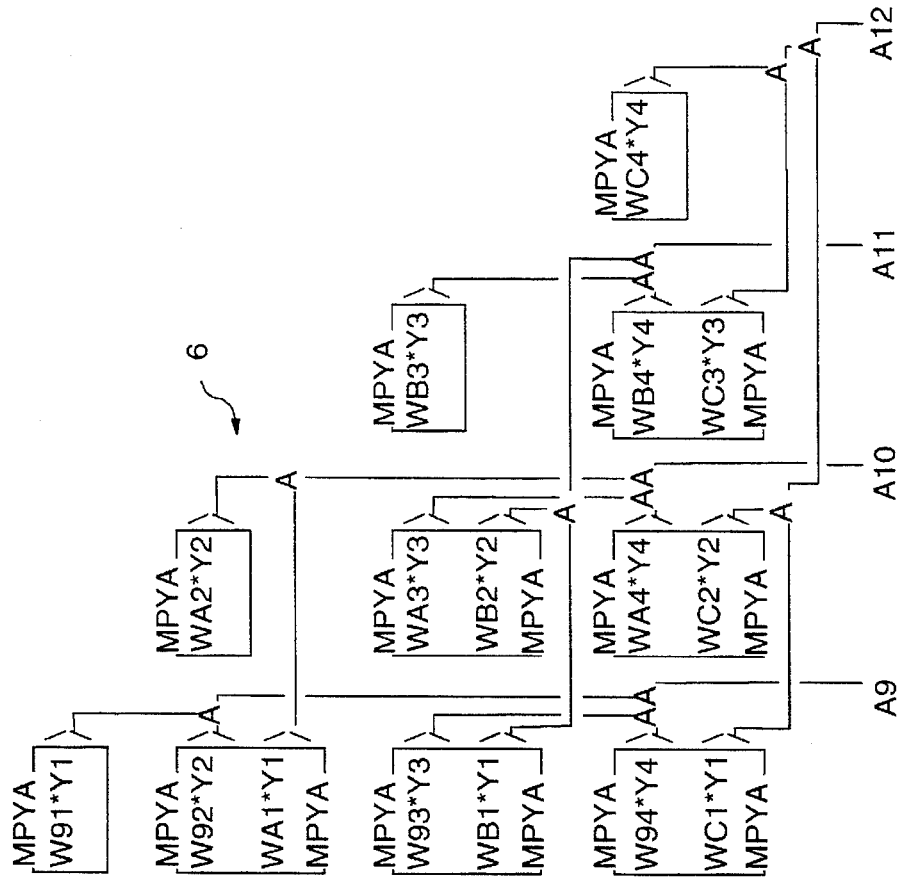
FIG. 17A and 17B show a folded inner square 6 separated into two triangular arrays.
Figure 17B:
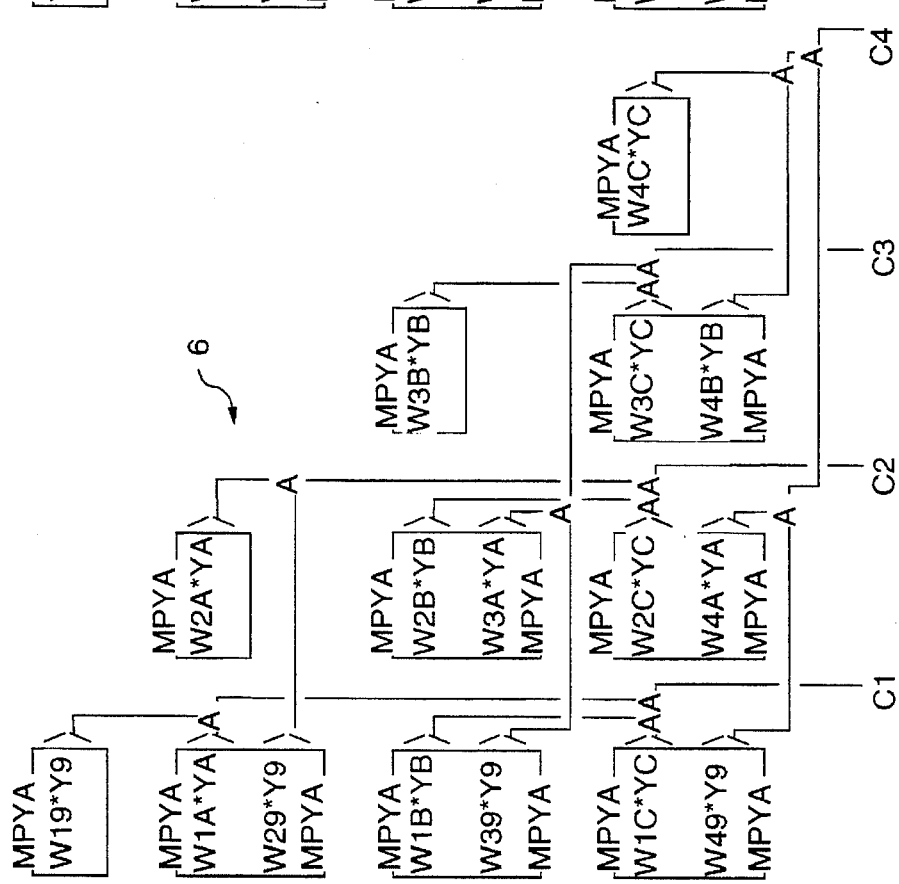
Figures 18A, 18B:
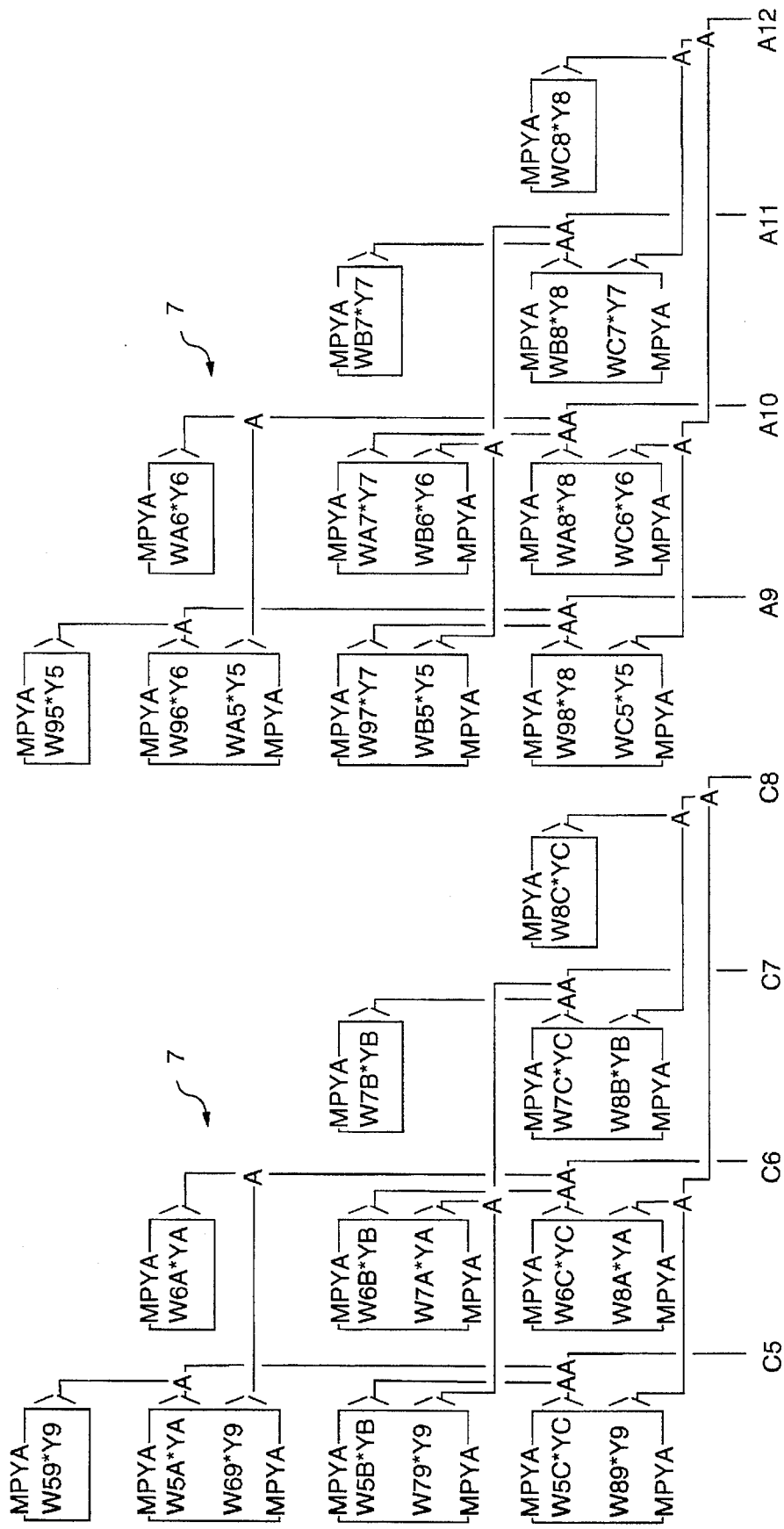
FIG. 18A and 18B show a folded inner square 7 separated into two triangular arrays.
Figure 20A:
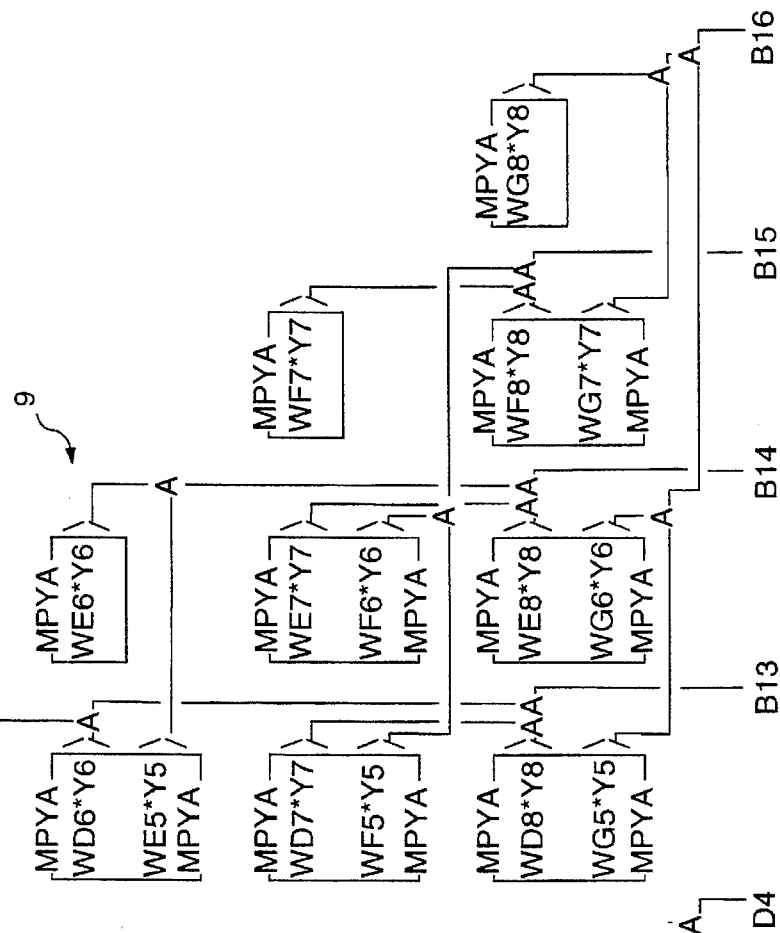
FIG. 20A and 20B show a folded inner square 9 separated into two triangular arrays.
Figure 20B:
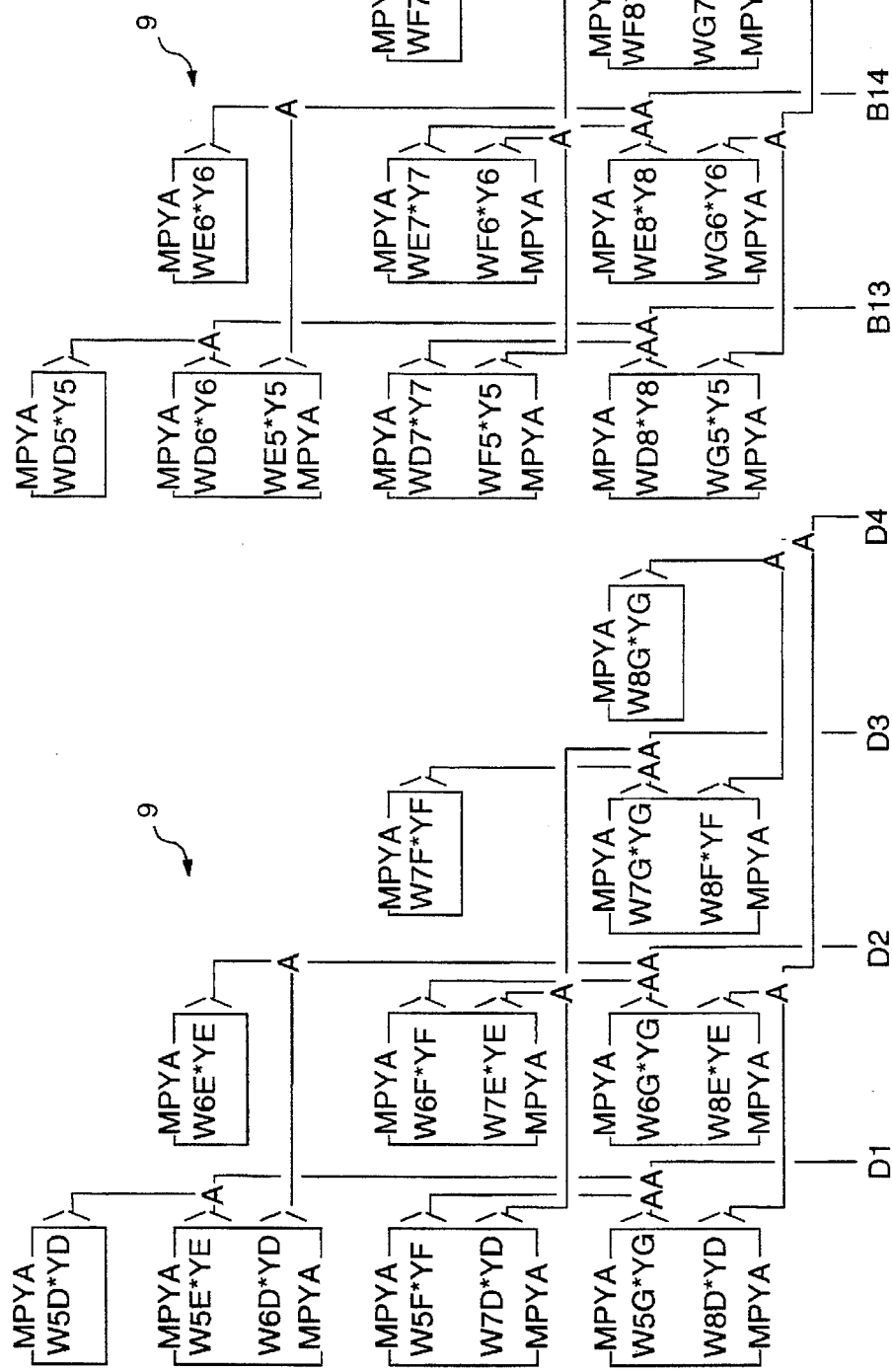
Figures 21A, 21B:
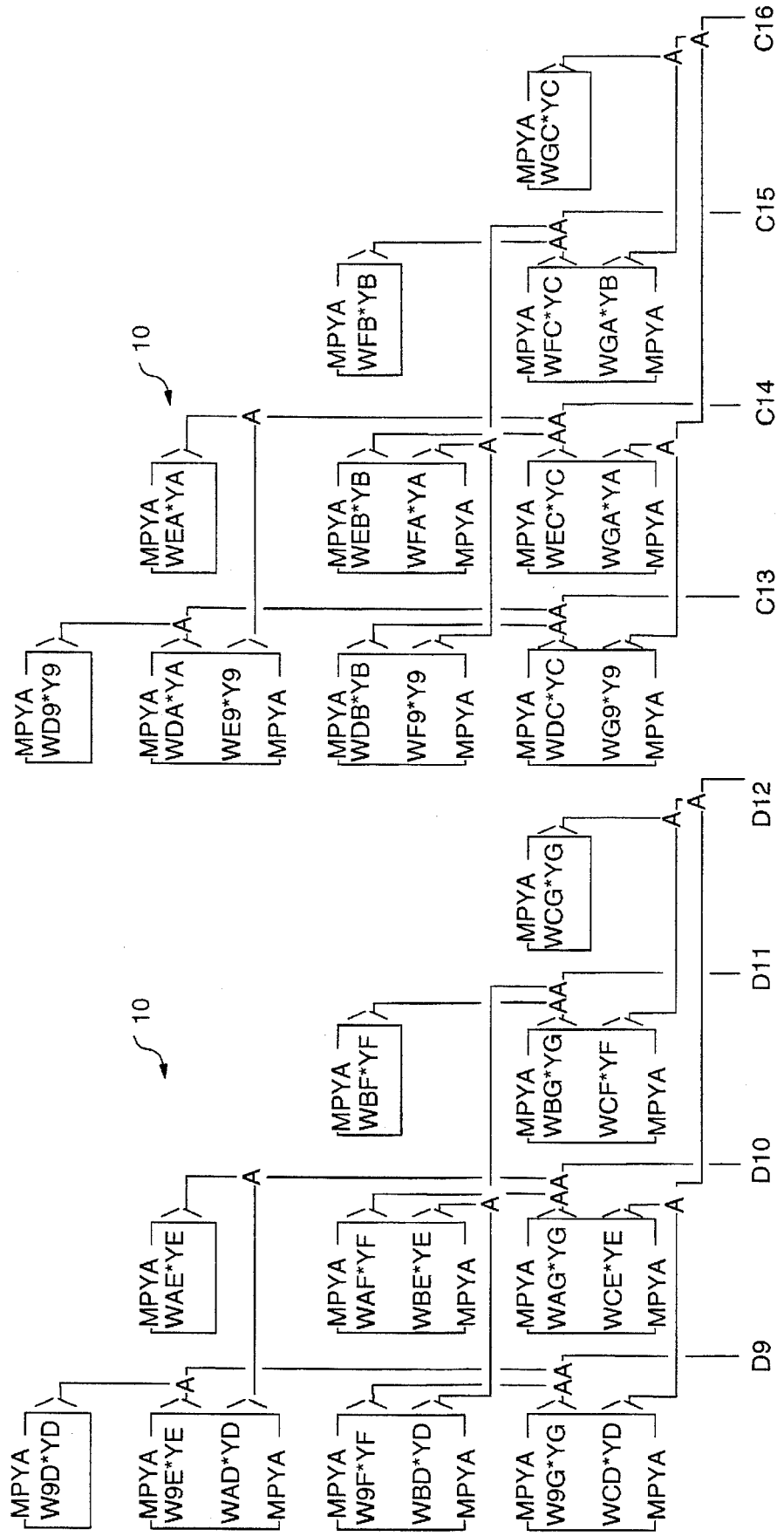
FIG. 21A and 21B show a folded inner square 10 separated into two triangular arrays.

It can be observed that in the partitioned square array of the eight neuron example, FIG. 9, that there are two sets of orthogonal trees interconnecting the dual processor General-PEs producing four outputs from the horizontal set of trees and four outputs from the vertical set of trees. The first step is to separate the square array, FIG. 10A, into two square arrays of single processors, FIG. 10B and FIG. 10C, where the separation keeps intact the horizontal and vertical trees and their connected processor. Folding both the horizontal tree and vertical tree square processor arrays along their top-left to bottom-right diagonal creates two triangular arrays with single Diagonal-PEs on the diagonal and dual General-PEs in the rest of the elements, FIG. 11A and FIG. 11B. It is observed that the triangular structures produced from the partitioning approach are of the same form and dimension as the triangular arrays produced by application of the partitioning approach. The partitioning process also partitions the Communicating ALU Tree (CAT), moving a portion of the tree external to the triangular array chips. The portion of the tree that remains on the triangular array chips for values of X is given by:

Number of on Chip CAT Stages=ceiling($\log_2 X$)

The resulting number of CAT stages that must be external to the triangular array chips is given in terms of N and X as:

Number of External CAT Stages=ceiling($\log_2 N$)−ceiling($\log_2 X$)

The ceiling function produces the closest integer value that is larger than the operand if the operand is fractional and the operand value otherwise. For values of X that are not a power of 2, a balanced binary tree is maintained through use of delay elements in the tree stages, as appropriate. The external ALU tree summation and sigmoid emulation functions, and CAT communication paths, completing the 8 neuron model, are shown in FIG. 12 where the (→) indicates the CAT summation path and the (←) indicates the CAT communications path. By following the partitioning process, the large triangular structure of FIG. 8 has been shown to be made up of 4 smaller triangular arrays.

To facilitate the description of the partitioning process and resulting common "building block" triangular processor array chip, a new notation relating to groups of processors will be introduced here. The number of groups of processor arrays, i.e. the number of triangular array chips, is indicated by "G" and "H" represents the number of single processor elements within a group G, accounting for the dual processor General-PEs. G and H, in terms of N and the partitioning factor X, where X is determined from technology considerations, are specified by the following equations:

$$G = 2\left(N\frac{(N-X)}{2X^2}\right) + \frac{N}{X} = \frac{N^2}{X^2}$$

$$H = 2\left(X\frac{(X+1)}{2} - X\right) + X = X^2$$

For example, in the N=8 neuron emulation case with X=4, each partitioned triangular structure represents a group chip of size H=16. FIG. 9 depicts two group chips, one producing signals A1, A2, A3, and A4 and the second producing signals B5, B6, B7, and B8. FIG. 11 depicts the separated triangular array group chips, one producing signals B1, B2, B3, and B4 and the other producing signals A5, A6, A7, and A8. To make the N=8 triangular array, FIG. 8, four group chips, G=4, are required.

Figure 22:
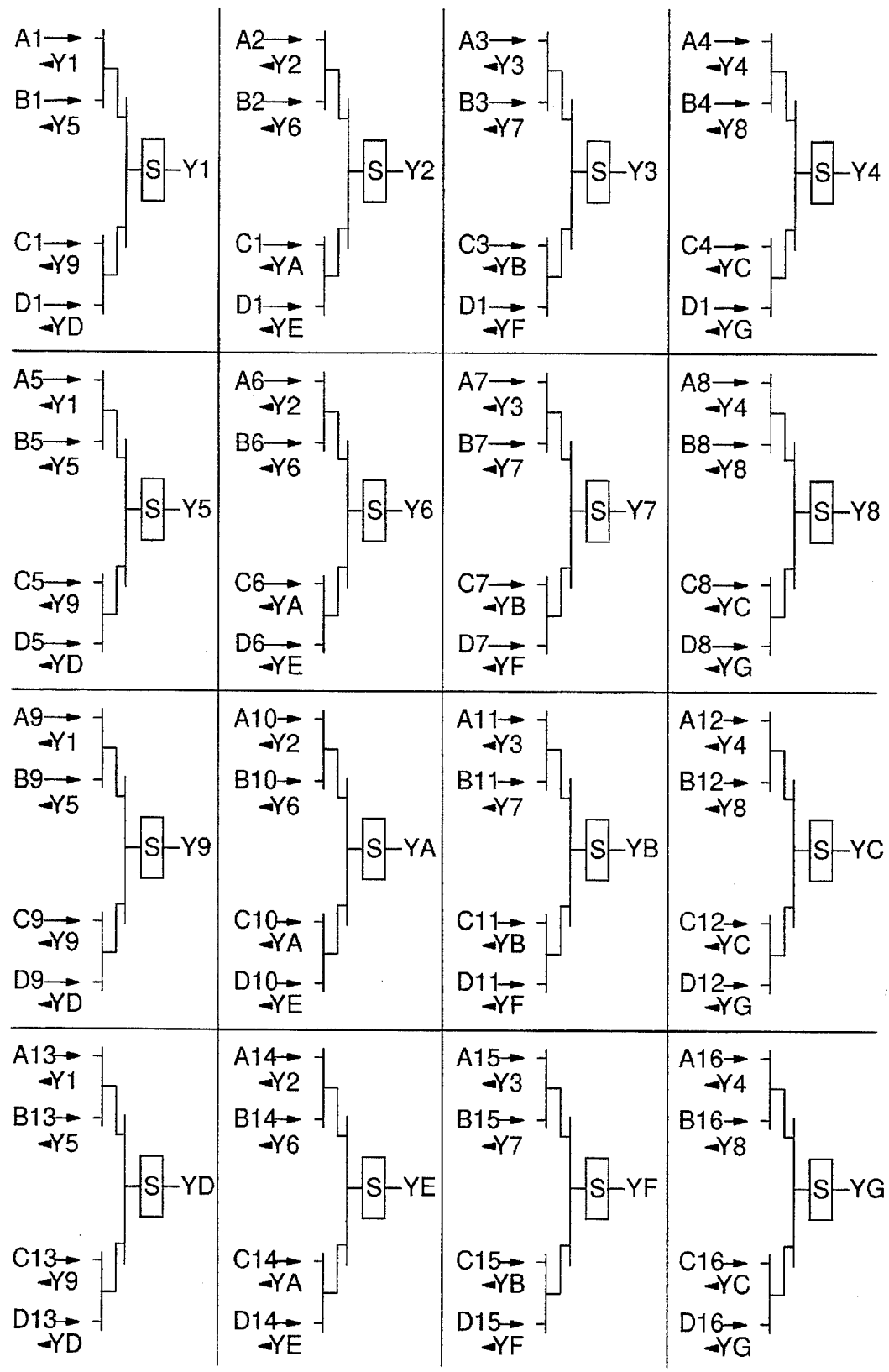
FIG. 22 illustrates a preferred external ALU function, sigmoid emulation, with a tree communication path.

Another example, where N=16, is presented to further clarify the partitioning process. The first step is to partition the 16 neuron emulation structure into groups of triangular and square arrays based on a choice of X. For the N=16 neuron example, an X=4 was chosen as shown in FIG. 13. For a 16 neuron model using a group size H of 16, there are 4 triangular arrays, labeled 1, 2, 3, and 4 and 6 square arrays, labeled 5, 6, 7, 8, 9, and 10. The square arrays are each separated into two single processor square arrays, preserving their horizontal and vertical trees, and then folded into the desired triangular arrays. The resulting 16 triangular arrays, in this case, are shown in FIG. 14 through FIG. 21, each marked with a group label referring to FIG. 13 The external ALU tree summation and sigmoid emulation functions, and CAT communications paths, completing the 16 neuron model, are shown in FIG. 22, where (→) indicates the forward summation path and the (←) indicates the reverse communications path. For ease of representation, in FIG. 13 through FIG. 23 and other figures used through out this paper, please note the letters A through G are substituted for numeric values 10 through 16 for the neuron weights and Y values:

A=10
B=11
C=12
D=13
E=14
F=15
G=16

5. External Tree Requirements and Description

It should be noted that the partitioning algorithm applied to restructure the square arrays as two triangular arrays, affected the CAT communication path. We continue our discussion on the group partitioning algorithms, with the purpose of demonstrating that the functionality of the original structure can be preserved after partitioning has been completed. In order to demonstrate the preservation of functionality, it is important to establish the functional requirements. First, for ease of description, the external tree requirements without learning are described, using an example tree and switching mechanism for both the N=8 and N=16 with X=4 examples, FIG. 23. Second, additional requirements and how they are met in order to include support for learning are described.

FIG. 23A presents the external switch path mechanism and CATs and for the 8 neuron emulation example for Y1 and Y5 while FIG. 23B presents the external switches and CATs for the 16 neuron emulation example for Y1, Y5, Y9, and YD. The same type of switching tree mechanisms are used for the other emulated neuron outputs in each example. It is important to note that a path switch in the CAT communications path is implemented by the switching tree mechanism. For example in FIG. 23A "Switch Position For Communications", Y1 is communicated to the A1 and A5 CAT paths while Y5 is communicated to B1 and B5. Referring to FIG. 9 and FIG. 11, triangular structures, it can be observed that within the Diagonal-PEs and General-PEs, the Y values are received into the correct register, opposite from the respective ALU tree's source point. The same switch in the communications path is observed in the 16 neuron example, FIG. 23B.

The switching tree mechanism, FIG. 23, requires further modification for the support of back-propagation learning. There are four different operating modes to be supported by the switching tree mechanism. Two of the modes are due to the neuron emulation of equations 1 and 2, as presented in FIG. 23A and FIG. 23B, and the other two are due to back-propagation learning. In particular, the operating modes are:

1. External summation of the partially created neuron input ALU summation function from the group chips.
2. Reverse communication of neuron output Y values.
3. Reverse communication of error signals $E_i$ in learning, where $E_i = \delta_i$.
4. External summation of the weighted error ALU summations $ER_i$ in learning, where $$ER_i = \sum_{c=m+1}^{N} \delta_c W_{ci}.$$

Operating modes 1 and 4 relate to the CAT summation paths and operating modes 2 and 3 relate to the CAT communications path. The external ALU function and communication requirements for learning and neuron execution are different. Therefore, different values are externally summed and different values are communicated depending upon whether the hardware is in a neuron emulation mode or emulating a learning mode. In more detail, consider the communication paths for neuron execution as compared to learning. In neuron emulation mode, a communicated $Y_j$ must be multiplied with its appropriate $W_{ij}$, while in learning, a communicated error signal, $E_i$, must be multiplied with its appropriate $W_{ij}$ (see Rumelhart 86). This seemingly small change in subscripts of the reverse communicated values, $Y_j$ and $E_i$, indicates that different communications paths are required for the $Y_j$ value as compared to the $E_i$ value. The different paths are due to the separated triangles of the partitioned inner square. The splitting apart of the partitioned inner square General-PE array into two single processor arrays, separated the internal General-PE path switch, required for complete connectivity. To maintain functionality, the internal General-PE path switch must, in some manner, be restored. The switching tree, FIG. 23 of the examples, must be modified to support both different path requirements for neuron emulation and learning. FIG. 24 presents the modified switching tree mechanism for the 8 neuron example where the labeled FIGS. 1–4 correspond to the four switch operating modes described above.

It will be noted that not all paths are modified, depending upon the operating mode. Using FIG. 24 as an example, the operating mode (1) neuron input ALU summation paths, for signals A1 and B5, are the same paths required for the weighted error ALU summations, operating mode (4), for signals A1 and B5. In addition, the communication's paths for signals A1 and B5 are the same in both neuron emulation, operating mode (2), and in learning, operating mode (3). It should be noticed from FIG. 9, that A1 and B5 are associated with the diagonal triangular arrays not requiring use of the partitioning algorithm. The paths which must be modified, depending upon the operating mode, are those paths that are associated with the separated triangular structures from the partitioned inner squares.

6. Switching Tree Mechanism

The previous discussion concerning the four operating modes, suggests the necessity of a general switching mechanism and a procedure for defining the switch connections. In this section a procedure is presented that defines the switching tree for the interconnection of the "building block" chips generated from the partitioning algorithm. Following the description of the procedure to create a switching tree, it is demonstrated that the functionality for neural emulation is preserved by the switching tree mechanism.

Figure 25A:
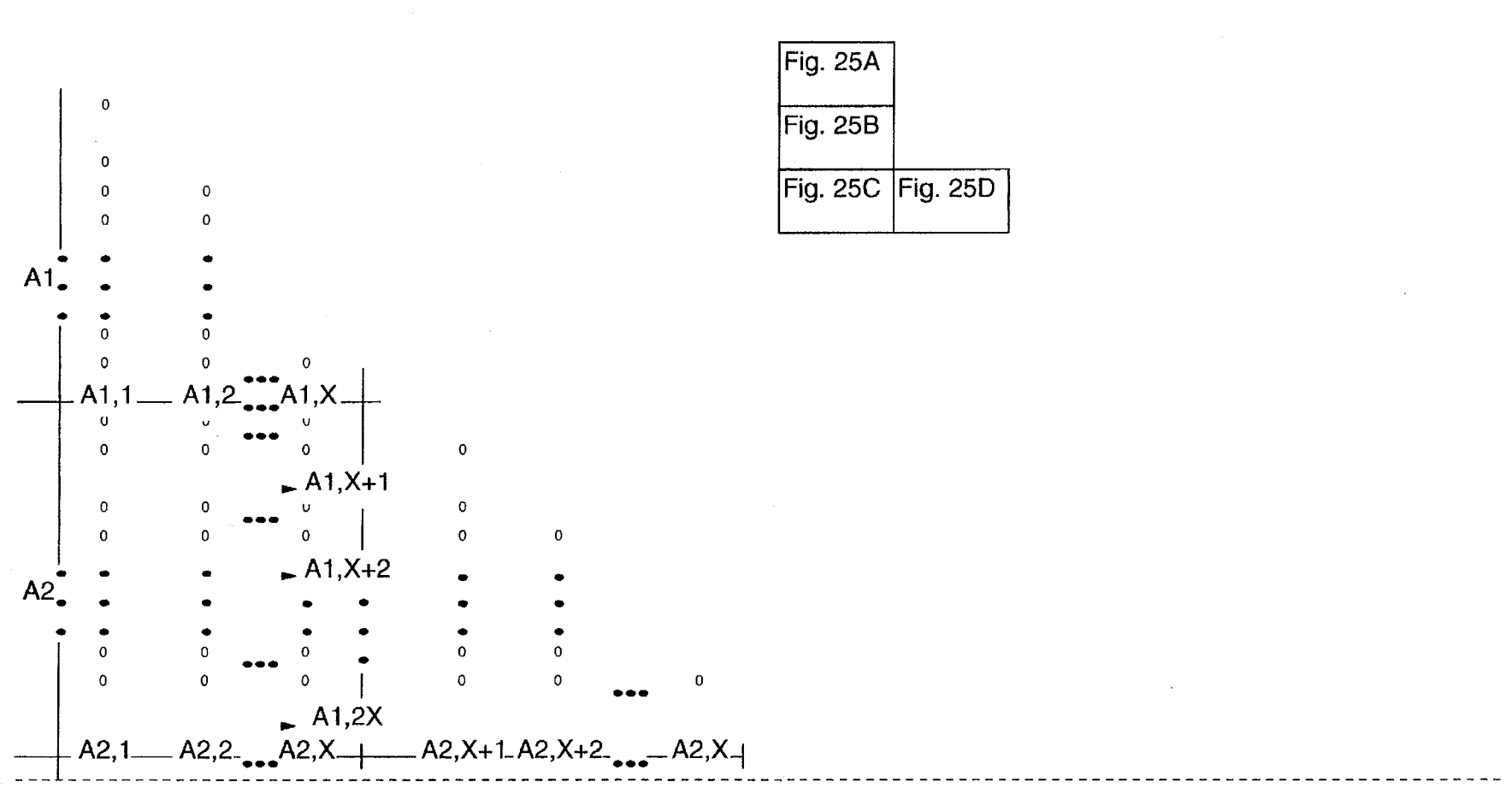
Figure 25C:
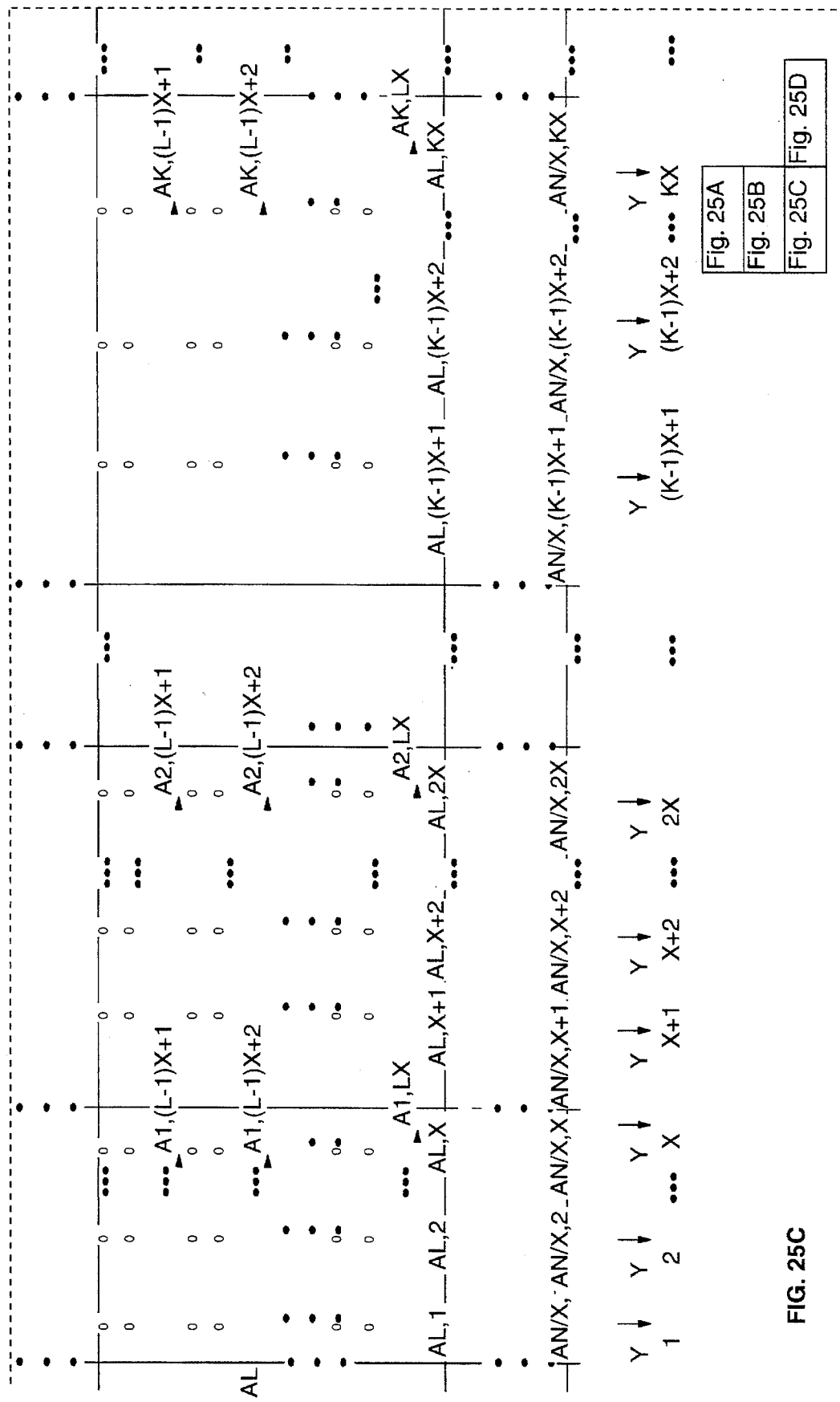
FIG. 25 illustrates a Generalized Triangular Processor Array Partitioned by X.

Consider a generalized triangular array, as depicted in FIG. 25, with the triangular and square arrays outlined, as produced by application of the partitioning approach with a partition size of X. It should be noted that the triangular and square array output signals are listed on the edges of the arrays in FIG. 25. The triangular array outputs are placed on the bottom edge of the triangular array and the square array outputs are placed on the bottom and right side edges of the square arrays. It is assumed that balanced binary CATs are used throughout, where delay elements are used as appropriate to ensure a balanced tree.

The generalized neuron emulation equations can be written as a function of the partitioned triangular and square array output signals, in terms of K, L, X, and N, by the following:

$$Y_1 = F(A_{1,1} + A_{2,1} + \ldots + A_{K,1} + \ldots + A_{L,1} + \ldots + A_{N/X,1})$$

$$Y_2 = F(A_{1,2} + A_{2,2} + \ldots + A_{K,2} + \ldots + A_{L,2} + \ldots + A_{N/X,2})$$

$$\vdots$$

$$iY_X = F(A_{1,X} + A_{2,X} + \ldots + A_{K,X} + \ldots + A_{L,X} + \ldots + A_{N/X,X})$$

$$Y_{X+1} = F(A_{1,X+1} + A_{2,X+1} + \ldots + A_{K,X+1} + \ldots + A_{L,X+1} + \ldots + A_{N/X,X+1})$$

$$Y_{X+2} = F(A_{1,X+2} + A_{2,X+2} + \ldots + A_{K,X+2} + \ldots + A_{L,X+2} + \ldots + A_{N/X,X+2})$$

-continued $$Y_{2X} = F(A_{1,2X} + A_{2,2X} + \ldots + A_{K,2X} + \ldots + A_{L,2X} + \ldots + A_{N/X,2X})$$

.
.
.

$$Y_{(K-1)X+1} = F(A_{1,(K-1)X+1} + A_{2,(K-1)X+1} + \ldots + A_{K,(K-1)X+1} + \ldots + A_{L,(K-1)X+1} + \ldots + A_{N/X,(K-1)X+1})$$

$$Y_{(K-1)X+2} = F(A_{1,(K-1)X+2} + A_{2,(K-1)X+2} + \ldots + A_{K,(K-1)X+2} + \ldots + A_{L,(K-1)X+2} + \ldots + A_{N/X,(K-1)X+2})$$

.
.
.

$$Y_{KX} = F(A_{1,KX} + A_{2,KX} + \ldots + A_{K,KX} + \ldots + A_{L,KX} + \ldots + A_{N/X,KX})$$

.
.
.

$$Y_{(L-1)X+1} = F(A_{1,(L-1)X+1} + A_{2,(L-1)X+1} + \ldots + A_{K,(L-1)X+1} + \ldots + A_{L,(L-1)X+1} + \ldots + A_{N/X,(L-1)X+1})$$

$$Y_{(L-1)X+2} = F(A_{1,(L-1)X+2} + A_{2,(L-1)X+2} + \ldots + A_{K,(L-1)X+2} + \ldots + A_{L,(L-1)X+2} + \ldots + A_{N/X,(L-1)X+2})$$

.
.
.

$$Y_{LX} = F(A_{1,LX} + A_{2,LX} + \ldots + A_{K,LX} + \ldots + A_{L,LX} + \ldots + A_{N/X,LX})$$

.
.
.

$$Y_{N-X+1} = F(A_{1,N-X+1} + A_{2,N-X+1} + \ldots + A_{K,N-X+1} + \ldots + A_{L,N-X+1} + \ldots + A_{N/X,N-X+1})$$

$$Y_{N-X+2} = F(A_{1,N-X+2} + A_{2,N-X+2} + \ldots + A_{K,N-X+2} + \ldots + A_{L,N-X+2} + \ldots + A_{N/X,N-X+2})$$

.
.
.

$$Y_N = F(A_{1,N} + A_{2,N} + \ldots + A_{K,N} + \ldots + A_{L,N} + \ldots + A_{N/X,N})$$

Figure 26:
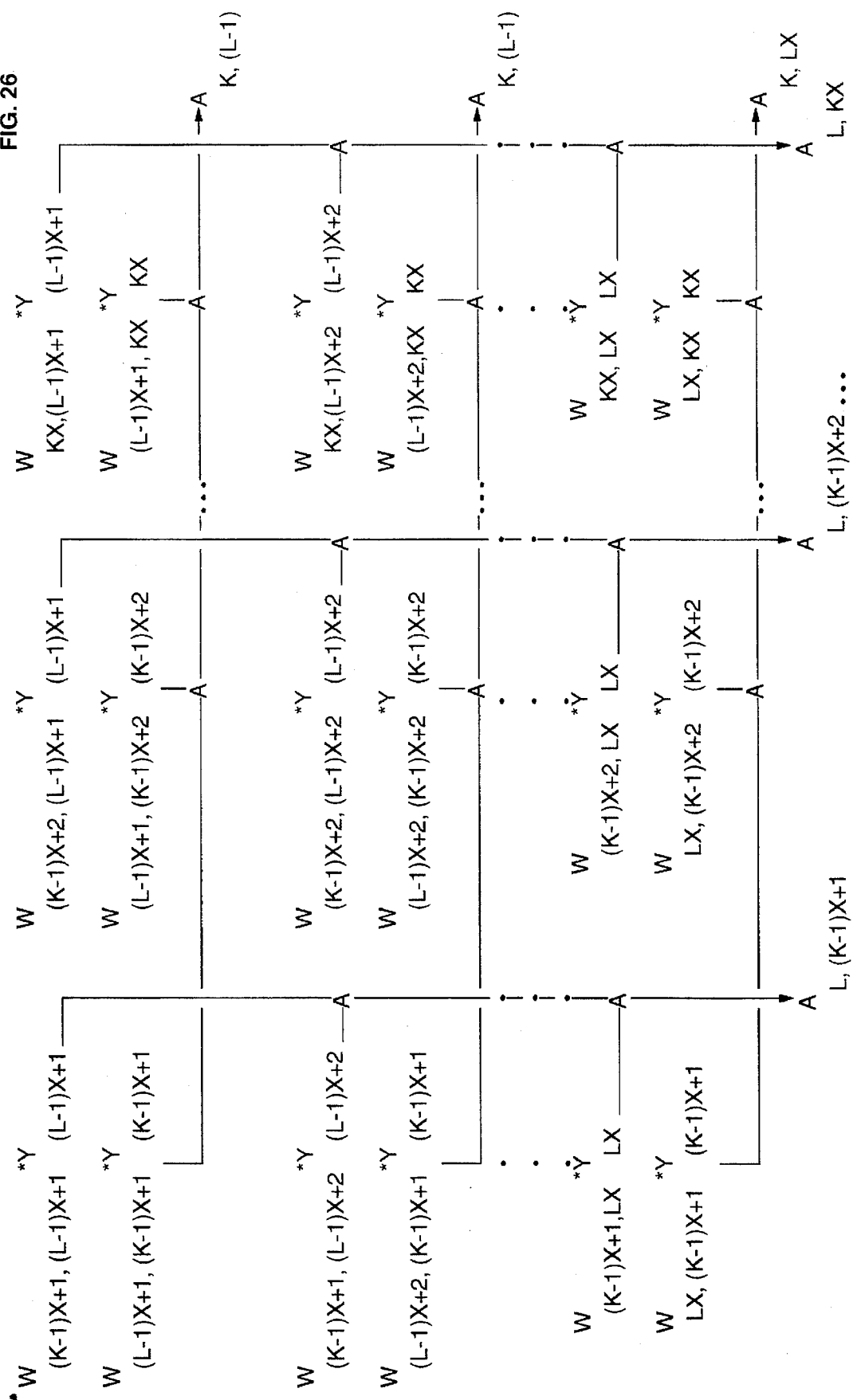
FIG. 26 illustrates a Generalized Inner Square Array.

Consider an arbitrary inner square array, based on an arbitrary K and L shown in FIG. 26. Note that the balanced binary tree is symbolically depicted in FIG. 26 by using the letter "A" at node points.

Figure 27:
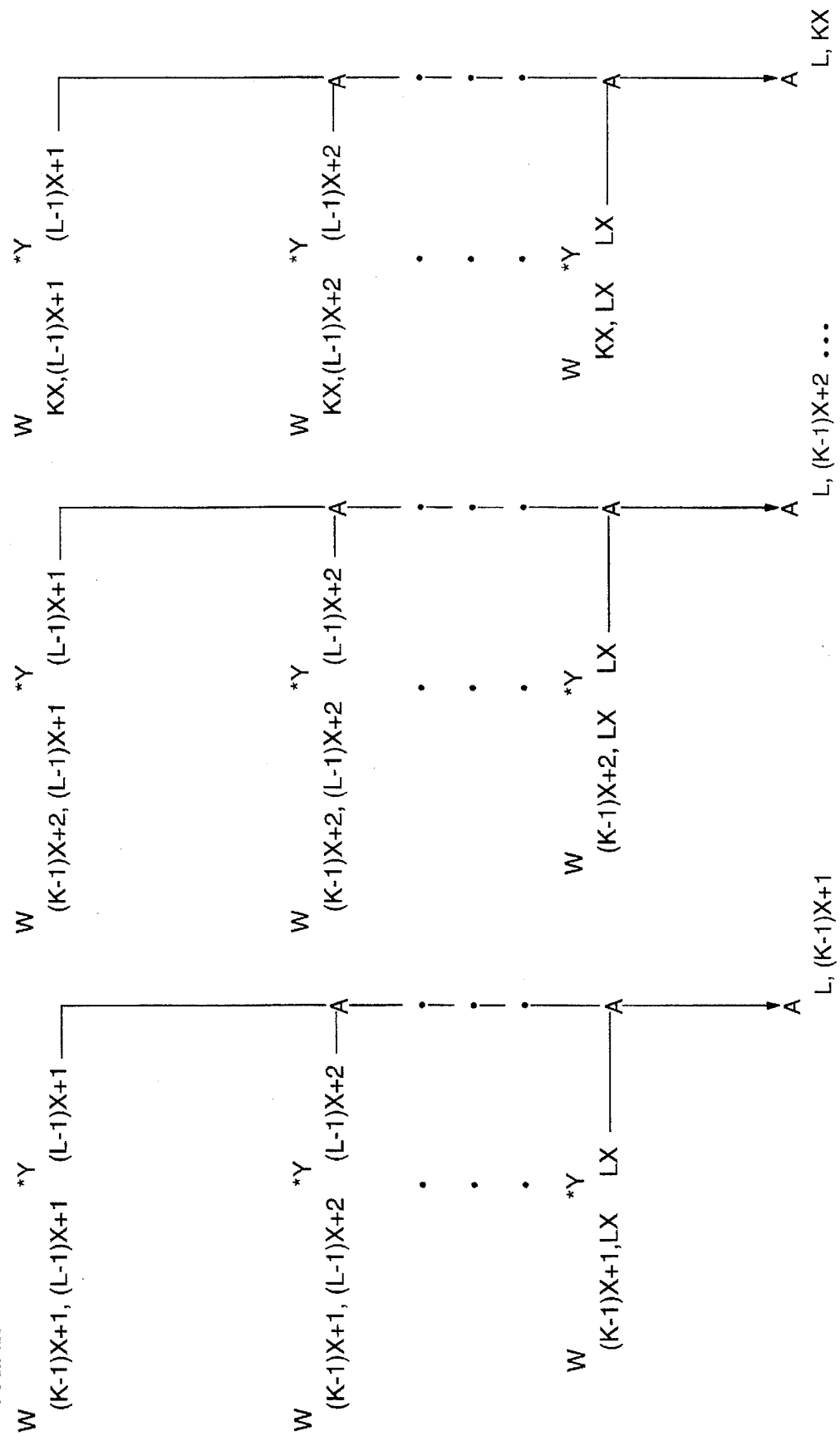
FIG. 27 illustrates the First Separated Square Array Partitioned From the Chosen Arbitrary Inner Square.
Figure 28:
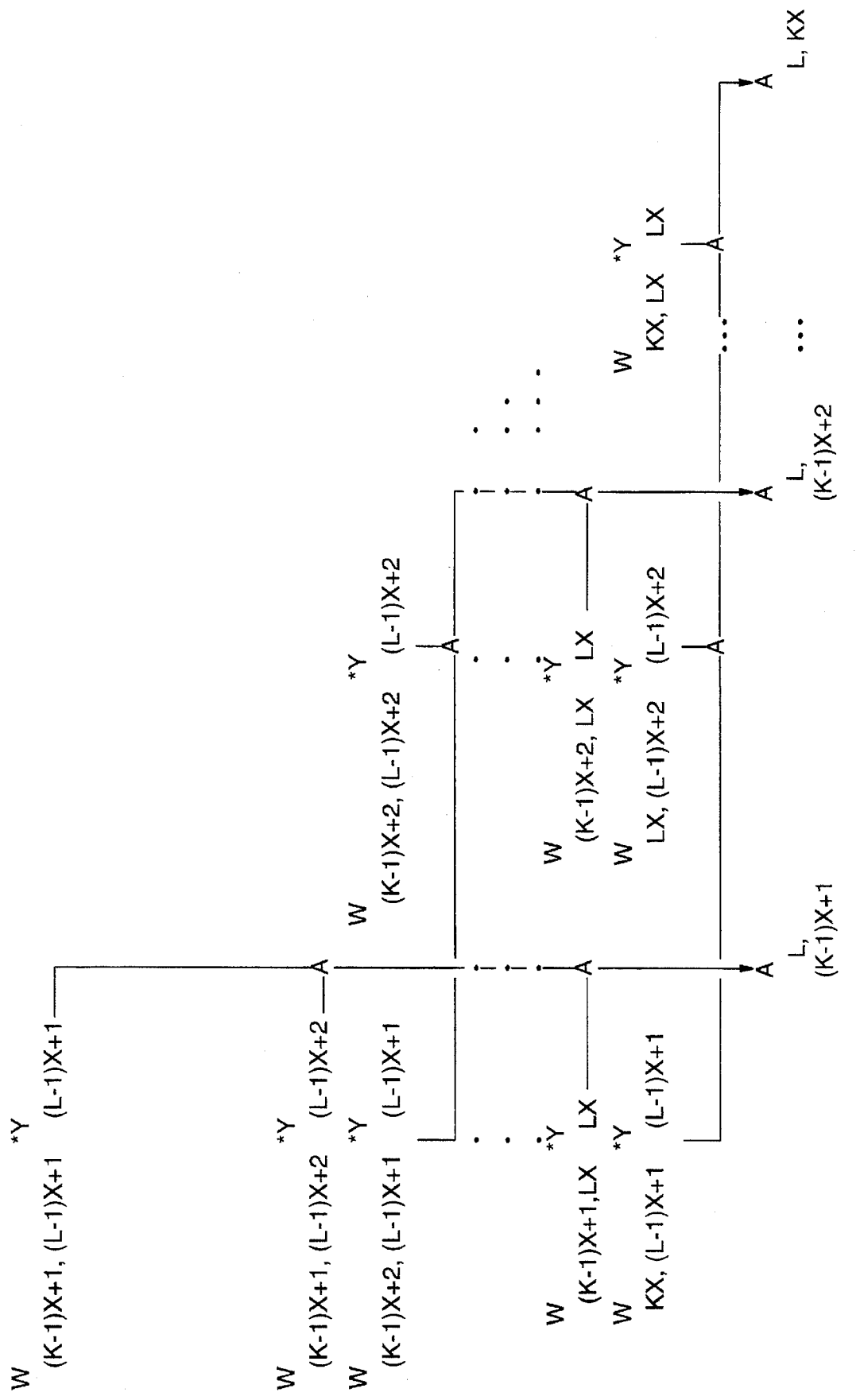
FIG. 28 illustrates the First Separated Square Array Folded into a Triangular Array.
Figures 29A, 29B:
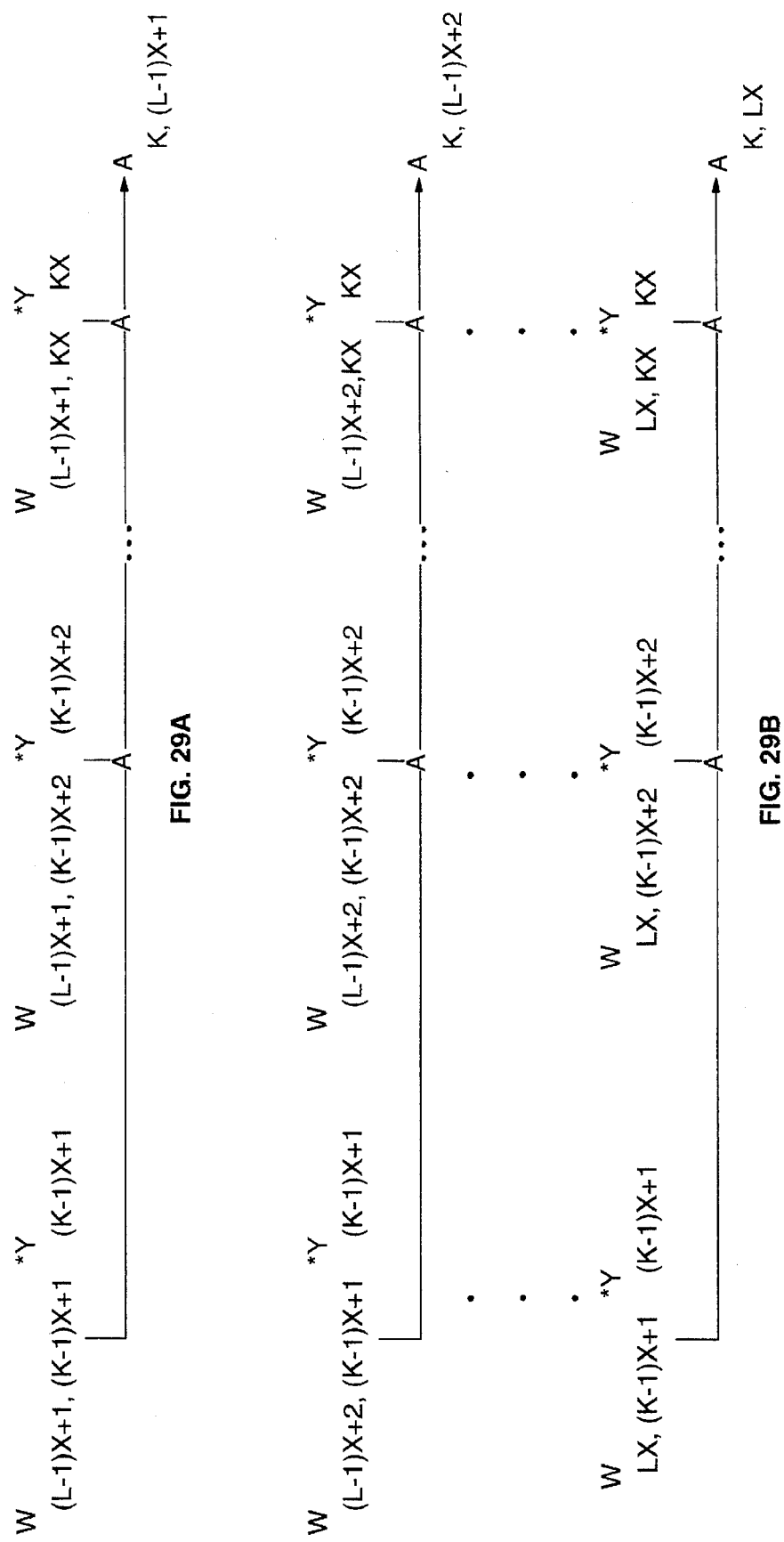
FIG. 29 illustrates the Second Separated Square Array Partitioned From the Chosen Arbitrary Inner Square.

In applying the square partitioning algorithm, the arbitrary inner square can be partitioned into two folded triangular arrays. The algorithm is applied by separating the inner square into two square arrays, FIG. 27 and FIG. 29, followed by the folding to the triangular arrays, FIG. 28 and FIG. 30.

To summarize, a generalized triangular array is used, from which a set of neuron equations are specified in terms of triangular and square array output signals, and the partitioning algorithm is applied creating the G triangular arrays.

As defined for, but not limited to, neuron emulation, i.e. the emulation of equation 1, the outputs of the partitioned triangular arrays are grouped into square arrays of output signals in the following manner:

1. Create the first of N/X square arrays composed of the partitioned group chips output signals for the Root Tree Processor emulated neurons represented by output signals $Y_1, Y_{X+1}, Y_{2X+1}, \ldots Y_{N-X+1}$, FIG. 31.
  a. Place the chips output signals associated with $Y_1$ in the first row of the array.
  b. Place the chips output signals associated with $Y_{X+1}$ in the second row of the array.
  c. Place the chips output signals associated with $Y_{2X+1}$ in the third row of the array.
  d. Continue placing the chips output signals . . . in rows of the array, until:
  e. Place the chips output signals associated with $Y_{N-X+1}$ in the last row of the array.

2. Create the second of N/X square arrays composed of the partitioned group chips output signals for the Root Tree Processor emulated neurons represented by output signals $Y_2, Y_{X+2}, Y_{2X+2}, \ldots Y_{N-X+2}$.

3. Continue creating square arrays composed of the partitioned group chips output signals for the Root Tree Processor emulated neurons represented by output signals . . . , until:

4. Create the N/X$^{th}$ square array composed of the partitioned group chips output signals for the Root Tree Processor emulated neurons represented by output signals $Y_X, Y_{2X}, Y_{3X}, \ldots Y_N$.

This procedure creates N/X square arrays of output signals from the partitioned triangular arrays. For example, the first square array for the Root Tree Processor emulated neurons represented by output signals $Y_1, Y_{X+1}, Y_{2X+1}, \ldots Y_{N-X+1}$ is shown in FIG. 31.

In the next step of the switching tree procedure, each of these N/X squares is folded and external switches and ALU trees are added as shown in the following example for the Folded First Output Array FIG. 32.

The $z_i$ outputs of the N/X switching tree mechanisms are connected to the appropriate Host/Root Tree Processor completing the mechanism description.

7. Switching Tree Pressure Functionality

Figure 32:
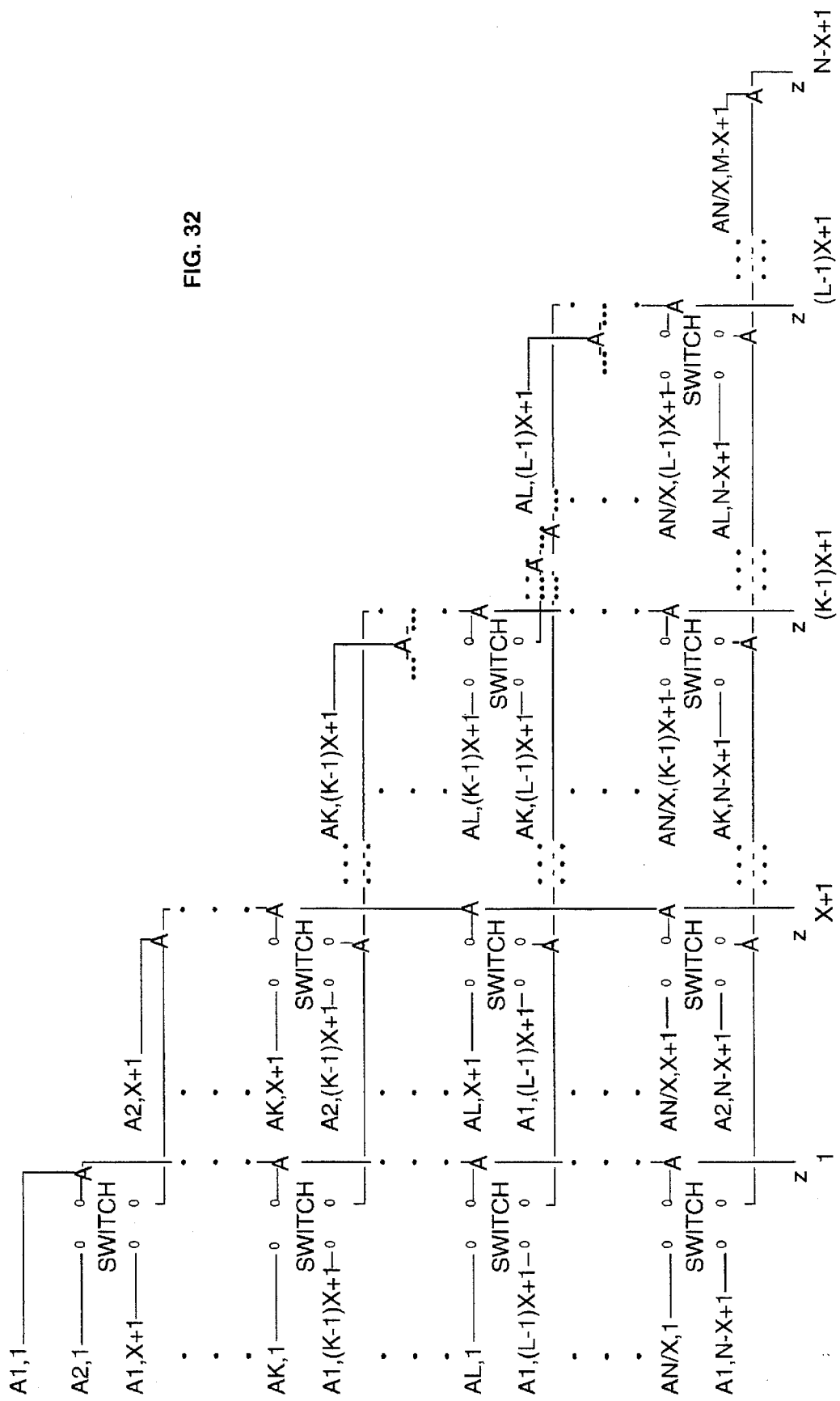
FIG. 32 illustrates the Folded First Output Array With External Switches and ALU Tree Added.

To support the four operational modes, namely the neuron input summation (1), the Y value communications (2), the error signal communications (3), and the weighted error summation (4), the switches depicted in FIG. 32 require only two positions, assuming a bidirectional signal capability is possessed by the switches. In addition, balanced binary trees are assumed to be used in the switching tree mechanism.

Figure 33:
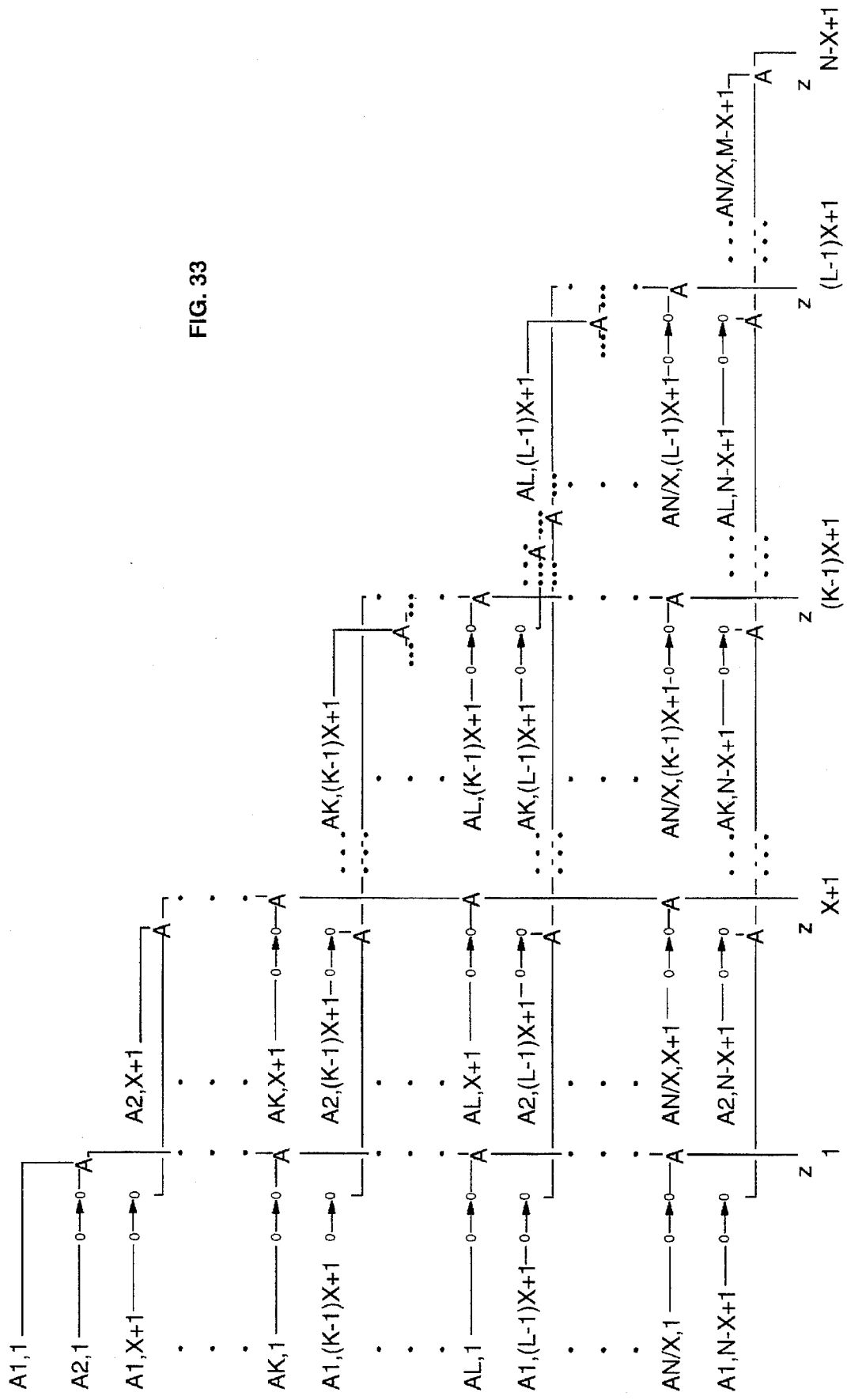
FIG. 33 illustrates the Folded First Output Array With External Switches in ALU Tree Summation Mode 1.

The functionality of the switching tree for the emulation of equation 1 is demonstrated by examining operating mode (1) neuron input forward summation and operating mode (2) Y value communications. The folded first output array is used in these examples by setting the switches and observing that the functionality is met. For the neuron input summation operating mode (1), the switches are placed as depicted in FIG. 33. To verify the neuron input summation function is maintained through the switching tree, an arbitrary Y value is used, chosen based upon the arbitrary inner square separated from the general triangular array structure. For this example $Y_{(K-1)X+1}$ is chosen. The general equation for $Y_{K-1)X+1}$ is repeated here:

$$Y_{(K-1)X+1} = F(A_{1,(K-1)X+1} + A_{2,(K-1)X+1} + \ldots + A_{K,(K-1)X+1} + \ldots + A_{L,(K-1)X+1} + \ldots + A_{N/X,(K-1)} = F(Z_{(K-1)X+1})$$

In examining FIG. 33 it can be observed that the equation for $Y_{(K-1)X+1}$ is preserved.

Figure 34:
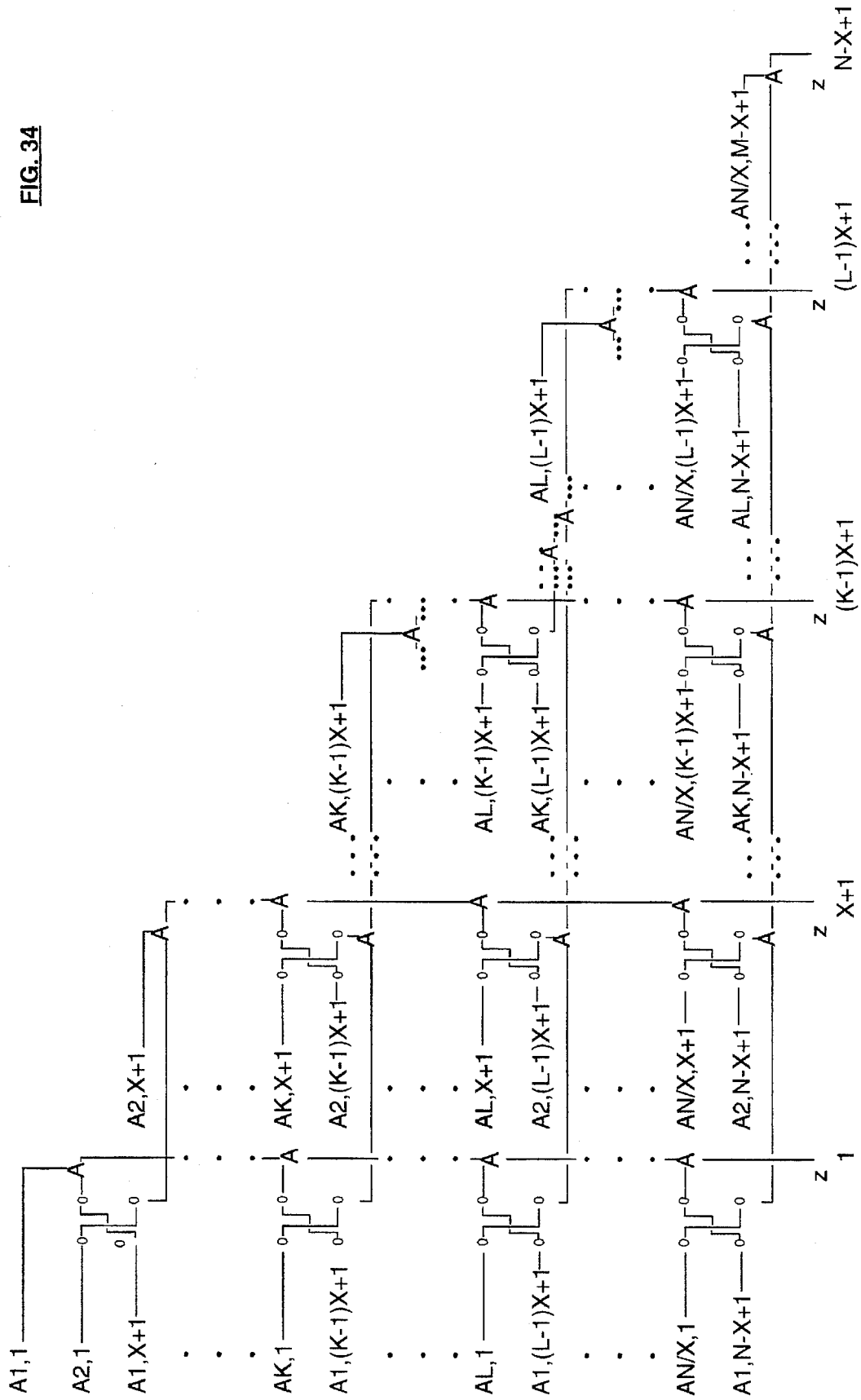
FIG. 34 illustrates the Folded First Output Array With Switches in Y Value Reverse Communications Mode 2.

For the Y value communications mode (2), the switches are placed as depicted in FIG. 34.

In the original TSNAP structure prior to partitioning, the $Y_{(K-1)X+1}$ value would be communicated to each output signal point listed in the $Y_{(K-1)X+1}$ equation. In particular, referring to FIG. 26 the generalized inner square array prior to partitioning, $Y_{(K-1)X+1}$ would be returned through $A_{L,(K-1)X+1}$. In each leaf node of the $A_{L,(K-1)X+1}$ tree in FIG. 26, the General-PEs would receive the $Y_{(K-1)X+1}$ value and switch paths internally to provide the correct destination point.

Figure 30:
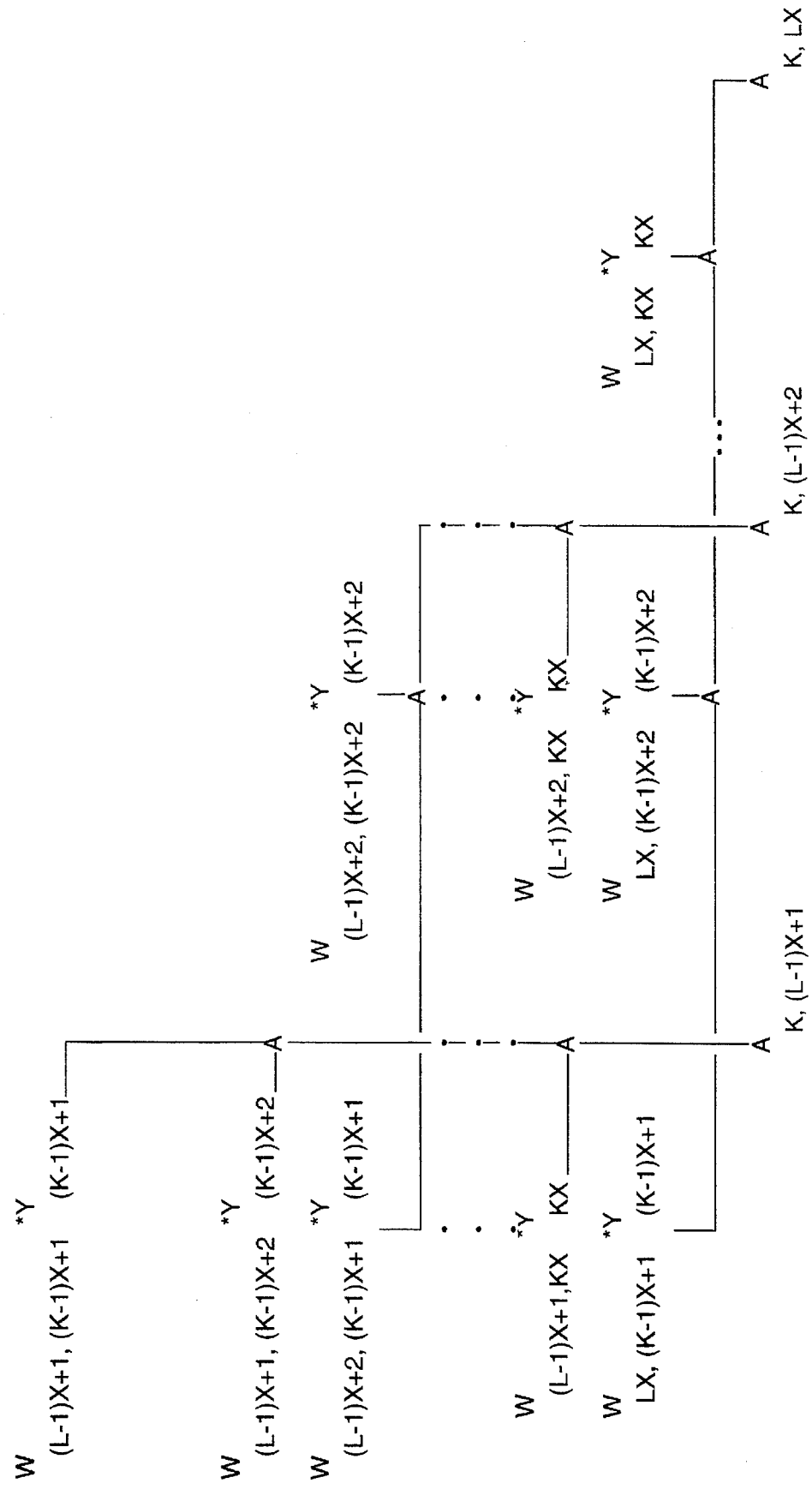
FIG. 30 illustrates the Second Separated Square Array Folded into a Triangular Array.

After partitioning the TSNAP structure, multiple triangular arrays are attached through the switching tree. Using the switching tree mechanism with switch settings as depicted in FIG. 34, $Y_{(K-1)X+1}$ would be transferred to points $A_{K,N-X+1}$, $A_{K,(L-1)X+1}$, $A_{K,(K-1)X+1}$, $A_{K,X+1}$, and $A_{K,1}$. In following path $A_{K,(L-1)X+1}$, which tree is shown in FIG. 30 we find that $Y_{(K-1)X+1}$ would enter the General-PEs leaf nodes and be switched internally to the proper register for the returning Y value.

In a similar manner, the other two operating modes can be demonstrated to function correctly with the switching tree mechanism.

In general, it can be concluded that the procedure for determining the switching tree mechanism preserves the TSNAP functionality, supporting the four operating modes, in the TSNAP structure constructed from multiple "building block" arrays and switching tree mechanisms.

8. Switching Tree Examples

Figures 1, 2, 35B:
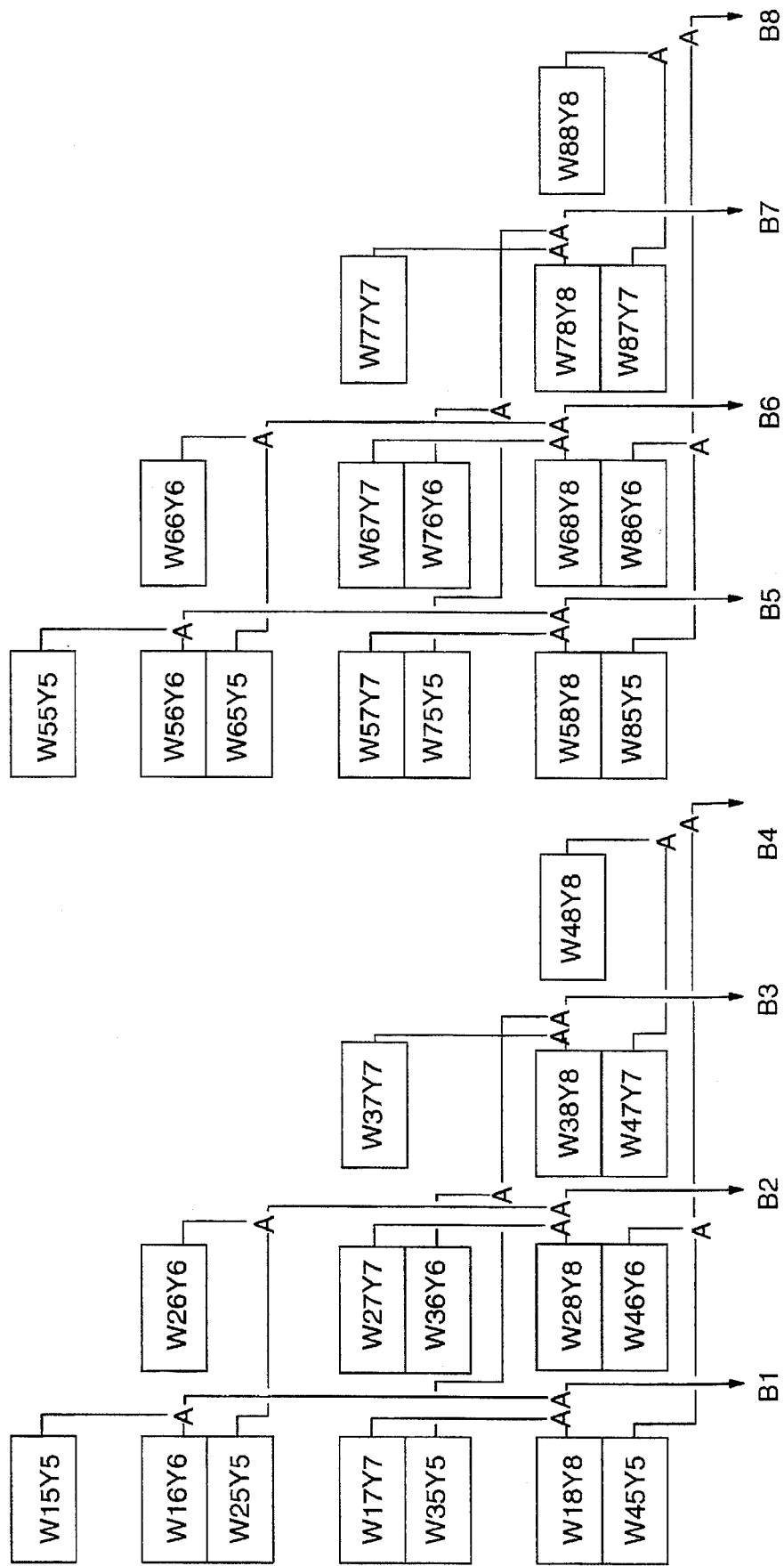
Figure 35C:
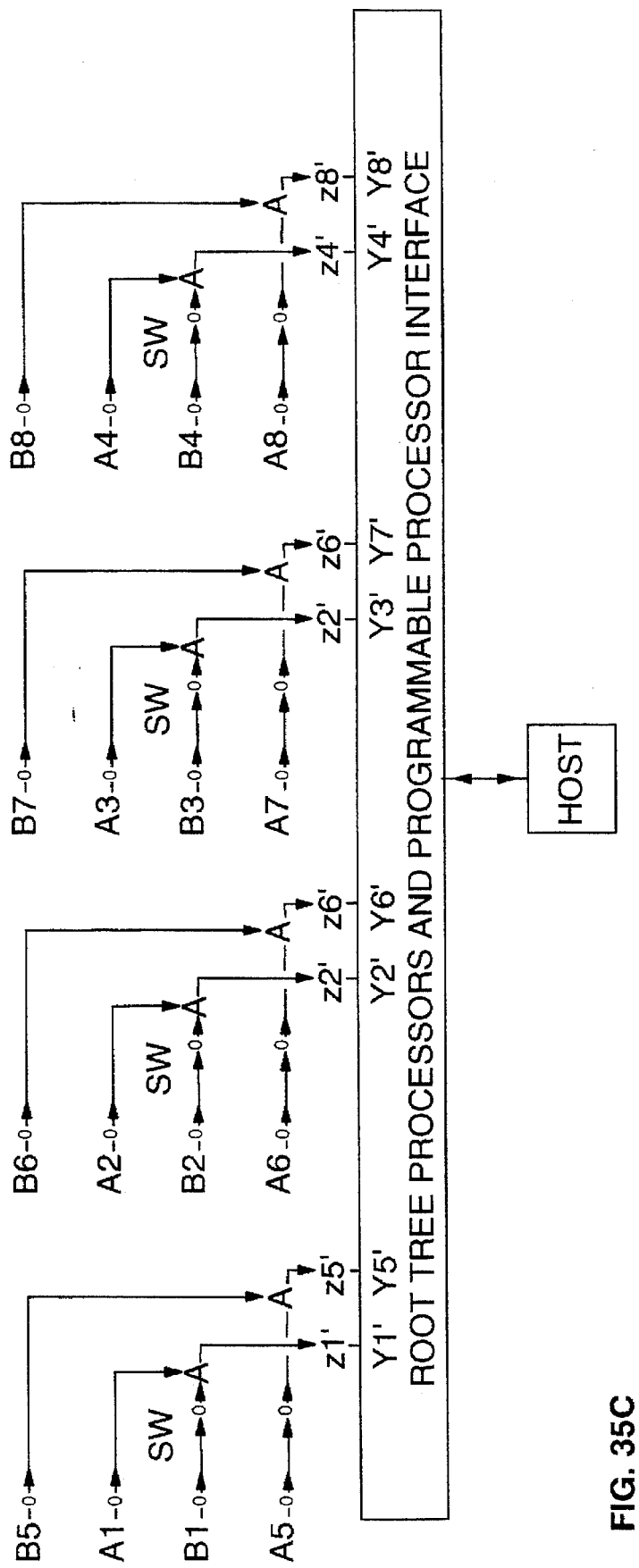
FIG. 35 shows an Eight Neuron Structure (G=4, H=16): Mode 1: Forward ALU Tree Summation.
Figures 1, 2, 36A:
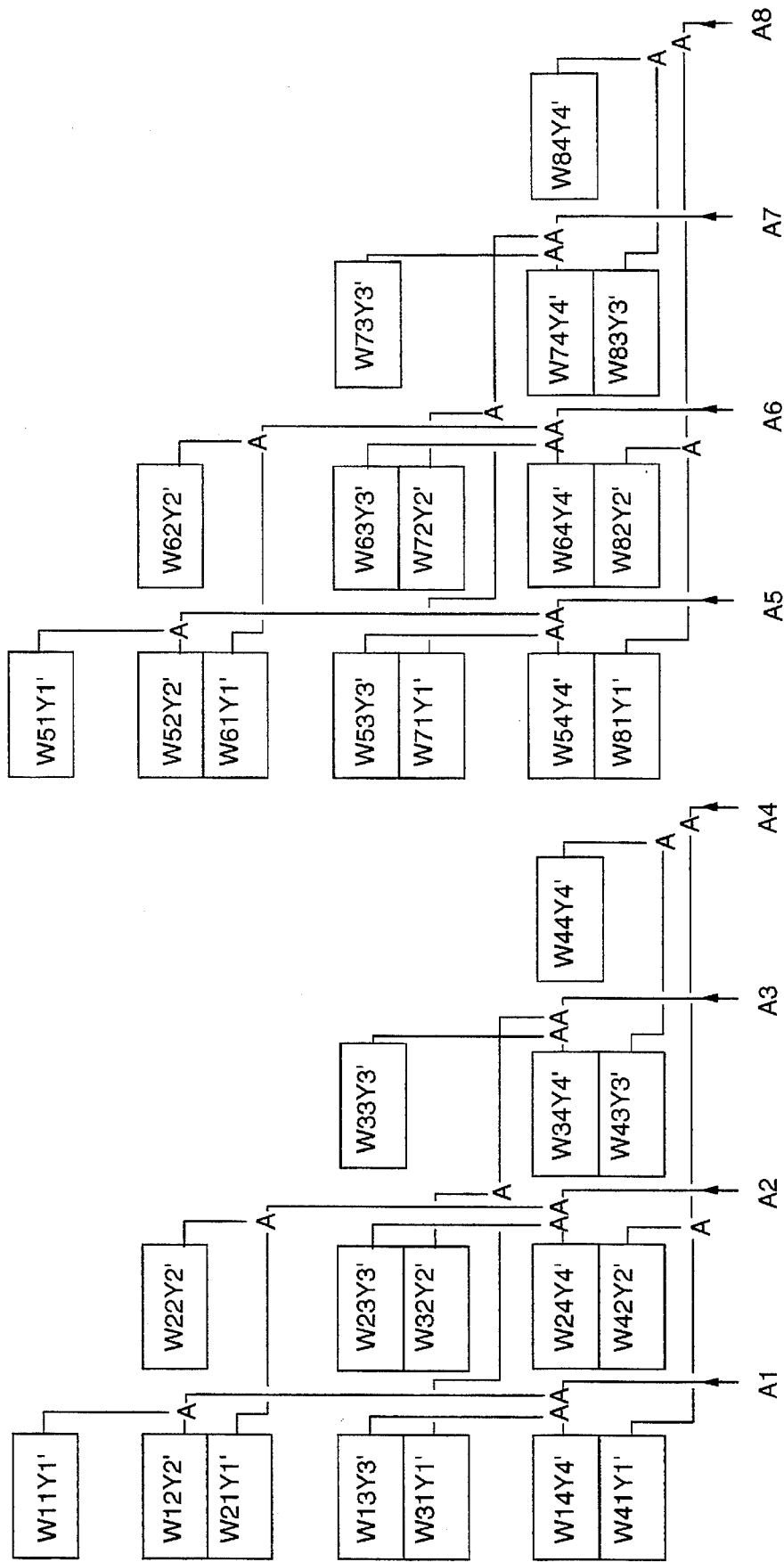
Figure 36C:
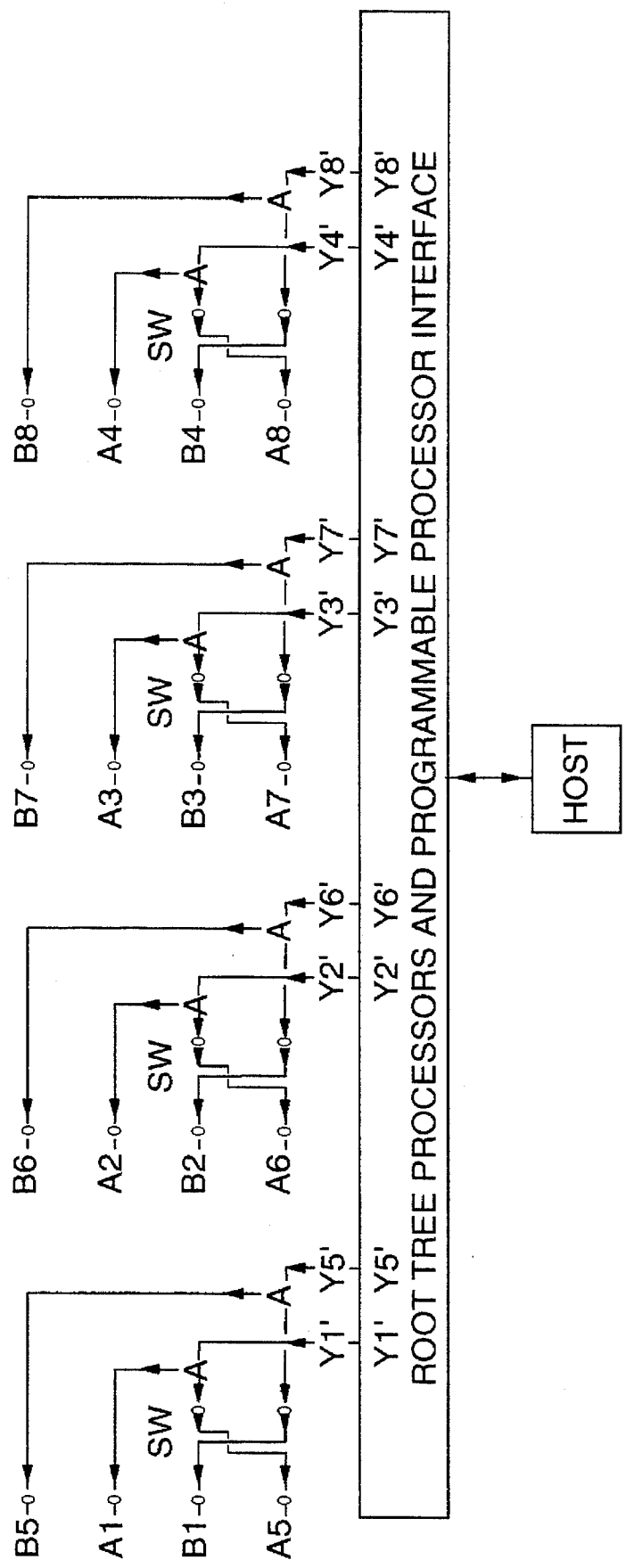
FIG. 36 shows an Eight Neuron Structure (G=4, H=16): Mode 2: Y Value Reverse Communications.

To further clarify the switching tree mechanism two examples are presented. The first example follows from the eight neuron emulation model with G=4 and H=16. FIG. 35 depicts the switching tree configured for mode (1) providing the neural input summations to the Host/Root Tree Processors. For example in FIG. 35, Y7' is generated in Root Tree Processor 7 from the A7 and B7 inputs supplied to the switching tree. A7 supplies the quantity (W71Y1+W72Y2+W73Y3+W74Y4) while B7 supplies the quantity (W75Y5+W76Y6+W77Y7+W78YS). In Y value communication's mode (2) the switching tree mechanism is configured as shown in FIG. 36. For example, Y7 is communicated to points B3 and B7 which are the correct paths for Y7.

Figures 1, 2, 37B:
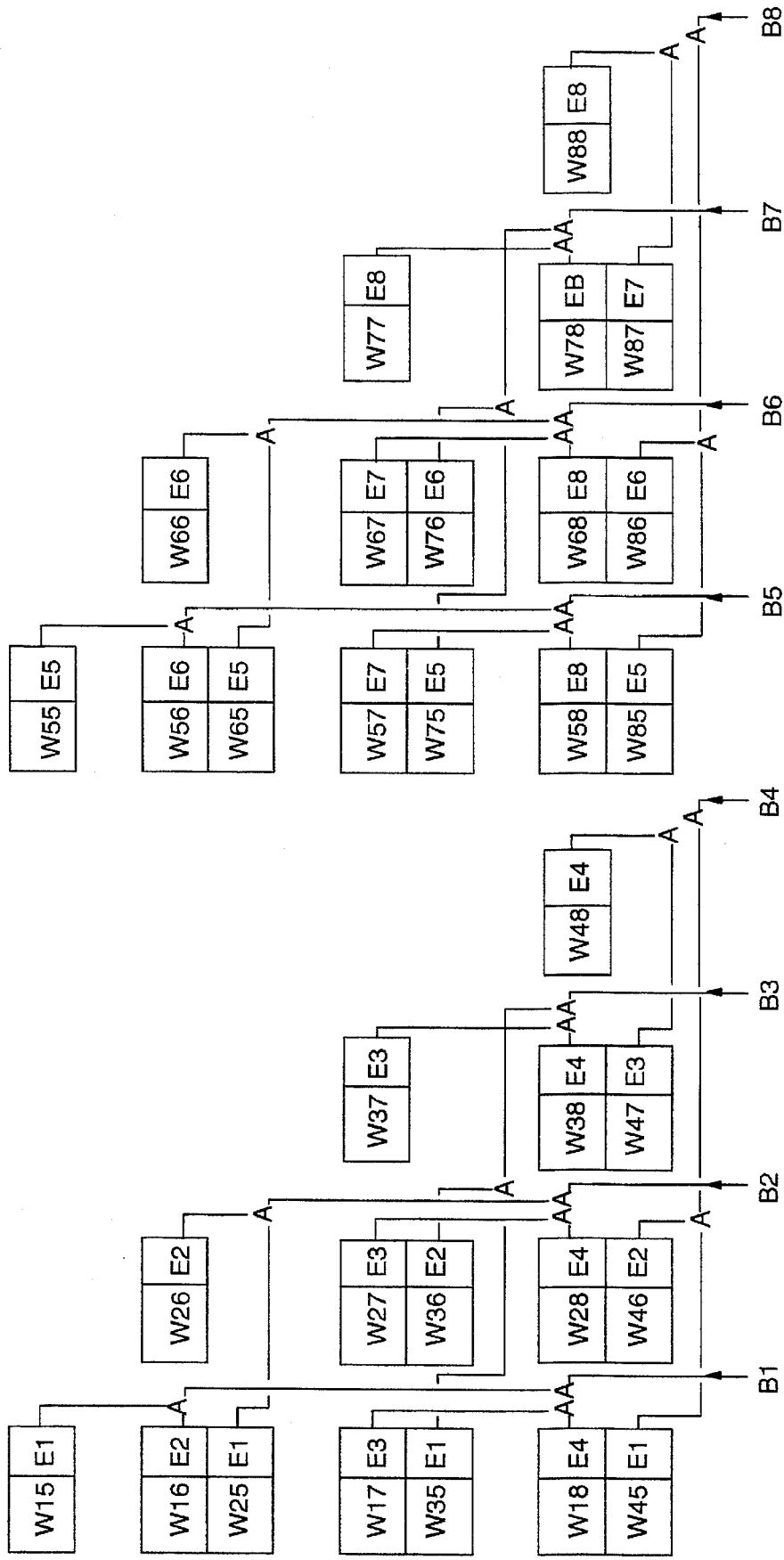
Figure 37C:
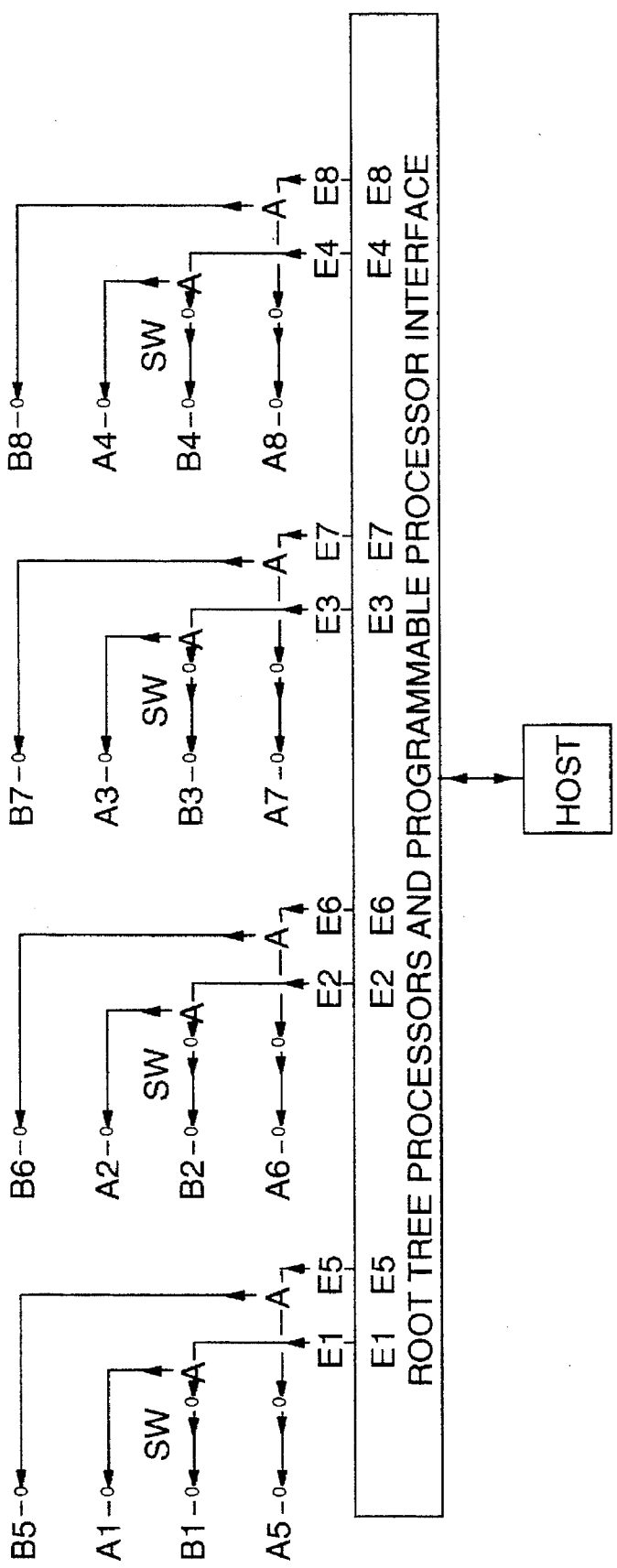
FIG. 37 shows an Eight Neuron Structure (G=4, H=16): Mode 3: E Value Reverse Communications.
Figures 1, 2, 38A:
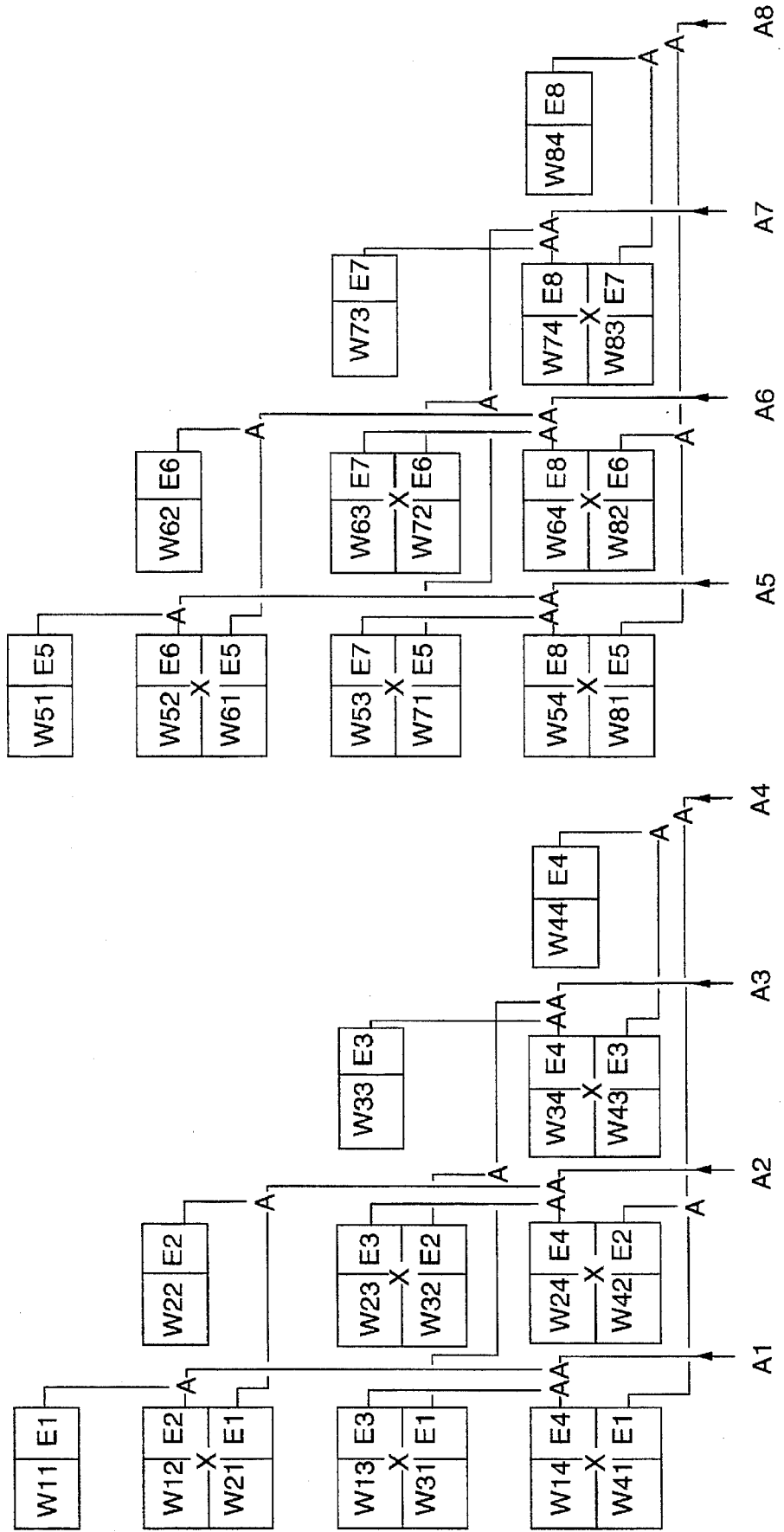
Figure 38C:
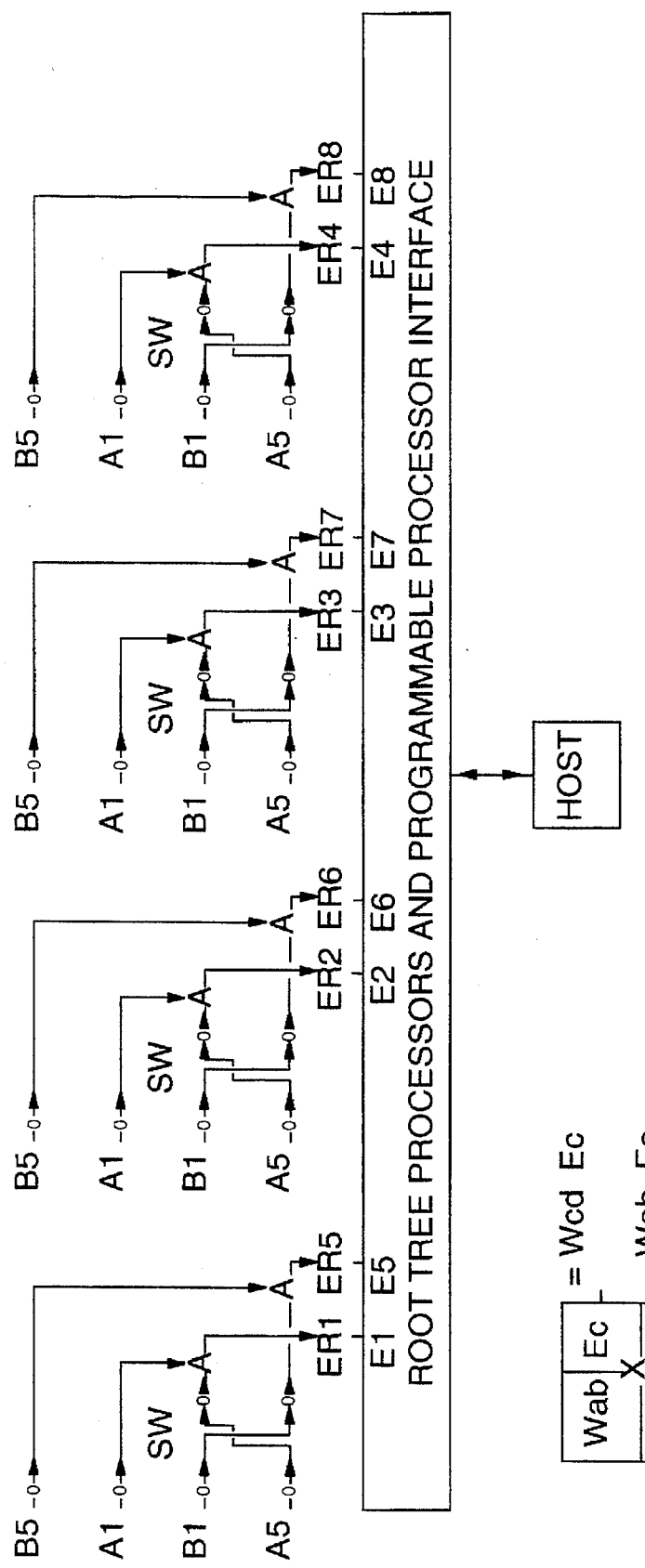
FIG. 38 shows an Eight Neuron Structure (G=4, H=16): Mode 4: Weighted Error ALU Tree Summations (General-PEs Select Opposite E values for Multiplication).

The switching tree is configured for operation mode (3) as shown in FIG. 37 which communicates the error signals $E_i$, for example $E_7$ through points A7 and B7 with the General-PEs switching the internal path in the same manner as the General-PEs received Y values. For the weighted error summation operating mode (4), the General-PEs select the W values that are associated with the opposite processor, as symbolized by the "X" cross in the center of the General-PE cells depicted in FIG. 38. The operand choice is easily determined by the instruction received in each General-PE processor. For example:

$$ER7 = B3 + B7$$

Where:

$$B3 = W17*E1 + W27*E2 + W37*E3 + W47*E4$$

$$B7 = W57*E5 + W67*E6 + W77*E7 + W87*E8$$

Figures 1, 39I:
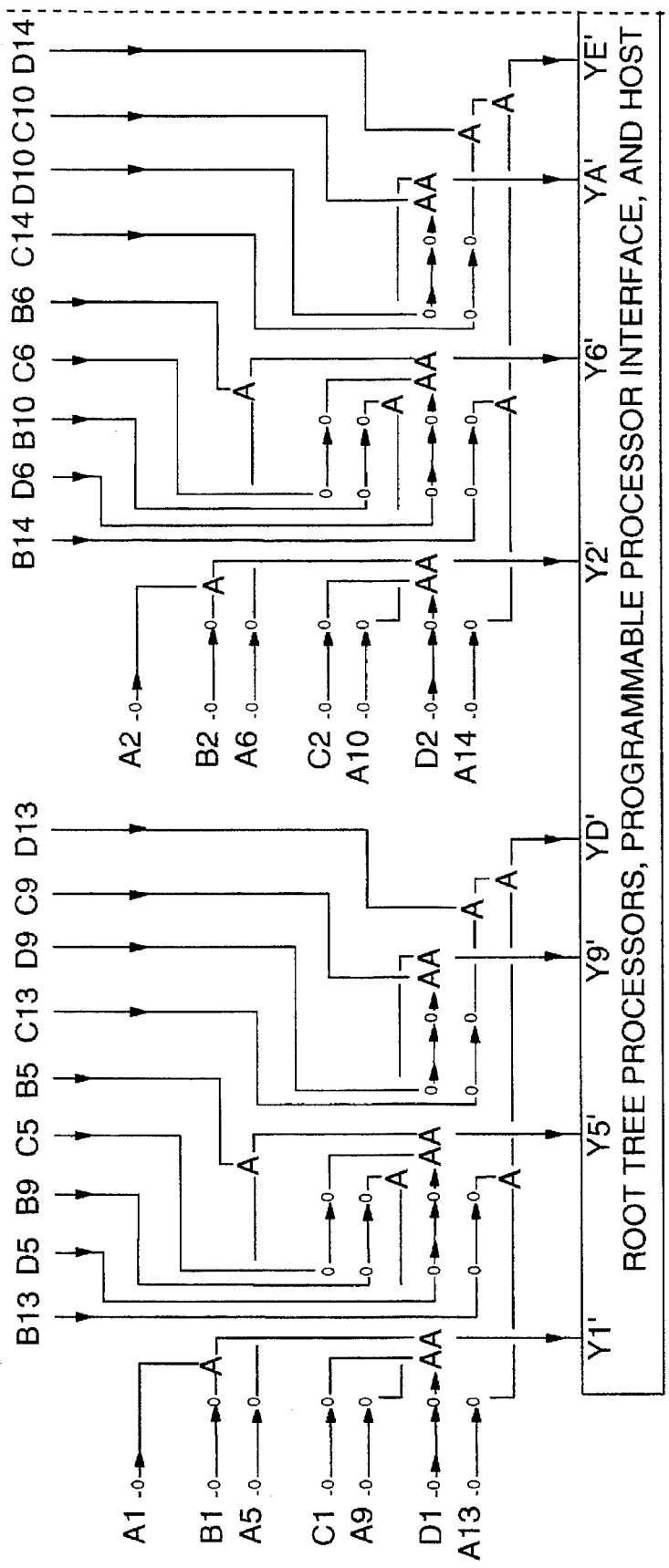
Figures 2, 39I:
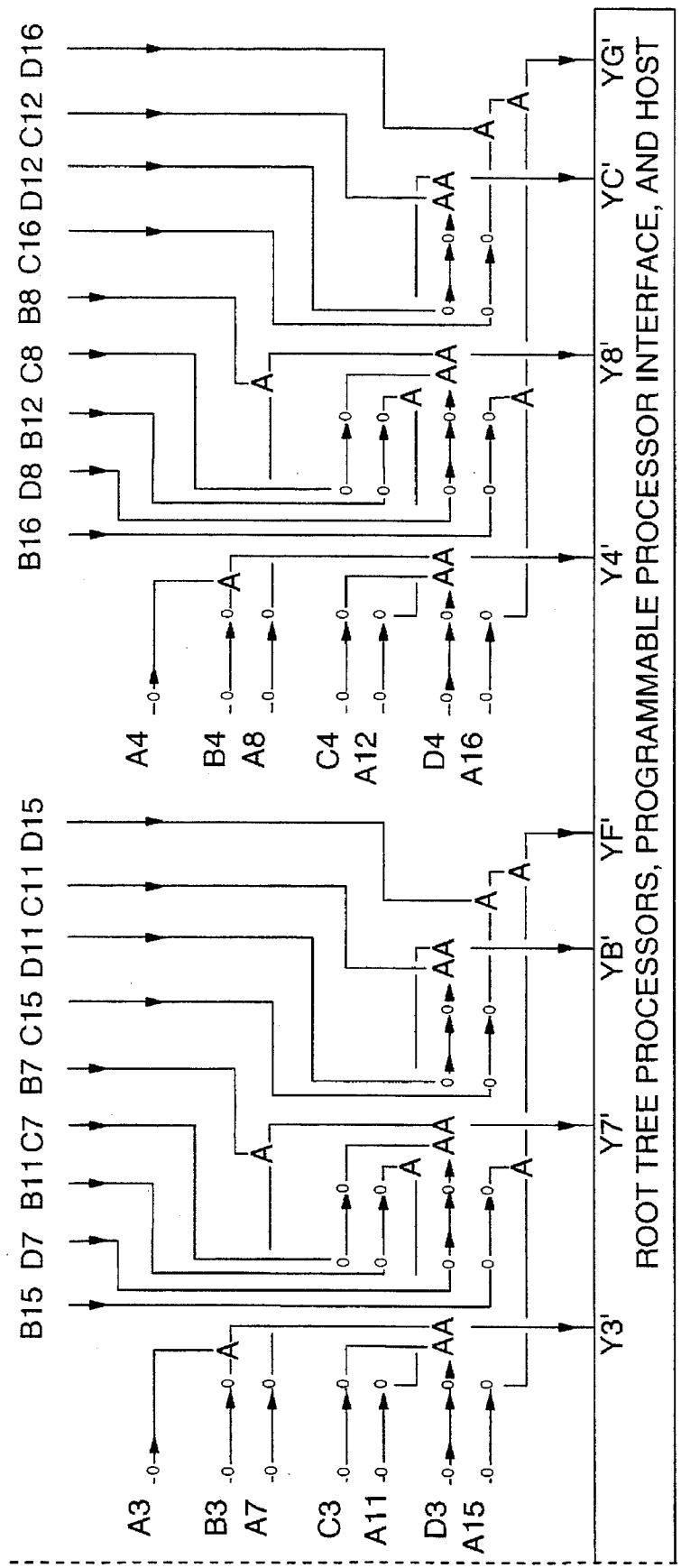
Figures 1, 2, 40D:
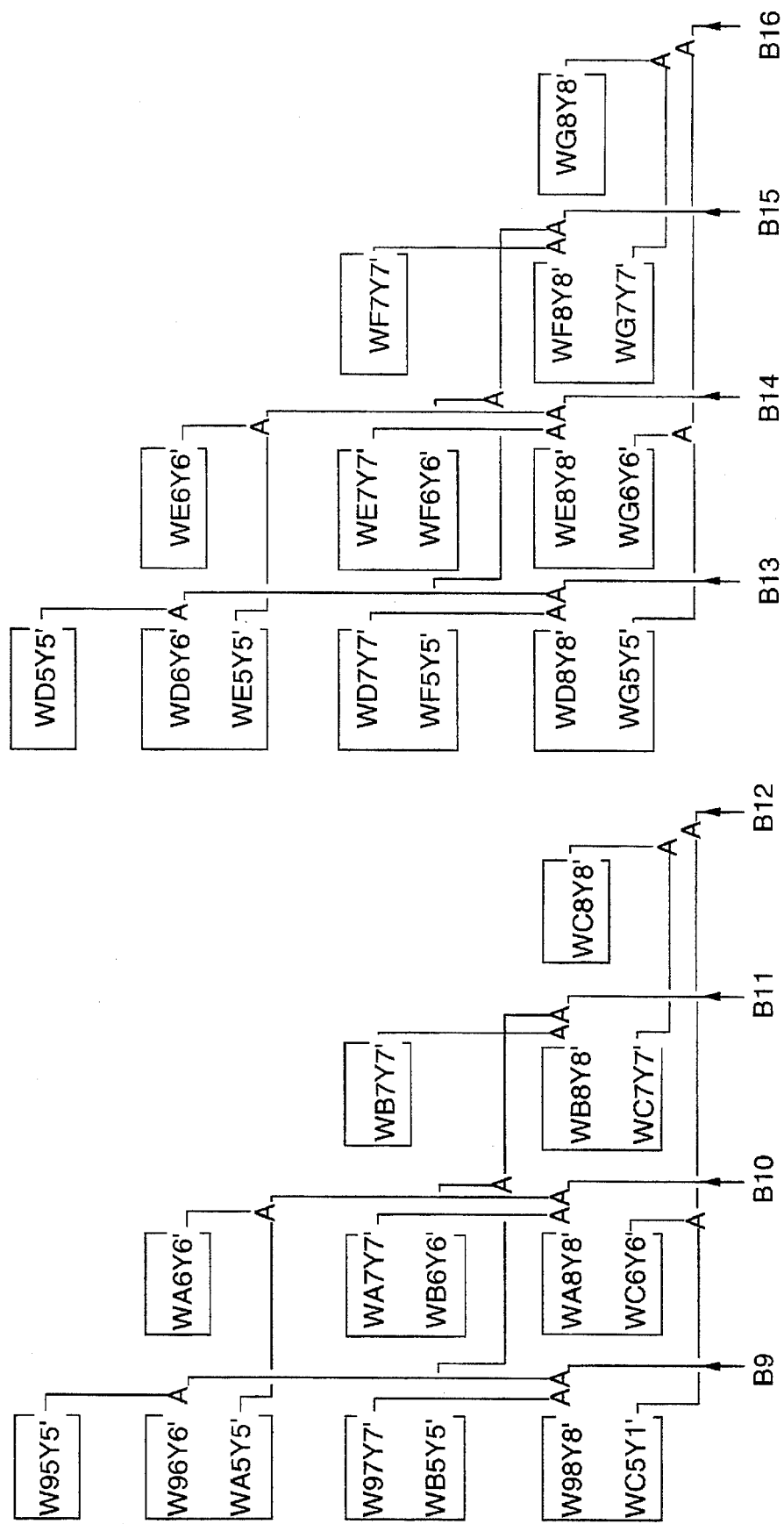
Figures 1, 2, 40E:
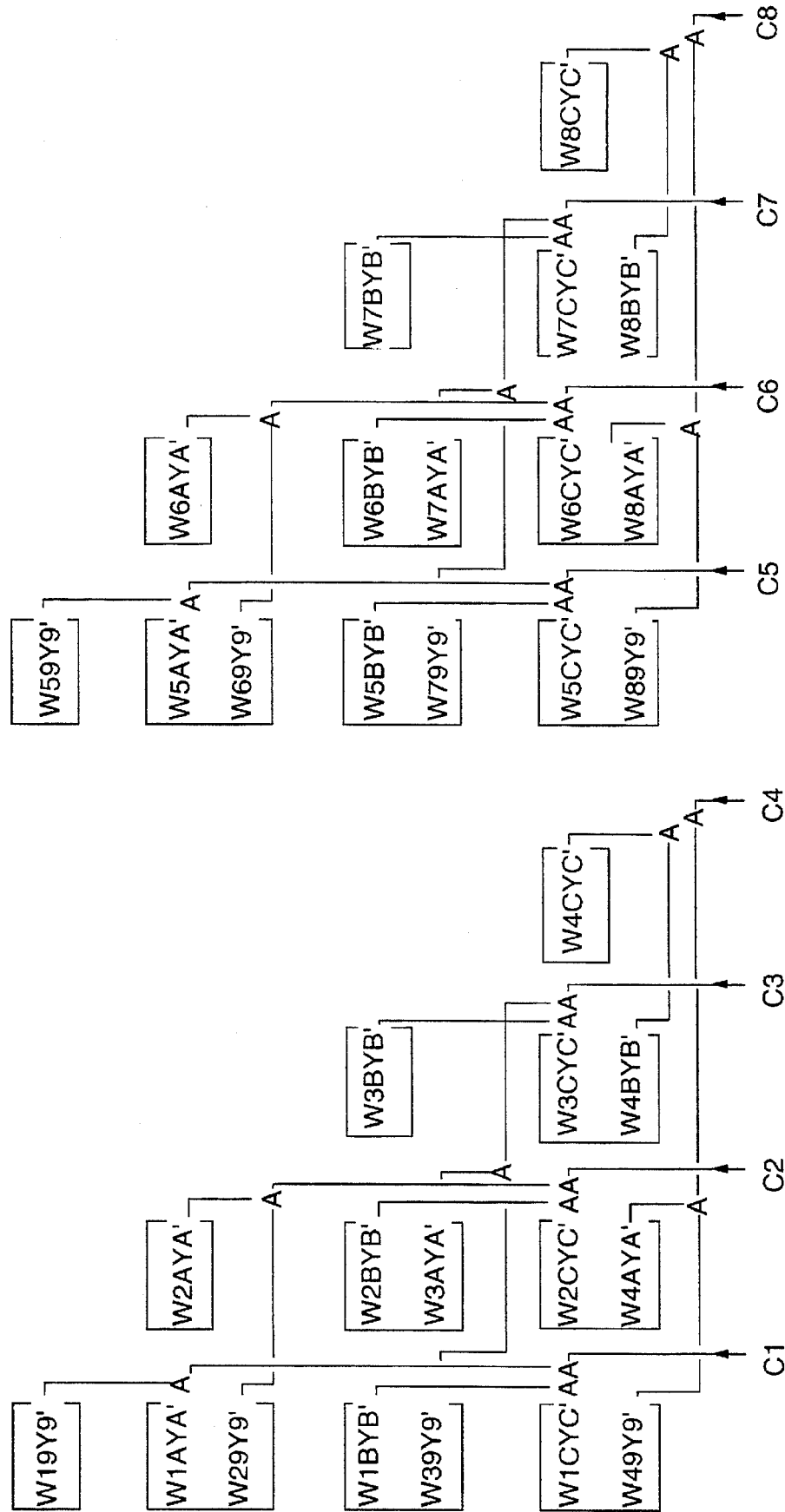
Figures 1, 2, 40H:
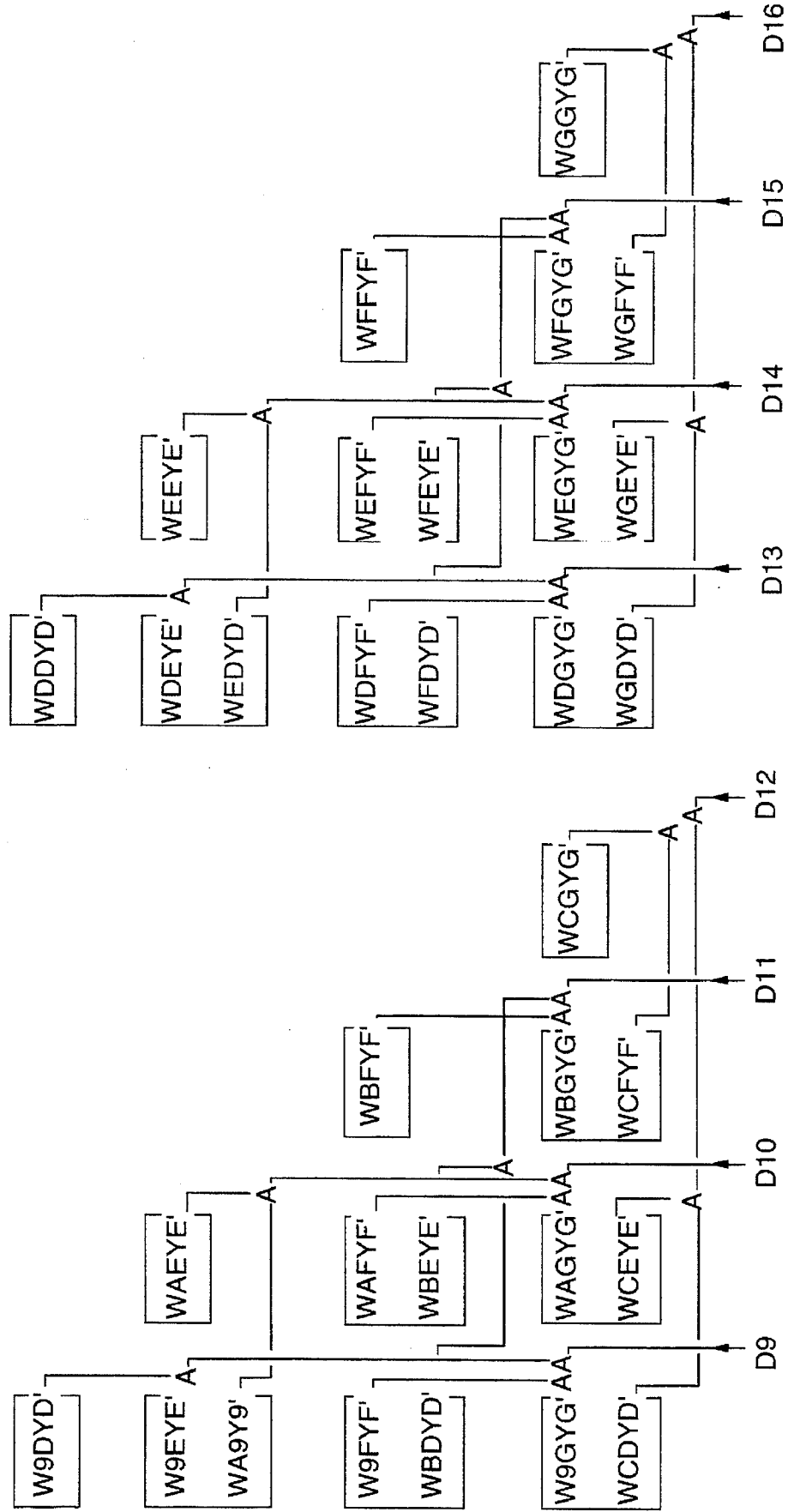
Figures 1, 40I:
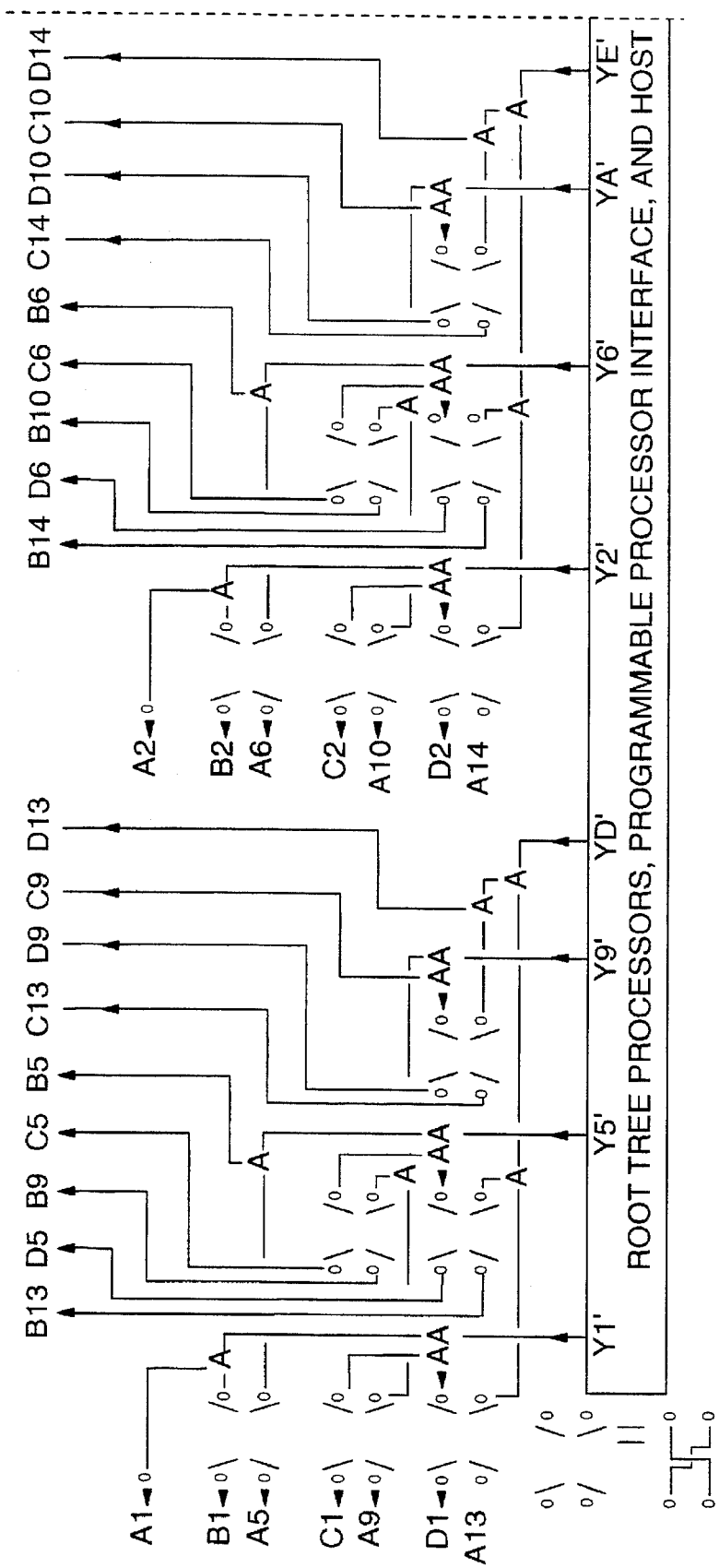
Figures 2, 40I:
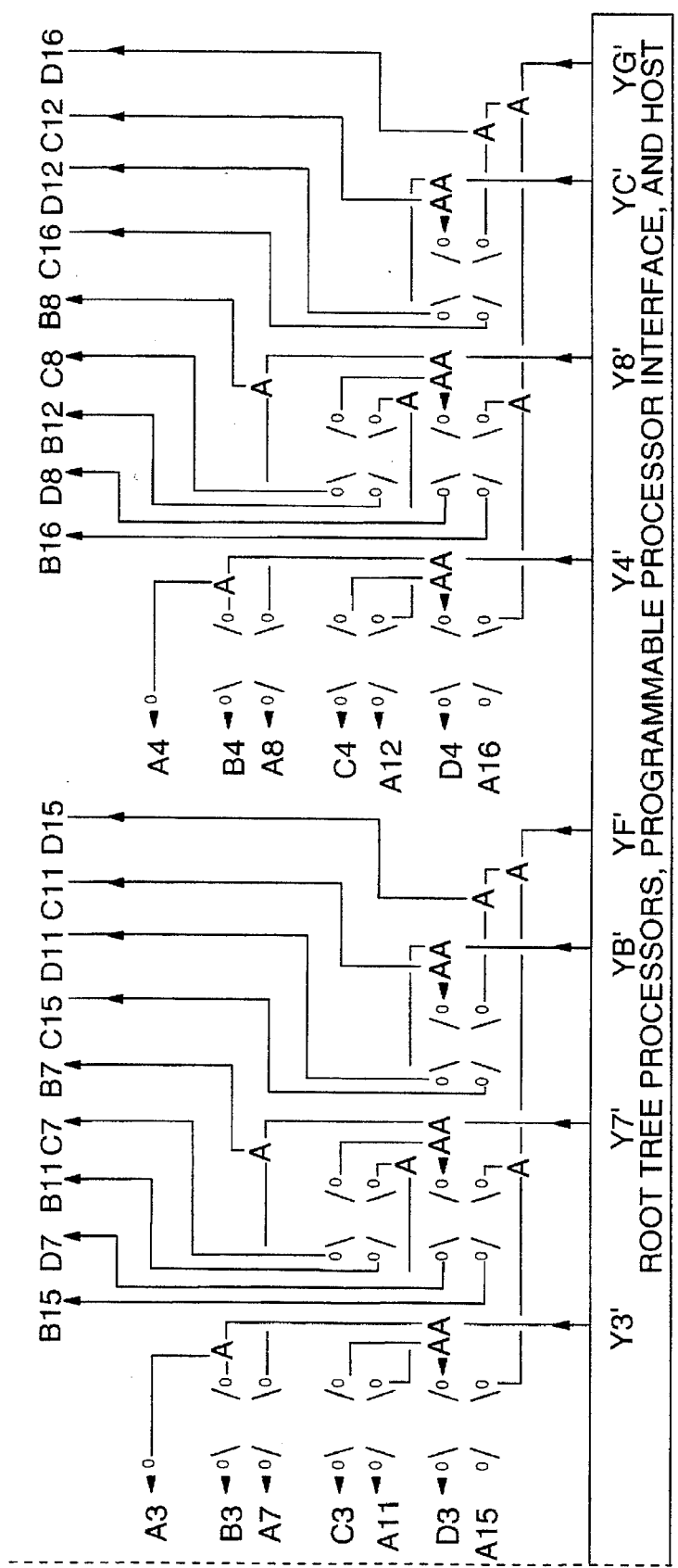

The scalability obtained through use of the partitioning algorithms and the switching mechanism is easily seen in an example that doubles the number of neurons from 8 to 16, using four times as many triangle processing array chips, FIG. 39 and FIG. 40. In these examples, the switching tree mechanism is modified to support the larger system.

For example in FIG. 39:

$$Y7 = A7 + B7 + C7 + D7$$

Where:

$$A7 = W71*Y1 + W72*Y2 + W73*Y3 + W74*Y4$$

$$B7 = W75*Y5 + W76*Y6 + W77*Y7 + W78*Y8$$

$$C7 = W79*Y9 + W7A*YA + W7B*YB + W7C*YC$$

$$D7 = W7D*YD + W7E*YE + W7F*YF + W7G*YG$$

In FIG. 40 Y7 is reverse communicated through points B3, B7, B11, and B15 which, it can be observed, are the correct group chip output points by noting the General-PE destinations for Y7 in the B3, B7, B11, and B15 group chips.

In general, as the group partitioning algorithm is applied to larger structures with a fixed size of X, more ALU tree stages are added to the external ALU tree. Assuming an implementation where a processor group is placed on a single chip, i.e. H processing elements on a chip, then a scalable processor array design can be built where only the switching trees need to be modified as additional group chips are added. This can be seen in the 8 and 16 neuron model examples, where the same size triangular array chip design is used in the construction of both N=8 and N=16 TSNAP structures and only the external CATs are modified.

9. Alternative Scaling Methods

The SNAP structure has also been investigated for scalable designs—see SNAP 90 and a different approach to scalability for the TSNAP structure has been investigated and can be found in TSNAP 90.

Figure 41A:
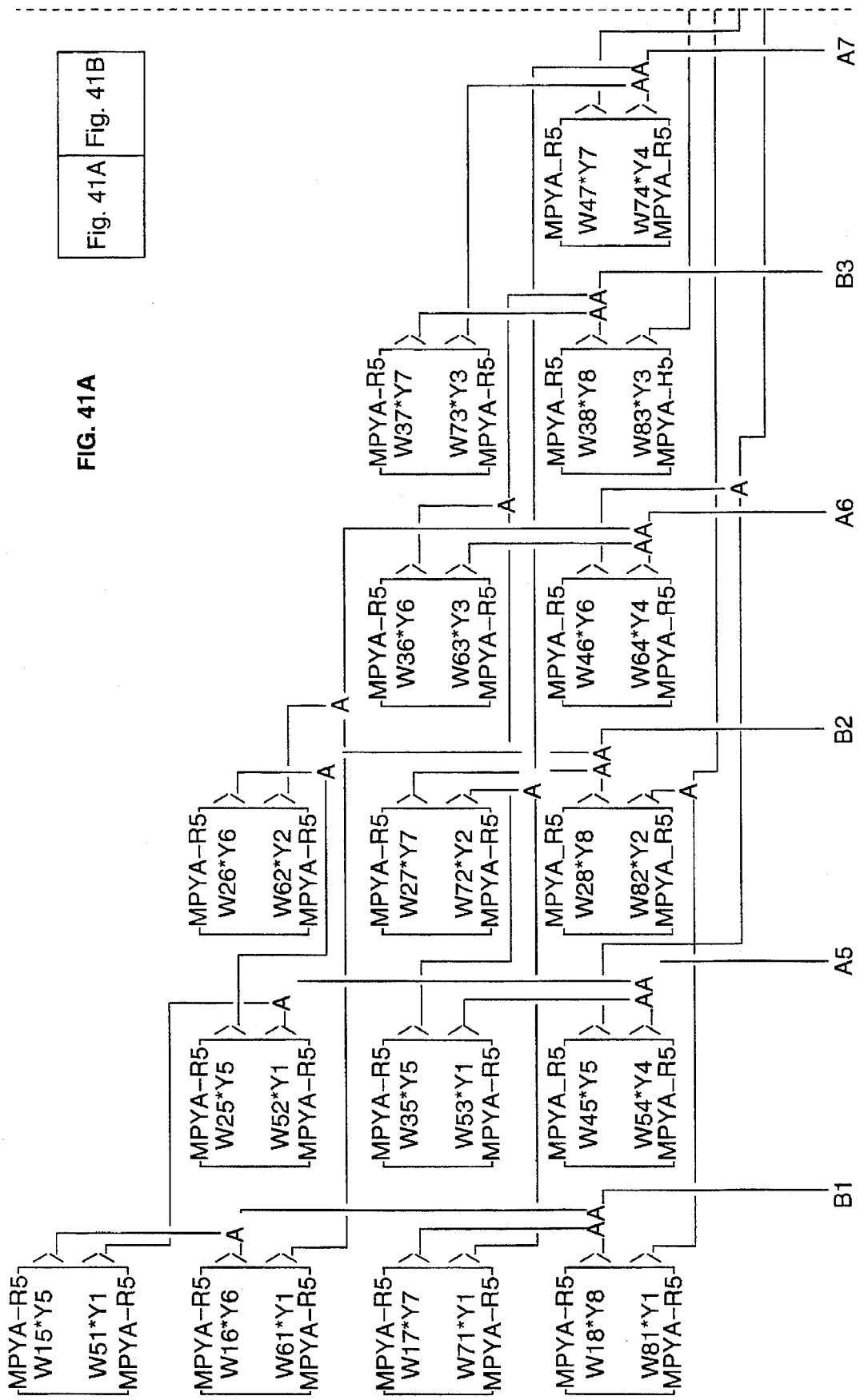
FIG. 41 illustrates an Alternative Building Block—The Folded Inner Square.

From the perspective of the reviewed partitioning approach presented in this paper, alternatives also exist. One will be briefly mentioned for completeness. It should be noted that the inner squares prior to separation into triangles, could be folded, as exemplified by folding the 8 neuron inner square of FIG. 9 shown in FIG. 41, and be used as a common replicatable "building block". By zeroing out the weights and Y values for half of the folded array, a folded square array can model the functions of the edge triangular arrays using twice as many processors. With this arrangement of groups, there is still a requirement for an external switching function. Instead of requiring the switching function due to the separated folded inner square triangular arrays, the switching function is needed for the edge triangular arrays modeled on the folded square building block. Since the folded square building block approach requires twice as many PEs in a processor group, for a given size diagonal triangular array, and there is still a requirement for a switching tree function, the folded square building block approach will not be considered further in this paper, though it represents a viable alternative that merits additional research.

10. Switching Tree Implementation Considerations

An important consideration for the implementation of the switching tree is the method of changing the CATs' summation/communication state and the switching trees' switch state in synchronism and to ensure no hazards in operation. Based upon an architectural definition of the processor elements that they respond as programmable execution units, and with an additional restriction that a single instruction response completion interlocking mechanism be utilized between the Root Tree Processors and the PEs, the hazard free control of the CATs and switching trees can be obtained. The Root Tree Processors represent the controlling source for instructions/data processed by the PEs. Consequently, the hazard free control of the system is obtained by ensuring the Root Tree Processors never send an instruction, or data value in a pending PE instruction automatic mode, to be executed by the PEs, until the previous instruction has completed, as indicated by a response completion signal SVLM 91 or a Root Tree Processor timeout LEARN 90. The Root Tree Processors also control a synchronization tag signal, one per CAT, which is set active whenever instructions or data are sent to the PEs and set inactive otherwise. The synchronization tag can be used to provide directional control for the CAT ALU nodes and switching tree switch states. When the synchronization tag is active, the CAT ALU nodes and the switching tree switch states are set to the communication mode, allowing an instruction or data value to bypass the ALU nodes and be sent to the proper points by the correct setting of the switches. When the synchronization tag is inactive, the CAT and switching tree switches are placed into the ALU function mode (summation mode for neural emulation). For example, the Root Tree Processors first set the synchronization tags active, second send the instruction, or data in a pending PE automatic mode, to the PEs, and third set the synchronization tags inactive at the conclusion of the instruction/data message. The Root Tree Processors then wait for the timeout or completion indication before sending the next instruction/data to the PEs.

It may be desirable that a switching tree group be incorporated on a single chip. For this situation the limiting parameter to be considered is the I/O capacity of the chip rather than the chip real estate logic density. The switching tree, as described previously, requires G+X I/O lines in support of the group chips' and tree roots' signals. Additional I/O lines for control must also be accounted for. For example, X synchronization tag and 2 switch mode control signals may be utilized. For development purposes, a beginning assumption for a switching tree chip I/O count would be G+2X+2+spare I/O lines. For a large system, where G=256 and X=16 for example, the number of I/O lines for technology considerations would be 290+spare.

11. Summary

A partitioning methodology that creates a common "building block" chip, whose size can be determined due to technology considerations has been demonstrated. Based upon technology constraints and the desired applications, a size of X can be determined that optimizing the use of the available real estate. By utilizing the common "building block" chips, a completely connected Root Tree Processor system suitable for completely connected neural network emulation may be constructed that meets requirements. The system once built, can be expanded without greatly impacting a system implementation, but greatly improving system performance.

While we have described our preferred embodiments of our invention it will be understood that those skilled in the art, both now and in the future, upon the understanding of these discussions will make various improvements and enhancements thereto which fall within the scope of the claims which follow. These claims should be construed to maintain the proper protection for the invention first disclosed.

What is claimed is:

1. A computing apparatus comprising:
   a plurality of processing elements (PEs) each including a plurality of I/O ports for sending and receiving both instructions and data, and means for storing and processing the instructions and data, the PEs each coupled to a plurality of others of said PEs such that the plurality of PEs is logically equivalent to at least a square two dimensional configuration of PEs having an equal number of PEs as said computing apparatus;
   a portion of the PEs paired into a plurality of symmetric PEs, the symmetric PEs each comprising a pair of PEs sharing each of said I/O ports for sending and receiving instructions and data such that each of the pair of PEs communicates with PEs coupled to itself and with PEs coupled to the other of said pair of PEs;
   a plurality of root processors for providing an interfacing between the plurality of PEs and a host processor; and
   a plurality of communicating ALU trees, the ALU trees each connected to a plurality of said PEs and to a root processor, the ALU trees operable in one of a plurality of selectable modes, one of the selectable modes transmitting data in a first direction through the PEs for summing PE outputs, another of the selectable modes for communicating data in a second direction opposite to the first direction for communicating data to the PEs.

2. A massively parallel computing system apparatus, comprising:
   an array of processing elements PEij organized into a plurality of G processing groups, where G is a positive integer greater than 1, each of said processing groups including a plurality of H of said processing elements, where H is a positive integer greater than 1;
   each of said plurality of H processing elements in one of said plurality of G processing groups arranged into a folded sub-array obtained by diagonally folding a square sub-array of said processing elements, said square sub-array having a plurality of X of said processing elements on each side thereof where X is a positive integer greater than 1, said square sub-arrays of said plurality of G processing groups making up a K by K square array of said processing elements where K is a positive integer divisible by X, where K/X is an integer, and where 1 and j identify a column and row location of a particular one of said processing elements PEij in said K by K square array;

each square sub-array of a first portion of said plurality of G processing groups having a plurality of X columns, each column thereof having a plurality of X processing elements having a common signal path, forming a plurality of X first signal paths for each respective folded sub-array of said first portion of said plurality of G processing groups;

each square sub-array of a second portion of said plurality of G processing groups having a plurality of X rows, each row thereof having a plurality of X processing elements coupled to a common signal path, forming a plurality of X second signal paths for each respective folded sub-array of said second portion of said plurality of G processing groups;

a plurality of switching trees, each having a first terminal coupled to one of said first signal paths, a second terminal coupled to on of said second signal paths, and a third terminal that is selectively coupled to either said first or said second terminal; and a plurality of root tree processors, each having a terminal coupled to said third terminal of a respective one of said plurality of switching trees, for selectively communicating over said first and second signal paths with said processing elements.

3. The massively parallel computing system apparatus, of claim 2, wherein said plurality of switching trees, further comprises:

a selectable arithmetic logic unit (ALU) path coupled between said first and said second signal paths, for partial summation of signals from said first and said second signal paths.

4. The massively parallel computing system apparatus, of claim 2, wherein said plurality of switching trees, further comprises:

a selectable reverse communication path coupled between said first and said second signal paths, for reverse communication of signals from said first and said second signal paths.

5. The massively parallel computing system apparatus, of claim 2, wherein said plurality of switching trees, further comprises:

a selectable first mode arithmetic logic unit (ALU) path coupled between said first and said second signal paths, for partial summation of signals from said first and said second signal paths;

a selectable second mode reverse communication path coupled between said first and said second signal paths, for reverse communication of signals to said first and said second signal paths; and said plurality of root tree processors controlling said selective first and second modes of said plurality of switching trees.

6. The massively parallel computing system apparatus, of claim 2, wherein each of said plurality of G processing groups further comprises:

a plurality of H processing elements formed on a single integrated circuit chip.

7. A massively parallel computing system apparatus, comprising:

an array of processing elements PEij organized into a plurality of G processing groups where G is a positive integer greater than 1, each of said processing groups including a plurality of H of said processing elements, where H is a positive integer greater than 1;

each of said plurality of H processing elements in one of said plurality of G processing groups arranged into a folded subarray obtained by diagonally folding a square sub-array of said processing elements, said square sub-array having a plurality of X of said processing elements on each side thereof, where X is a positive integer greater than 1, said square sub-arrays of said plurality of G processing groups making up a K by K square array of said processing elements where K is a positive integer divisible by X, where K/X is an integer, and where i and j identify a column and row location of a particular one of said processing elements PEij in said K by K square array;

each square sub-array of a first portion of said plurality of G processing groups having a plurality of X columns, each column thereof having a plurality of X processing elements coupled into an intra-group summation tree, forming a plurality of X first intra-group summation trees for each respective folded sub-array of said first portion of said plurality of G processing groups;

each square sub-array of a second portion of said plurality of G processing groups having a plurality of X rows, each row thereof having a plurality of X processing elements coupled into an intra-group summation tree, forming a plurality of X second intra-group summation trees for each respective folded sub-array of said second portion of said plurality of G processing groups;

a plurality of inter-group summation trees, each having a first terminal coupled to one of said first intra-group summation trees, a second terminal selectively coupled to one of said second intra-group summation trees by means of a switch, and a summation output terminal; and a plurality of root tree processors, each having a terminal coupled to said summation output terminal of a respective one of said plurality of inter-group summation trees, for selectively communicating over said first and second intra-group summation trees with said processing elements.

8. The massively parallel computing system apparatus, of claim 7, wherein each of said plurality of G processing groups further comprises:

a plurality of H processing elements formed on a single integrated circuit chip.

* * * * *